United States Patent
Bianco et al.

(10) Patent No.: US 7,305,562 B1
(45) Date of Patent: Dec. 4, 2007

(54) SYSTEM, METHOD AND COMPUTER PROGRAM PRODUCT FOR AN AUTHENTICATION MANAGEMENT INFRASTRUCTURE

(75) Inventors: Peter Garrett Bianco, Potomac, MD (US); William Taylor Boon, Bristow, VA (US); Anthony C. Rochon, Ashburn, VA (US); Marc A. Sherman, Rockville, MD (US); Robert Brewster Sterling, Kensington, MD (US); Karl Roger Ware, Washington, DC (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 09/517,121

(22) Filed: Mar. 1, 2000

Related U.S. Application Data

(63) Continuation-in-part of application No. 09/264,726, filed on Mar. 9, 1999.

(51) Int. Cl.
*H04K 1/00* (2006.01)
*H04L 9/00* (2006.01)
*G06F 17/00* (2006.01)

(52) U.S. Cl. .............. 713/186; 713/155; 713/182; 713/183; 713/184; 713/185; 726/1; 709/229

(58) Field of Classification Search ............. 713/155, 713/182–186; 709/229; 726/1
See application file for complete search history.

(56) References Cited

U.S. PATENT DOCUMENTS

| | | | |
|---|---|---|---|
| 3,639,905 A | 2/1972 | Yaida et al. ............. | 340/149 |
| 4,449,189 A | 5/1984 | Feix et al. .............. | 364/513.5 |
| 4,685,055 A | 8/1987 | Thomas ................. | 364/200 |
| 4,975,969 A | 12/1990 | Tal ......................... | 382/2 |
| 4,993,068 A | 2/1991 | Piosenka et al. ........ | 380/23 |
| 5,018,096 A | 5/1991 | Aoyama .................. | 364/900 |

(Continued)

FOREIGN PATENT DOCUMENTS

WO   WO 97/04394   2/1997

(Continued)

OTHER PUBLICATIONS

International Search Report issued Jun. 5, 2001 for Appln. No. PCT/US01/06499, 6 pages.

(Continued)

*Primary Examiner*—Emmanuel L. Moise
*Assistant Examiner*—Michael Pyzocha
(74) *Attorney, Agent, or Firm*—George T. Marcou; Kilpatrick Stockton LLP

(57) ABSTRACT

A system, method and computer program product that utilizes measurements for the authentication of users to enterprise resources. The system includes an authentication server that stores the engine and collections of data required by the system to authenticate users. The collections of data include templates, policies, groups, device IDs, user IDs, computer IDs and application IDs. In the present invention, it is the policies that determine the way or method in which a user is to be authenticated by the system. The pre-defined polices include an OR policy, an AND policy, a CONTINGENT policy, a RANDOM policy and a THRESHOLD policy, a multi-user policy, a multi-location policy, a multi-template policy, a user dependent policy, a location restriction policy, and a computer/device specific policy.

30 Claims, 63 Drawing Sheets

U.S. PATENT DOCUMENTS

| | | | |
|---|---|---|---|
| 5,055,658 A | 10/1991 | Cockburn | 235/382 |
| 5,056,147 A | 10/1991 | Turner et al. | 382/14 |
| 5,065,429 A | 11/1991 | Lang | 380/25 |
| 5,111,512 A | 5/1992 | Fan et al. | 382/3 |
| 5,131,038 A | 7/1992 | Puhl et al. | 380/23 |
| 5,163,094 A | 11/1992 | Prokoski et al. | 382/2 |
| 5,165,032 A | 11/1992 | Herbault | 395/725 |
| 5,181,786 A | 1/1993 | Hujink | 400/61 |
| 5,191,611 A | 3/1993 | Lang | 380/25 |
| 5,195,133 A | 3/1993 | Kapp et al. | 380/9 |
| 5,228,094 A | 7/1993 | Villa | 382/4 |
| 5,229,764 A | 7/1993 | Matchett et al. | 340/825.34 |
| 5,235,642 A * | 8/1993 | Wobber et al. | 713/156 |
| 5,245,329 A | 9/1993 | Gokcebay | 340/825.31 |
| 5,259,025 A | 11/1993 | Monroe et al. | 380/23 |
| 5,268,963 A | 12/1993 | Monroe et al. | 380/23 |
| 5,280,527 A | 1/1994 | Gullman et al. | 380/23 |
| 5,291,560 A | 3/1994 | Daugman | 382/2 |
| 5,321,765 A | 6/1994 | Costello | 382/4 |
| 5,337,043 A | 8/1994 | Gokcebay | 340/825.31 |
| 5,339,361 A | 8/1994 | Schwalm et al. | 380/23 |
| 5,386,104 A | 1/1995 | Sime | 235/379 |
| 5,412,727 A | 5/1995 | Drexler et al. | 380/24 |
| 5,412,738 A | 5/1995 | Brunelli et al. | 382/115 |
| 5,414,755 A | 5/1995 | Bahler et al. | 379/67 |
| 5,432,864 A | 7/1995 | Lu et al. | 382/118 |
| 5,436,970 A | 7/1995 | Ray et al. | 380/23 |
| 5,442,645 A | 8/1995 | Ugon et al. | 371/25.1 |
| 5,450,524 A | 9/1995 | Rissanen | 395/2.54 |
| 5,455,407 A | 10/1995 | Rosen | 235/380 |
| 5,456,256 A | 10/1995 | Schneider et al. | 128/660.09 |
| 5,457,747 A | 10/1995 | Drexler et al. | 380/24 |
| 5,465,290 A | 11/1995 | Hampton et al. | 379/67 |
| 5,469,506 A | 11/1995 | Berson et al. | 380/23 |
| 5,473,144 A | 12/1995 | Mathurin, Jr. | 235/380 |
| 5,481,720 A | 1/1996 | Loucks et al. | 395/700 |
| 5,502,759 A | 3/1996 | Cheng et al. | 379/88 |
| 5,509,083 A | 4/1996 | Abtahi et al. | 382/124 |
| 5,513,250 A | 4/1996 | McAllister | 379/91 |
| 5,513,272 A | 4/1996 | Bogosian, Jr. | 382/116 |
| 5,534,855 A | 7/1996 | Shockley et al. | 340/825.3 |
| 5,566,327 A | 10/1996 | Sehr | 395/600 |
| 5,577,120 A | 11/1996 | Penzias | 380/23 |
| 5,578,808 A | 11/1996 | Taylor | 235/380 |
| 5,581,630 A | 12/1996 | Bonneau, Jr. | 382/116 |
| 5,586,171 A | 12/1996 | McAllister et al. | 379/67 |
| 5,594,806 A | 1/1997 | Colbert | 382/115 |
| 5,608,387 A | 3/1997 | Davies | 340/825.34 |
| 5,613,012 A | 3/1997 | Hoffman et al. | 382/115 |
| 5,615,277 A | 3/1997 | Hoffman | 382/115 |
| 5,623,552 A | 4/1997 | Lane | 382/124 |
| 5,635,012 A | 6/1997 | Belluci et al. | 156/277 |
| 5,636,282 A | 6/1997 | Holmquist et al. | 380/25 |
| 5,636,292 A | 6/1997 | Rhoads | 382/232 |
| 5,642,160 A | 6/1997 | Bennett | 348/156 |
| 5,646,839 A | 7/1997 | Katz | 379/93.01 |
| 5,647,017 A | 7/1997 | Smithies et al. | 382/119 |
| 5,655,013 A | 8/1997 | Gainsboro | 379/188 |
| 5,657,389 A | 8/1997 | Houvener | 380/23 |
| 5,659,616 A | 8/1997 | Sudia | 380/23 |
| 5,664,170 A | 9/1997 | Taylor | 395/200.5 |
| 5,668,874 A | 9/1997 | Kristol et al. | 380/23 |
| 5,677,851 A | 10/1997 | Kingdon et al. | 364/514 C |
| 5,686,765 A | 11/1997 | Washington | 307/10.5 |
| 5,712,912 A | 1/1998 | Tomko et al. | 380/23 |
| 5,712,914 A | 1/1998 | Aucsmith et al. | 380/30 |
| 5,719,950 A | 2/1998 | Osten et al. | 382/115 |
| 5,751,260 A | 5/1998 | Nappi et al. | 345/8 |
| 5,761,329 A | 6/1998 | Chen et al. | 382/116 |
| 5,764,789 A | 6/1998 | Pare, Jr. et al. | 382/115 |
| 5,781,724 A | 7/1998 | Nevarez et al. | 395/186 |
| 5,790,674 A | 8/1998 | Houvener et al. | 380/23 |
| 5,802,199 A | 9/1998 | Pare, Jr. et al. | 382/115 |
| 5,805,719 A | 9/1998 | Pare, Jr. et al. | 382/115 |
| 5,812,067 A | 9/1998 | Bergholz et al. | 340/825.31 |
| 5,815,252 A | 9/1998 | Price-Francis | 356/71 |
| 5,815,598 A | 9/1998 | Hara et al. | 382/211 |
| 5,821,871 A | 10/1998 | Benzler | 340/825.34 |
| 5,825,005 A | 10/1998 | Behnke | 235/380 |
| 5,838,306 A | 11/1998 | O'Connor et al. | 345/163 |
| 5,838,812 A | 11/1998 | Pare, Jr. et al. | 382/115 |
| 5,844,497 A | 12/1998 | Gray | 340/825.34 |
| 5,872,834 A | 2/1999 | Teitelbaum | 379/93.03 |
| 5,872,928 A * | 2/1999 | Lewis et al. | 709/222 |
| 5,881,226 A | 3/1999 | Veneklase | 395/188.01 |
| 5,887,140 A | 3/1999 | Itsumi et al. | 395/200.55 |
| 5,892,838 A | 4/1999 | Brady | 382/115 |
| 5,933,498 A | 8/1999 | Schneck et al. | 380/4 |
| 5,987,232 A | 11/1999 | Tabuki | 713/201 |
| 5,991,877 A | 11/1999 | Luckenbaugh | 713/200 |
| 5,995,014 A | 11/1999 | DiMaria | 340/825.31 |
| 6,070,192 A * | 5/2000 | Holt et al. | 709/227 |
| 6,076,167 A * | 6/2000 | Borza | 713/201 |
| 6,108,779 A | 8/2000 | Dean et al. | 713/2 |
| 6,134,549 A | 10/2000 | Regnier et al. | 707/9 |
| 6,138,239 A | 10/2000 | Veil | 713/200 |
| 6,154,741 A * | 11/2000 | Feldman | 707/9 |
| 6,161,139 A * | 12/2000 | Win et al. | 709/225 |
| 6,167,517 A | 12/2000 | Gilchrist et al. | 713/186 |
| 6,178,505 B1 | 1/2001 | Schneider et al. | 713/168 |
| 6,182,076 B1 | 1/2001 | Yu et al. | |
| 6,182,221 B1 | 1/2001 | Hsu et al. | 713/186 |
| 6,219,439 B1 | 4/2001 | Burger | 382/115 |
| 6,243,747 B1 * | 6/2001 | Lewis et al. | 709/220 |
| 6,256,737 B1 * | 7/2001 | Bianco et al. | 713/186 |
| 6,311,272 B1 * | 10/2001 | Gressel | 713/186 |
| 6,338,140 B1 * | 1/2002 | Owens et al. | 713/168 |
| 6,442,532 B1 * | 8/2002 | Kawan | 705/35 |
| 6,463,468 B1 * | 10/2002 | Buch et al. | 709/219 |
| 6,539,425 B1 * | 3/2003 | Stevens et al. | 709/220 |
| 6,618,806 B1 | 9/2003 | Brown et al. | |
| 6,678,827 B1 * | 1/2004 | Rothermel et al. | 713/201 |

FOREIGN PATENT DOCUMENTS

| | | |
|---|---|---|
| WO | WO 98/04996 | 2/1998 |
| WO | WO 98/15924 | 4/1998 |
| WO | WO 98/48538 | 10/1998 |
| WO | WO 98/50875 | 11/1998 |
| WO | WO 98/52317 | 11/1998 |
| WO | WO 98/57247 | 12/1998 |

OTHER PUBLICATIONS

"Keyware Technologies: Keyware Technologies introduces the LBV Security Server," M2 Presswire, M2 Communications LTD, Jun. 25, 1998, 2 pages (Printed from Dialog (R) File No. 636).

International Search Report for PCT Appl. No. PCT/US00/05722.

Avolio, F.M., "Identity confirmed," *Network World,* Aug. 24, 1998, vol. 18, No. 34.

"Beyond Speech Recognition,", *Fortune,* Nov. 23, 1998, p. 264(1). (Computer Select printout, 2 pages).

"The Biometric Software Security Suite™," 2 pages, from www.truetouch.com, 1999.

Blake, P., "Invisible Protection," *Computerworld,* Nov. 18, 1996, vol. 30, No. 47, p. T6(4). (Computer Select printout, 1 page).

"Body Language," *Computer Letter,* Nov. 30, 1998, p. 1(1). (Computer Select printout, 5 pages).

Carter, J. and Nixon, M., "An integrated Biometrics Database," pp. 8/1-8/5, May 22, 1990.

Declerq, F., "Voice security compares features," *Electronic Engineering Times,* Mar. 15, 1999, p. 58(1). (Computer Select printout, 2 pages).

"Diebold ATMs First To Recognize Faces and Voices," ComputerWire Printout, Section: Today's News, No. 3303, Dec. 3, 1997, 1 page.

Duksta, J.C.C., "We know who you are," *Network World,* Aug. 24, 1988, pp. 35-36 & 38-41.

"Embedded Solution," 1 page, from www.keyware.com, 1998.

"Forget passwords," 2 pages, from www.forbes.com, Feb. 8, 1999.

Halpin, J., "Bio-identity," *Computer Shopper*, Mar. 1999, vol. 19, No. 3, p. 390(1). (Computer Select printout, 4 pages).

Karney, J., "Citadel Gatekeeper," *PC Magazine,* Feb. 23, 1999, p. 174(1). (Computer Select printout, 2 pages).

Karney, J., "Saflink SAF/nt2.0," *PC Magazine,* Feb. 23, 1999, p. 172(1). (Computer Select printout, 2 pages).

Karney, J., "TrueFace Network," *PC Magazine,* Feb. 23, 1999, p. 178(1). (Computer Select printout, 2 pages).

"Keyware Technologies: The Layered Biometric Verification (LBV) Server," from www.keyware.com, 2 pages, 1998.

"Keyware Technologies Layers-on Bio Security for Firms," *Wall Street & Technology*, vol. 16, p. 29(1), Dec. 1998.

Phillips, K., "Moving to Biometric Standards," *PC Week,* Oct. 27, 1997, pp. 122 & 124.

Press Release, "Keyware Technologies Acquires Idtech," Mar. 24, 1999, 2 pages, from www.keyware.com.

Press Release, "TrueTouch Technologies, Inc. Introduces the 'Biometric Software Suite,'" 2 pages, Apr. 20, 1998, from www.truetouch.com.

"SAF/nt: Don't Worry, Be KA-API," *Network World,* Aug. 24, 1998, vol. 15, No. 34, p. 35(1). (Computer Select printout, 2 pages).

Schwartau, W., "Securing the Enterprise," *Network World,* Jan. 27, 1997, pp. 42-44 & 46.

"STMicro chips will include biometrics," *Electronic Engineering Times,* Jul. 6, 1998, No. 1015, p. 34(1). (Computer Select printout, 1 page).

"TrueTouch's Biometric Software Suite™," 1 page, from www.truetouch.com, 1999.

"VoiceGuardian®," 3 pages, from www.keyware.com, 1999.

* cited by examiner

SYSTEM, METHOD AND COMPUTER PROGRAM PRODUCT FOR AN AUTHENTICATION MANAGEMENT INFRASTRUCTURE

CROSS-REFERENCE TO RELATED APPLICATIONS

This is a continuation-in-part application of the commonly-owned, co-pending application entitled "System, Method and Computer Program Product for Allowing Access to Enterprise Resources Using Biometric Devices," U.S. application Ser. No. 09/264,726, filed on Mar. 9, 1999 (incorporated by reference in its entirety herein).

BACKGROUND OF THE INVENTION

1. Field of the Invention

The present invention relates generally to a system, method and computer program product for allowing access to enterprise resources, and more particularly to the utilization of policies to provide flexibility to the level of protection for individual enterprise resources.

2. Related Art

Enterprise resources include computers, applications and data. Computers are often connected using one or more networks. There are many types of computer networks. Various types of networks include, but are not limited to, local-area networks (LAN), wide-area networks (WAN), the Internet and intranets. In general, a computer network may or may not be private. A typical private network is centrally controlled.

The resulting connectivity provided by a network enables several features such as sharing of data and other resources on the network. For example, networks enable applications such as electronic mail, network file systems (sharing of data using disks accessed over networks), distributed processing (different computers executing different parts of a program, generally in parallel) and sharing of printers and servers. These applications usually result in enhanced communication capabilities, efficient use of resources, and/or faster processing of data, thereby leading to productivity gains within an enterprise.

Provision of network connectivity and applications generally entails the operation of several network elements implemented according to predefined interfaces. Network elements include, but are not limited to, hardware circuits/devices and software entities (e.g., a software object, a process or a thread) which may operate according to interface specifications to provide the network connectivity or applications. The interfaces may be based on open protocols or proprietary protocols.

An open interface is public. Examples of open interfaces are Transmission Control Protocol/Internet Protocol (TCP/IP) and IEEE 802 family of protocols, both of which are commonly used in the networking community. Alternately, a proprietary interface is privately owned and controlled. An example of a proprietary interface is System Network Architecture (SNA) implemented mostly at IBM. Following is a brief description of the various types of networks.

A LAN connects computers that are geographically close together (e.g., in the same building). LANS are typically private networks being owned and controlled by an enterprise.

A WAN connects computers that are farther apart geographically and are connected by telephone lines or radio waves (e.g., in multiple offices and distant geographies). WANS are also typically private networks owned and controlled by an enterprise. Multiple LANs can be connected by a WAN.

The Internet is a global network connecting millions of computers. As of 1998, the Internet has more than 100 million users worldwide, and that number is growing rapidly. More than 100 countries are linked into exchanges of data, news and opinions. Unlike private networks which are centrally controlled, the Internet is decentralized by design. Each Internet computer, called a host, is independent. Users can choose which Internet services to use and which local services to make available to the global Internet community. There are a variety of ways to access the Internet. Most online services, such as America Online, offer access to some Internet services. It is also possible to gain access through a commercial Internet Service Provider (ISP).

An ISP is a company that provides access to the Internet. For a monthly fee, the ISP gives you a software package, username, password and access phone number. Equipped with a modem, a user can then log on to the Internet and browse the World Wide Web and USENET, and send and receive e-mail. In addition to serving individuals, ISPs also serve large individual enterprises, providing a direct connection from the enterprise's networks to the Internet. ISPs themselves are connected to one another through Network Access Points (NAPs).

An intranet is a privately owned and controlled network. An intranet's host sites may look and act just like any other host site, but a firewall surrounding an intranet fends off unauthorized access. Like the Internet itself, intranets are used to share information (i.e. data). Secure intranets are now the fastest-growing segment of the Internet because they are much less expensive to build and manage than private networks based on proprietary protocols.

As enterprise resources grow so does the complexity and importance of protecting them. In general, the administration of resource protection involves determining the type of identification mechanism to protect enterprise resources, maintaining the integrity of the chosen identification mechanism, managing users, determining which enterprise resources to protect and determining alternative ways of allowing a user access to enterprise resources when the normal way of authentication is faulty. The administration of resource protection in a network is not only a complex and expensive task, but it may conflict with the desired productivity the networking of resources provides.

As discussed above, one of the results of networking together enterprise resources is the increase in productivity through enhanced communication and more efficient use of the resources. While this increase in productivity is important to any enterprise, so is the protection of its resources. While a network works to provide easier access to enterprise resources, an authentication mechanism for protecting the same resources works to restrict access to them. Therefore, so as to not offset the increase in productivity a network provides to an enterprise, an enterprise needs to balance adequate resource protection with an efficient means of administering such protection.

SUMMARY OF THE INVENTION

The present invention is directed to a system, method and computer program product for allowing access to enterprise resources, and more particularly to the utilization of policies to provide flexibility to the level of protection for individual enterprise resources. The system includes a server that stores the engine and collections of data required by the system to authenticate users. The collections of data include templates, policies, groups, device IDs, user IDs, computer IDs and application IDs. In the present invention, the policies determine the way or method in which a user is to be authenticated by the system. The execution of the policies involves the use of one or more templates. One unique template is created and stored in the server each time a user enrolls in a different device.

If the device utilized is a biometric device, then a scientific technique to identify a user based on compared measurements of unique personal characteristics is used. These measurements, called biometric measurements, may include, but are not limited to, measurements of finger and hand geometry, retina and facial images, weight, DNA data, breath, voice, typing stroke and signature. Other devices (that are not biometric) utilized by the present invention include tokens, passwords, smart cards, etc.

The types of data stored in the server are partially determined through the operations of an enrollment station and an administration station. The enrollment station is used to enroll users into the authentication system of the present invention. The administration station is used to perform overall management duties and to initially setup the data in the authentication server of the present invention. A satellite enrollment station can be used to enroll users into the authentication system at remote locations. Finally, an alternate server is a backup or standby server to the authentication server. The alternate server ensures that the system is always available to authenticate users.

The policies of the present invention provide flexibility to the level of protection for individual enterprise resources. Examples of pre-defined polices include an OR policy, an AND policy, a CONTINGENT policy, a RANDOM policy, a THRESHOLD policy, a multi-user policy, a multi-location policy, a multi-template policy, a user dependent policy, a location restriction policy, and a computer/device specific policy. This is done through the layering of both biometric devices and/or non-biometric devices. The layering of devices allows for the combination of one or more devices in a logical way (via policies) to protect each enterprise resource. The present invention also allows different threshold values to be set for each device. In other words, the present invention can tailor the authentication level based on probability that each user must pass before the user gains access to enterprise resources (e.g., $\frac{1}{1000}$, $\frac{1}{10,000}$, or $\frac{1}{1000,0000}$ that the user is who claims to be).

Another feature of the present invention is directed to a method of storing both templates and digital certificates in a hierarchical structure for ease of access to the templates and the digital certificates. Another feature of the present invention is directed to utilizing the system of the present invention as a roaming profile server in a certificate authority system.

A further feature of the present invention is directed to a system and method of remotely accessing the present invention. The remote access of the present invention can be implemented with both RADIUS and web access.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIG. 4 is broken into nine (9) figures including FIG. 4A, FIG. 4B, FIG. 4C, FIG. 4D, FIG. 4E, FIG. 4F, FIG. 4G, FIG. 4H and FIG. 4I;

DETAILED DESCRIPTION OF THE PREFERRED EMBODIMENTS

Table of Contents

Figure 1:
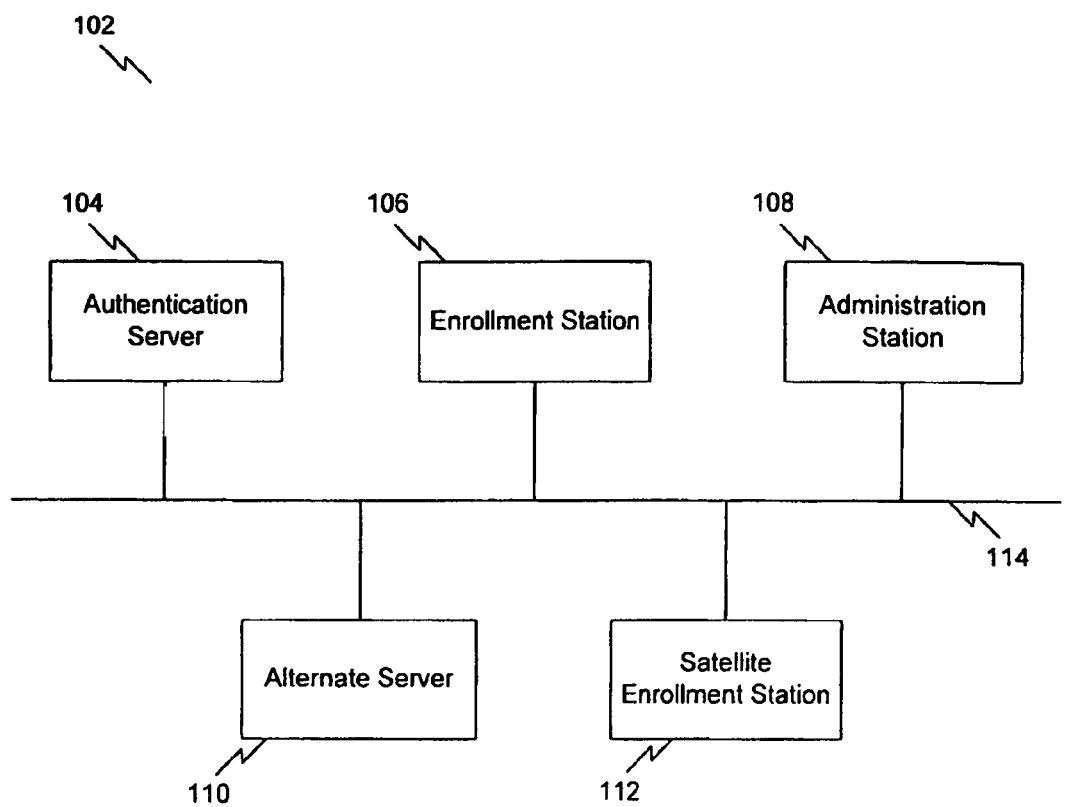
FIG. 1 is a block diagram of the physical components of an authentication system connected by a network according to a preferred embodiment of the present invention.

A. Overview of the Invention
  1. Determining an Adequate Identification Mechanism
  2. Biometric Identification Mechanism: an Adequate Authentication Mechanism
  3. Authentication System
  4. Network System
  5. The Need for the Appropriate Measurement for an Environment
  6. Open Interface B. Preferred Implementation of the Present Invention
  1. A Preferred Environment
  2. A Preferred Software Programming Language and Network Architecture C. Authentication Server Data of the Present Invention
   1. Data Stored in Server
   2. Setup of Server Data D. Authentication Server Functions of the Present Invention
   1. Authenticating a User
   2. Enrolling a User E. Policies
   1. OR Policy
   2. AND Policy
   3. CONTINGENT Policy
   4. RANDOM Policy
   5. THRESHOLD Policy
   6. Policies Having a List of Policies
      a. OR Policy Having a List of Policies
      b. AND Policy Having a List of Policies
      c. RANDOM Policy Having a List of Policies
      d. CONTINGENT Policy Having a List of Policies
      e. THRESHOLD Policy Having a List of Policies
   7. Policies Having a List of Policies or Devices
      a. OR Policy Having a Policy List of Policies or Devices
      b. AND Policy Having a Policy List of Policies or Devices
      c. RANDOM Policy Having a Policy List of Policies or Devices
      d. CONTINGENT Policy Having a Policy List of Policies or Devices
      e. THRESHOLD Policy Having a Policy List of Policies or Devices
   8. Multi-User Policy
   9. Multi-Location Policy
   10. Multi-Template Policy
   11. User Dependent Policy
   12. Location Restriction Policy
   13. Computer/Device Specific Policy F. Increasing Policy Execution Efficiency
   1. Administrative Caching of Templates
   2. User-Driven Caching of Templates G. System Security Infrastructure
   1. Persistent Data Stored in Server
   2. Data Transported Across the Network System
   3. System Software H. Devices and Mobility within a Networked Environment
   1. Hierarchical Storage of Templates
   2. Hierarchical Directory for Locating Templates I. Remote Access Architectures J. Other Applications
   1. Digital Certificates
   2. Roaming Profile Server
   3. Phone Authentication and Clearance Verification
   4. Access/Facility Control
   5. Banking and Financial
   6. Silent Signal K. Conclusion

A. OVERVIEW OF THE INVENTION

The inventors of the present invention recognized that a solution did not exist that effectively balances the protection of resources with ease of access to the same resources in a networked environment. The general solution of the present invention is twofold. First, use as adequate an identification mechanism as possible to protect enterprise resources. And second, provide a method and system that utilizes the adequate identification mechanism to provide effective authentication to resources in a networked environment. This method and system for authentication must not decrease the productivity that a network provides an enterprise.

1. Determining an Adequate Identification Mechanism

Billions of dollars have been lost by thousands of enterprises due to inadequate authentication to enterprise resources. For years enterprises have protected valuable resources through various types of identification mechanisms. Identification mechanisms include, but are not limited to, passwords, smart cards, tokens, and various biometric devices.

Many enterprises reduce the cost and complexity of administering its resource protection by incorporating a process called "single sign-on." Single sign-on provides each user with one password, token or smart card to access all enterprise resources. Most people can remember one password without writing it down and/or keep track of one token or smart card. While this reduces the complexity and cost of administering resource protection, it reduces the probability that the user gaining access is authentic. Now, one password may compromise all enterprise resources. The probability that the user gaining access is authentic can be increased by forcing each user to use multiple passwords, tokens or smart cards for different resources.

2. Biometric Identification Mechanism

Biometric identification mechanisms, or devices, utilize a scientific technique to identify a user based on compared measurements of unique personal characteristics. Biometric identification mechanisms include two basic categories of measurements. The first category involves measuring a unique characteristic found on a user's body. This may include, but is not limited to, finger and hand geometry, retina and facial images, weight, DNA data and breath. The second category involves measuring a user's behavioral characteristics. This may include, but is not limited to, voice, typing stroke and signature. In general, anything that can be measured on a user that is unique can be used as a measurement.

While anything that can be measured on a user that is unique can be used as a measurement, the best measurements to use for authentication purposes depend on the consistency over time of the measurement. For example, user weight is a measurement. Because weight is a measurement that fluctuates frequently for many people, it is not a desirable measurement to use for authentication purposes.

The general process of using biometric identification mechanisms as an authentication mechanism is as follows. The user is prompted for a particular measurement that is used by a device to generate a value. The value gets stored in a template as stored data. When the user wants to gain access to a resource that is protected by the device, the user is prompted for live data. The live data is matched with the stored data. In reality, the live data and the stored data will never be exactly the same. Therefore, a user must come within some tolerance to pass the device and gain access to the protected resources. As mentioned above, the device utilizes a scientific technique to identify a user based on measurements. The tolerance is typically predetermined by the vendor for the particular device used.

It is important to note that although the present invention is described throughout the application as having the user present "live" data to be compared against the stored data in a template, the present invention also contemplates replacing the presentation of "live" data with stored data on a device, such as a smart card. Here, the user would carry the smart card and instead of presenting "live" data, the user would insert his or her smart card into a smart card reader. The data read from the smart card gets compared to the stored data in a template.

A specific example of how biometric identification works can be illustrated by a typical fingerprint device. A fingerprint device measures the geometry of a fingerprint. First, a user is prompted for multiple samples of a fingerprint. For each sample, a number of characteristics or measurements are identified. Then, for all of the multiple samples, a number of common characteristics or measurements are identified. The common characteristics or measurements are processed through a unique algorithm which generates a unique template to store the data. When a "live" fingerprint is presented for identification, it is processed through the same algorithm. If the output from the "live" process matches the stored data within a certain tolerance, the user is considered to be authenticated and gains access to which ever resource the fingerprint device is protecting.

A specific example of how identification works when behavioral measurements are involved can be illustrated by a typical signature device. Here, a user is prompted for multiple samples of a signature. For each sample, characteristics or measurements are identified. The characteristics or measurements include the pressure, sequence of events, direction, relative vectors and speed. One example of the sequence of events is to identify that when the user signed his or her signature, that "t" was crossed before "I" dotted. An example of direction is that the user crossed a "t" from right to left. Relative vectors may include the information that "F" is 2.1 the height of "e." Finally, speed recorded is the time it took the user to sign a signature from start to finish.

As with fingerprint devices, common characteristics or measurements are identified for the multiple samples. These common characteristics or measurements are processed through a unique algorithm which generates a unique template to store the data. When a "live" signature is presented for identification, it is processed through the algorithm. If the output from the "live" process matches the stored data within a certain predetermined tolerance, the user is considered to be authenticated.

The inventors of the present invention recognized that a method and system was needed that utilizes identification devices to provide effective authentication to resources in a networked environment while not decreasing the productivity a network provides an enterprise.

Most enterprises contained in one office today have a LAN. But, more often enterprises today span multiple offices and distant geographies. These enterprises typically have a WAN. As discussed above, networks provide increased productivity to an enterprise by allowing users easy access to all the resources on the network. This is true independent of which office the user is at and where the resource is located within the enterprise. In contrast, resource protection limits the accessability of resources to a user without first being authenticated. Therefore, if the administration of resource protection is not efficient, then the increase in productivity gained by networking is lost. Simply put, if the right user cannot gain access to needed resources, then the enterprise suffers from a decrease in productivity. Yet, if unauthorized users gain access to enterprise resources, then the enterprise also suffers from a potential decrease in productivity. This potential decrease in productivity is due partly to resource loss.

The present invention overcomes limitations that are encountered when resource protection is used in a networked environment. The present invention has the following benefits: (1) flexibility to use the right measurement for an environment when biometric devices are used; (2) allows user mobility within the enterprise; (3) flexibility in the degree of authentication required to protect each resource; (4) allows remote enrollment of users into a resource protection system; (5) allows remote refreshing of templates; and (6) ensures the integrity of software loaded on remote computers in the network. The present invention also allows different threshold values to be set for each device. In other words, the present invention can tailor the authentication level based on probability that each user must pass before gains access to enterprise resources (e.g., $\frac{1}{1000}$, $\frac{1}{10,000}$, or $\frac{1}{1000,0000}$ that the user is who claims to be).

3. Authentication System

FIG. 1 is a block diagram of the functional components of authentication system 102 connected by network 114 according to a preferred embodiment of the present invention. System 102 includes authentication server 104, enrollment station 106, administration station 108, alternate server 110 and satellite enrollment station 112. Network 114 connects the functional components of system 102. The connectivity provided by network 114 enables such features as the sharing of data and other resources on system 102.

The topology of network 114 as shown in FIG. 1 is called a bus topology. In general, the topology of a network is the geometric arrangement of functions (i.e., computers) within the system. Other common types of network topologies include star and ring topologies. Although the present invention is illustrated in FIG. 1 as incorporating a bus topology, the present invention can equally be applied to other topologies.

Server 104 stores the engine for system 102. Server 104 also stores collections of data required by system 102. Both the functions of the engine and the data stored in server 104 will be discussed in further detail below. The types of data stored in server 104 are partially determined through the operations of enrollment station 106 and administration station 108. Enrollment station 106 is used to enroll users into system 102. Enrollment station 106 has attached to it every type of device used by system 102 to enroll and ultimately authenticate users. When a user is enrolled into system 102, the user may be enrolled with as many devices as the administrator deems necessary.

Administration station 108 is used by the administrator of system 102 to perform overall management duties. The administrator can also use administration station 108 to generate various reports. The reports may include a list of different types of data stored in server 104 (e.g., a list of the currently enrolled users in system 102). In addition, administration station 108 is typically used to setup the initial data in server 104. Another component is satellite enrollment station 112. Enrollment station 112 is used to enroll users into system 102 at remote locations. Satellite enrollment station 112 may have as many devices attached to it as administration station 108, but alternatively may also be a scaled down version of administration station 108.

One or more alternate servers 110 are backup or standby servers to server 104. Alternate server 110 stores the exact same data as server 104. Only in the event that server 104 fails does alternate server 110 become active and take over the responsibility of authenticating users. The purpose of alternate server 110 is to ensure that system 102 is always available to authenticate users.

There are other ways to ensure the availability of system 102, however, including: server 104 and alternate server 110 having equal responsibility to authenticate users; administration station 108 backup and tape and/or CD-ROM backup, etc. The server 104 and alternate server 110 having equal responsibility to authenticate users means that they are both active at all times. There is a constant synchronization between server 104 and alternate server 110. In the event that one or the other server fails, the other server takes over the responsibility of authenticating users. When the failed server becomes active again, it initiates synchronization with the other server.

Another way to ensure the availability of system 102 is through administration station 108 backup. Here, administration station 108 acts like a master repository. Administration station 108 updates all active servers 104 simultaneously. The final way to ensure the availability of server 102 is through a tape and/or CD-ROM backup.

Although a preferred embodiment of the present invention includes all of the functional components of system 102 discussed above, several (or all) components may be combined as long as the functionality of each component still exists within system 102 as described above. For example, enrollment station 106 and administration station 108 can be combined into one functional component. In addition, several components of system 102 are optional. For example, an enterprise may not have the need to remotely enroll users or may just desire not to. Therefore, satellite enrollment station 112 would not be needed.

4. Network System

Figure 30:
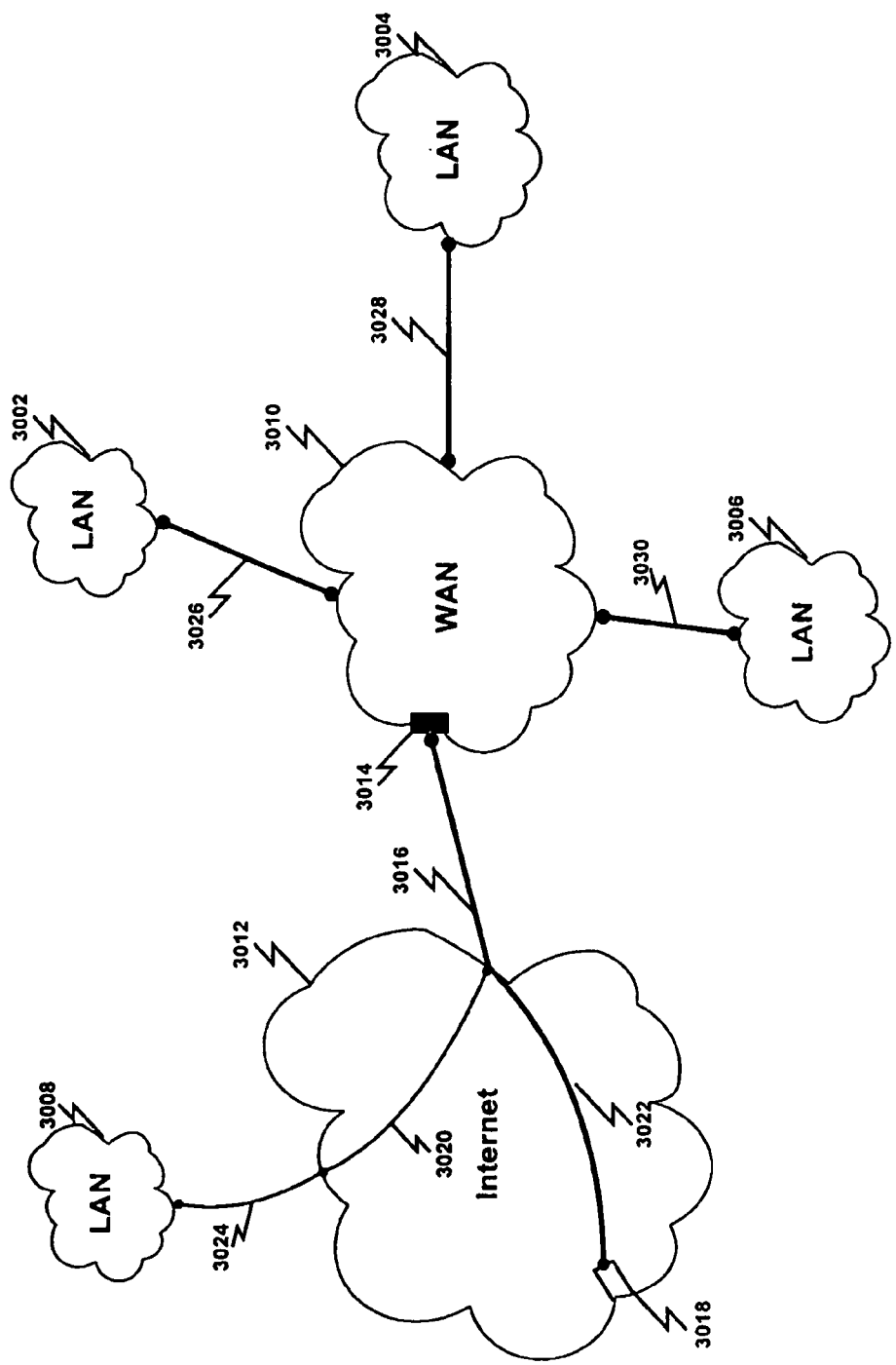
FIG. 30 is a diagram illustrating various types of networks and how each type of network can be connected to other networks according to a preferred embodiment of the present invention.

As mentioned above, various types of networks include, but are not limited to, LANs, WANs, the Internet and intranets. An enterprise may utilize one type of network or any combination of the different types of networks. FIG. 30 is a diagram illustrating the various types of networks and how each type of network can be connected to other networks.

FIG. 30 includes LAN 3002, LAN 3004, LAN 3006, LAN 3008, WAN 3010, Internet 3012, firewall 3014, connection 3016, host 3018, connection 3020, connection 3022, connection 3024, connection 3026, connection 3028 and connection 3030. Connections 3016, 3024, and 3026 through 3030 are typically provided by an ISP.

As shown in FIG. 30, LAN 3002, LAN 3004 and LAN 3006 are connected to WAN 3010. LAN 3008 and host 3018 are also connected to WAN 3010 via the Internet 3012. Connections 3020 and 3022 are typically virtual private networks (VPN). A VPN is a network that is constructed by using public wires to provide connectivity. For example, there are a number of systems that enable you to create networks using the Internet as the medium for transporting data. These systems use encryption and other security mechanisms to ensure that only authorized users can access the network and that the data cannot be intercepted.

Host 3018 may have a type of access to WAN 3010 called dial-up access. Dial-up access refers to connecting a host (i.e., device) to a network via a modem and a public telephone network. Dial-up access is really just like a phone connection, except that the parties at the two ends are computer devices rather than people. Because dial-up access uses normal telephone lines, the quality of the connection is not always good and data rates are limited. An alternative way to connect two computers is through a leased line, which is a permanent connection between two devices. Leased lines provide faster throughput and better quality connections, but they are also more expensive.

WAN 3010 can also be implemented as an intranet as described above. Thus, firewall 3014 can be used to protect WAN 3010 by fending off unauthorized access. Many network systems today incorporate a firewall. A firewall is a system designed to prevent unauthorized access to or from a network. Firewalls are frequently used to prevent unauthorized Internet users from accessing private networks connected to the Internet, especially intranets. Once a user is authorized to access the network, firewalls are further designed to prevent unauthorized transfer of data to and from the network. All data entering or leaving the intranet pass through the firewall, which examines each transmission and blocks those that do not meet the specified security criteria. Firewalls can be implemented in both hardware and software, or a combination of both. A firewall is considered a first line of defense in protecting private information (i.e., data).

Figure 2:
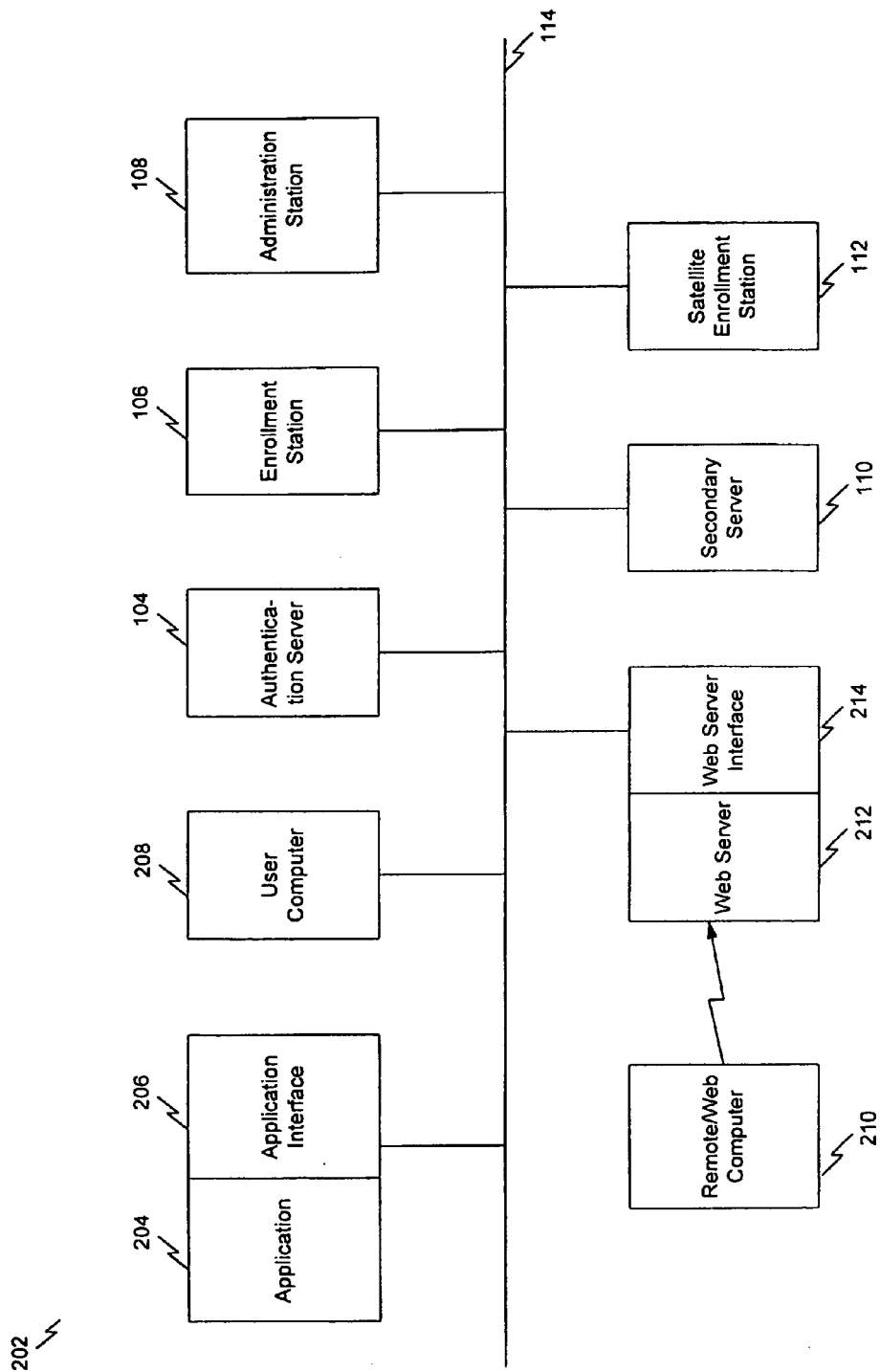
FIG. 2 is a block diagram of a typical enterprise network system incorporating the authentication system according to a preferred embodiment of the present invention.

FIG. 2 is a block diagram of an enterprise network system 202 incorporating system 102 according to a preferred embodiment of the present invention. It is important to note that network system 202 may be one type of network or any combination of the different types of networks described in reference to FIG. 30 above. Referring again to FIG. 30, various functional components of system 102 can be physically located at one or more locations in FIG. 30. For example, system 102 may be located at LAN 3002, LAN 3004, LAN 3006, LAN 3008, WAN 3010 and/or host 3018.

In addition to the components of system 102, network system 202 includes one or more applications, such as application 204, one or more application interfaces, such as application interface 206, one or more user computers, such as user computer 208, one or more remote/web computers, such as remote/web computer 210, web server 212 and web server interface 214. All of the components in network system 202 are considered resources of the enterprise. Network 114 connects both the functional components of system 102 and the additional functional components of network system 202. This connectivity enables such features as the sharing of data and other resources on network system 202.

Examples of application 204 may include, but are not limited to, electronic mail and word processing. Each application 204 has an application interface 206 that allows it to communicate over network 114 to other resources or components in network system 202. In addition, network system 202 includes one or more of user computer 208. Each user computer 208 is located within the enterprise and typically has one or more devices attached to it. User computer 208 is one location where users can gain access to network system 202. To facilitate user access, each computer 208 provides an interface for users to be authenticated by system 102.

Remote/web computer 210 provides the same functions as user computer 208, but remote/web computer 210 accesses network 114 via the Internet. In order for remote/web computer 210 to connect to network 114, it must go through web server 212. Web server interface 214 allows web server 212 to communicate over network 114 to other resources or components in network system 202, including system 102.

In a preferred embodiment of the present invention, users can be required to be authenticated by system 102 when they try to access various points in network system 202. These various access points include network system 202 itself, one or more of application 204 and/or one or more of user computer 208.

Because enterprise networks today typically span multiple offices and distant geographies, the different access points in network system 202 may potentially have very different environments. The inventors of the present invention recognized that there is a need for flexibility to use the appropriate device or measurement for the environment. To achieve this flexibility there is a need for many different types of identification devices to be utilized in network system 202.

5. The Need for the Appropriate Identification Device for an Environment

When using biometric devices, the appropriate measurement must be used for an environment. The type of environment depends on the location in the network of the device that will be reading the measurement. As mentioned above, biometric devices utilize a scientific technique to identify a user based on compared measurements of unique personal characteristics. Biometric measurements, may include, but are not limited to, measurements of finger and hand geometry, retina and facial images, weight, DNA data, breath, voice, typing stroke and signature. There are two aspects of the environment that must be addressed in order to determine the appropriate measurement for that particular environment: a physical aspect and a psychological aspect.

The physical aspect of the environment involves, but is not limited to, lighting and noise. For example, in an environment with poor lighting, a user's iris or facial image may be difficult for the device to measure. Likewise, in a noisy environment a user's voice may be hard to measure.

The psychological aspect of the environment involves the comfort level of users. An example of exceeding a user's comfort level is requiring a user to give a DNA sample to gain access to enterprise resources he or she must access every day. There are certain comfort levels that users of a network have come accustomed to and may refuse to exceed that level.

The result of not using the appropriate measurement for the environment increases the likelihood that the user will not gain access to required resources when needed, thus decreasing enterprise productivity. This may happen when the device cannot read a measurement, when users refuse to give the required "live" data for authentication, when it is not convenient for a user to carry around a token, etc. Therefore, what is needed is the flexibility to use the appropriate measurement for the environment.

The flexibility to use the appropriate identification device for the environment results in the need for many different types of off-the-shelf devices in a single network. Therefore, the authentication task is often complicated by the fact that each of the devices may be provided by several vendors. Currently, devices must conform to a pre-defined interface (or standard) to operate as a part of an integrated network. While the availability of each device from multiple vendors may lead to reduction in prices, the management of networks having devices from different vendors poses additional limitations.

For example, some vendors may allow their devices to be managed from proprietary platforms only. Some vendors may support standards based network management applications (e.g., Simple Network Management Protocol), but the integration of the management of their devices into a network often requires extensive training. For example, the installation of the software to work (i.e., interface) with a network may require training from the vendor. Administrators may need more training for providing on-going support. Such training may need to be provided each time a new device is added to the network. In addition, substantial effort may be required on the part of the vendors to develop software which interfaces with an enterprise's existing network. The resulting overhead due to development and training is unacceptable in most enterprises. This problem of conformity to a pre-defined interface to operate as a part of an integrated network applies equally as well to both biometric and non-biometric devices.

6. Open Interface

The open interface of the present invention includes a device open interface to allow for the integration of system 102 with devices. The device open interface of the present invention provides an interface that all incompatible biometric and non-biometric devices can communicate with. This provides flexibility to an enterprise in several ways. One way it provides flexibility is that an enterprise can now use the appropriate device for the environment.

Another way the present invention's device open interface provides flexibility is by allowing an enterprise to integrate existing devices into system 102 (FIG. 1). This flexibility is important because all users within an enterprise do not have to be enrolled into system 102 at the same time. Also, some users may never have to be enrolled into system 102 and still be able to gain access to network system 202 (FIG. 2).

Another flexibility provided by the device open interface is by allowing an enterprise to supplement system 102 with new devices as they are developed. The device open interface provided by the present invention allows an enterprise the flexibility to use any off-the-shelf devices to protect a resource. As will be shown later, the flexibility of the open interface enables administrators to combine devices via policies for the authentication of users.

The device open interface is propriety software that is used to communicate to devices in order to retrieve live sample data (or password, etc.), match live sample data against stored data (i.e., templates), enroll an individual on each device, and allow administrators to set threshold values. A threshold value indicates the level of identification the device must determine for the user to pass the device. Furthermore, the device open interface has the ability to detect that the device is present, signs of life readings (e.g., that a human is actually present and not a mannequin), etc.

Other open interfaces can be added as needed, including an application open interface, a database open interface and a directory open interface.

B. PREFERRED IMPLEMENTATION OF THE PRESENT INVENTION

1. A Preferred Environment

Figure 3:
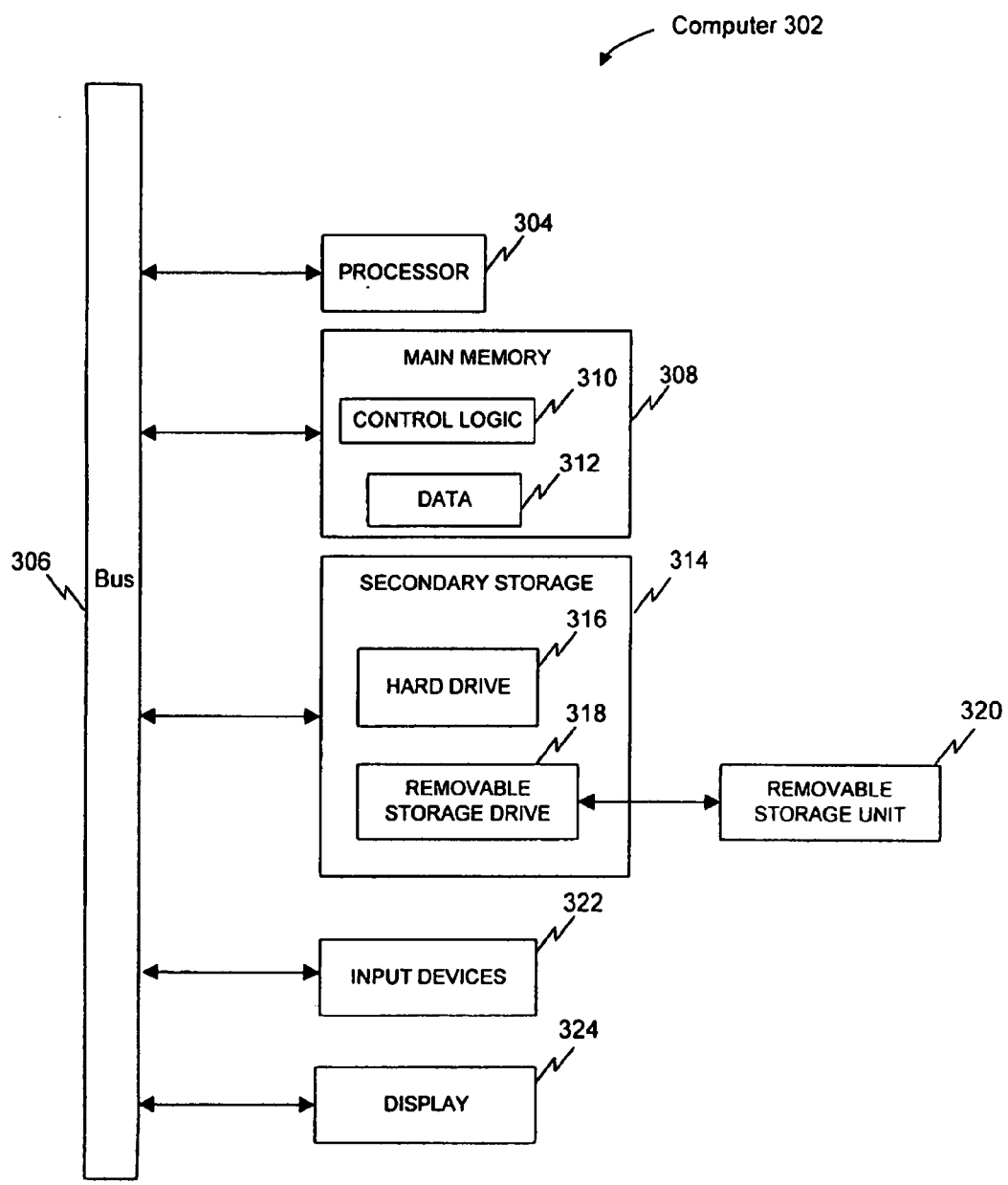
FIG. 3 is a block diagram of a computer system preferably used to implement the present invention.

Server 104, enrollment station 106, administration station 108, alternate server 110 and satellite enrollment station 112 could be implemented using computer 302 as shown in FIG. 3. Obviously, more than one of these functional components could be implemented on a single computer 302.

Computer 302 includes one or more processors, such as processor 304. Processor 304 is connected to communication bus 306. Computer 302 also includes main memory 308, preferably random access memory (RAM). Control logic 310 (i.e., software) and data 312 (such as the data stored in server 104) are stored in the main memory 308, and may also be stored in secondary storage 314.

Computer 302 also includes secondary storage 314. Secondary storage 314 includes, for example, hard disk drive 316 and/or removable storage drive 318, representing a floppy disk drive, a magnetic tape drive, a compact disk drive, etc. Removable storage drive 318 reads from and/or writes to removable storage unit 320 in a well known manner.

Removable storage unit 320, also called a program storage device or a computer program product, represents a floppy disk, magnetic tape, compact disk, etc. As will be appreciated, removable storage unit 320 includes a computer usable storage medium having stored therein computer software and/or data.

Computer programs (also called computer control logic) are stored in main memory 308, secondary storage 314 and/or removable storage unit 320. Such computer programs, when executed, enable computer 302 to perform the functions of the present invention as discussed herein. In particular, the computer programs, when executed, enable processor 304 to perform the functions of the present invention. Accordingly, such computer programs represent controllers of computer 302.

In another embodiment, the invention is directed to a computer program product comprising a computer readable medium having control logic (computer software) stored therein. The control logic, when executed by processor 304, causes processor 304 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

Computer 302 also includes input devices 322 and display devices 324. Input devices 322 include a keyboard, a mouse, a microphone, a camera, etc. Display devices 324 include a computer monitor, a printer, a speaker, a projector, etc.

2. A Preferred Software Programming Language and Network Architecture

As discussed above, computer programs when executed, enable computer 302 to perform the functions of the present invention as discussed herein. In a preferred embodiment, the present invention is implemented using computer programs written in an object-oriented programming language. Object-oriented programming is a type of programming in which programmers define not only the data type of a data structure, but also the types of operations (functions) that can be applied to the data structure. In this way, the data structure becomes an object that includes both data and functions. In addition, programmers can create relationships between one object and another. For example, objects can inherit characteristics from other objects.

One of the principal advantages of object-oriented programming techniques over procedural programming techniques is that they enable programmers to create modules that do not need to be changed when a new type of object is added. A programmer can simply create a new object that inherits many of its features from existing objects. This makes object-oriented programs easier to modify. To perform object-oriented programming, one needs an object-oriented programming language (OOPL). C++ and Smalltalk are two of the more popular languages, and there are also object-oriented versions of Pascal.

While a preferred embodiment of the present invention is implemented using computer programs written in an object-oriented programming language, the present invention can also be implemented using procedural programming languages, etc.

As discussed above, one or more of computers 302 is connected by a network. A preferred embodiment of the present invention uses a type of network architecture called a peer-to-peer object architecture. Before peer-to-peer object architecture can be understood, a type of network architecture called client/server architecture must be described.

Client/server architecture is a network architecture in which each computer or process on the network is either a client or a server. Servers are computers or processes dedicated to managing disk drives (file servers), printers (print servers), applications/functions or network traffic (network servers). In fact, a server is any computer or device that allocates resources for an application. Clients are personal computers or workstations on which users run applications. Clients rely on servers for resources, such as files, devices, execution of functions and even processing power.

FIG. 4 illustrates the dynamic steps to establish communication that occur between a client and a server executing an object-oriented program. In FIG. 4A, the client has switchboard object 402 and listen object 404 waiting for a request from the server. In FIG. 4B, init object 406 determines that it needs to perform a specific task. In FIG. 4C, init object 406 creates comm object 408. Comm object 408 is used to communicate with the client. Then, comm object 408 makes a connection to listen object 404 in FIG. 4D. Once comm object 408 makes the connection, listen object 410 creates comm object 410 and relocates comm object 410 to switchboard object 402. Comm object 410 is used to communicate back to the server (i.e., between the two piers), via comm object 408.

Figure 4A:
FIG. 4 illustrates the dynamic steps to establish communication between a client and a server executing an object-oriented program. For illustration purposes.
Figure 4B:
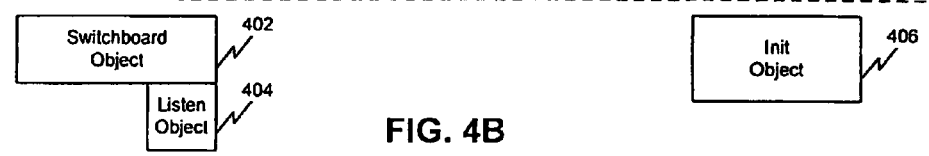
Figure 4C:
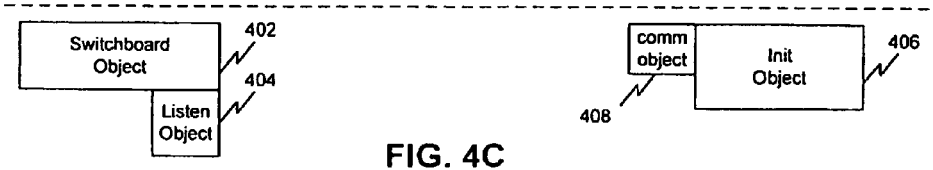
Figure 4D:
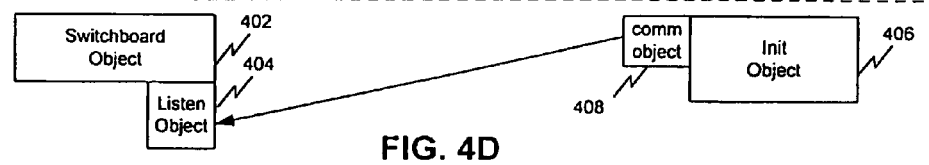
Figure 4E:
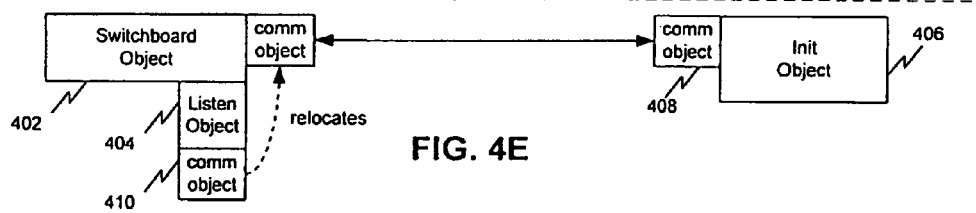
Figure 4F:
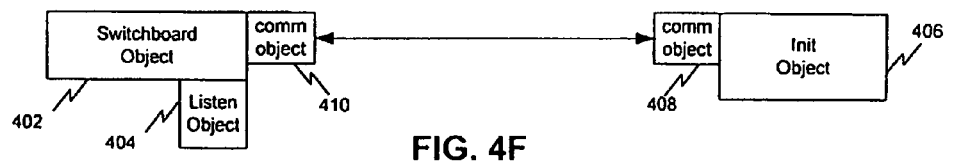
Figures 4G, 4H, 4I:
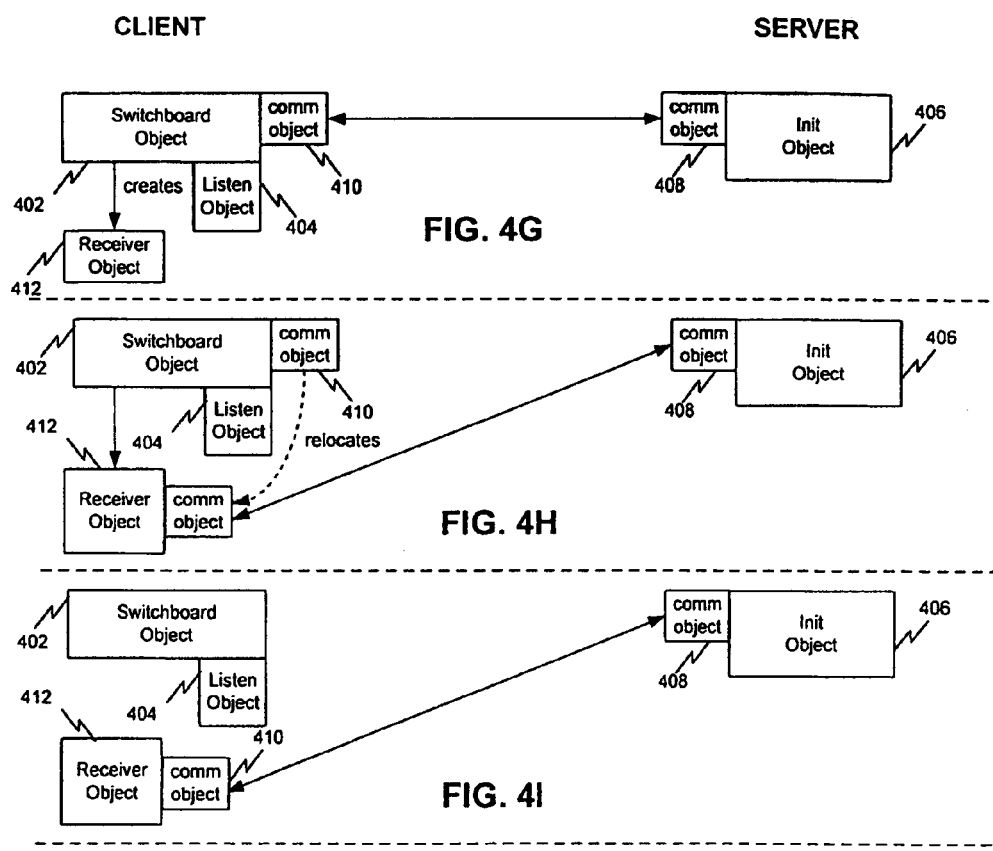

At this point, as shown in FIG. 4F, there is two-way communication between the client and the server (i.e., between the two piers) through comm object 408 and comm object 410. Init object 406 knows which receiver object needs to be created by the client (i.e., receiving pier) to preform the specific task required. Therefore, once this communication is established, init object 406 sends a request to the client (i.e., receiving pier) to create the specific receiver object. In FIG. 4G, switchboard object 402 receives the request, via comm object 410, and creates receiver object 412. Once receiver object 412 is created, comm object 410 is relocated to receiver object 412 in FIG. 4H. Now, as shown in FIG. 4I, init object 406 and receiver object 412, via comm object 408 and comm object 410, can communicate back and forth until receiver object 412 completes the task requested by init object 406.

As stated above, a preferred embodiment of the present invention uses a type of network architecture called a peer-to-peer object architecture. A peer-to-peer object architecture is when each computer in the network has equivalent capabilities and responsibilities. This differs from client/server architectures, in which some computers are dedicated to serving the others. Therefore, in a preferred embodiment of the present invention, all computers 302 can operate as either a server or a client.

As discussed above, one advantage of using an object-oriented programming language is that it allows programmers to create modules that do not need to be changed when a new type of object is added. This advantage will be further illustrated as the present invention is described in detail.

C. AUTHENTICATION SERVER DATA OF THE PRESENT INVENTION

As stated above, server 104 of FIG. 1 is the engine of system 102. In fact, it is this engine that ultimately determines whether or not a user is authenticated by system 102. In addition, server 104 stores data accessed by system 102. The data stored in server 104 can be configured in one of two ways. One way is through the use of a database. The other way is through the use of a directory.

The first way that data in server 104 can be configured involves the use of a database to facilitate access to the data.

In general, a database is a collection of information organized in such a way that a computer program can quickly select desired pieces of data. A database is similar to an electronic filing system. To access information from a database, you need a database management system (DBMS). This is a collection of programs that enables you to enter, modify, organize, and select data in a database.

Traditional databases are organized by tables, fields, records and files. A field is a single piece of information; a record is one complete set of fields; and a file is a collection of records. For example, a telephone book is analogous to a file. It contains a list of records, each of which consists of three fields: name, address, and telephone number.

An alternative concept in database design is known as Hypertext. In a Hypertext database, any object, whether it be a piece of text, a picture, or a film, can be linked to any other object. Hypertext databases are particularly useful for organizing large amounts of disparate information, but they are not designed for numerical analysis.

The present invention may also be implemented using a standard database access method called Open DataBase Connectivity (ODBC). The goal of ODBC is to make it possible to access any data from any application, regardless of which DBMS is handling the data. ODBC manages this by inserting a middle layer, called a database driver, between an application and the DBMS. The purpose of this layer is to translate the application's data queries into commands that the DBMS understands. For this to work, both the application and the DBMS must be ODBC-compliant—that is, the application must be capable of issuing ODBC commands and the DBMS must be capable of responding to them.

The second way that data in server 104 can be configured involves the use of a directory to facilitate access to the data. A preferred embodiment of the present invention utilizes a hierarchical directory called a X.500 directory. X.500 directories are hierarchical with different levels for each category of information, such as country, state, and city. In addition to utilizing a X.500 directory, a Lightweight Directory Access Protocol (LDAP) may also be utilized.

LDAP is a set of protocols for accessing directories. LDAP is based on the standards contained within the X.500 standard, but is significantly simpler. And unlike X.500, LDAP supports TCP/IP, which is necessary for any type of Internet access. Although not yet widely implemented, LDAP should eventually make it possible for almost any application running on virtually any computer platform to obtain directory information, such as email addresses and public keys. Because LDAP is an open protocol, applications need not worry about the type of server hosting the directory.

In the following sections, the various collections of data stored in server 104 are first discussed with reference to FIG. 5. Next, with reference to FIG. 6, a typical sequence of steps an administrator may take to initially setup server 104 is discussed. Engine functions of server 104 is discussed in Section D with reference to FIGS. 7-13.

1. Data Stored in Server

Figure 5:
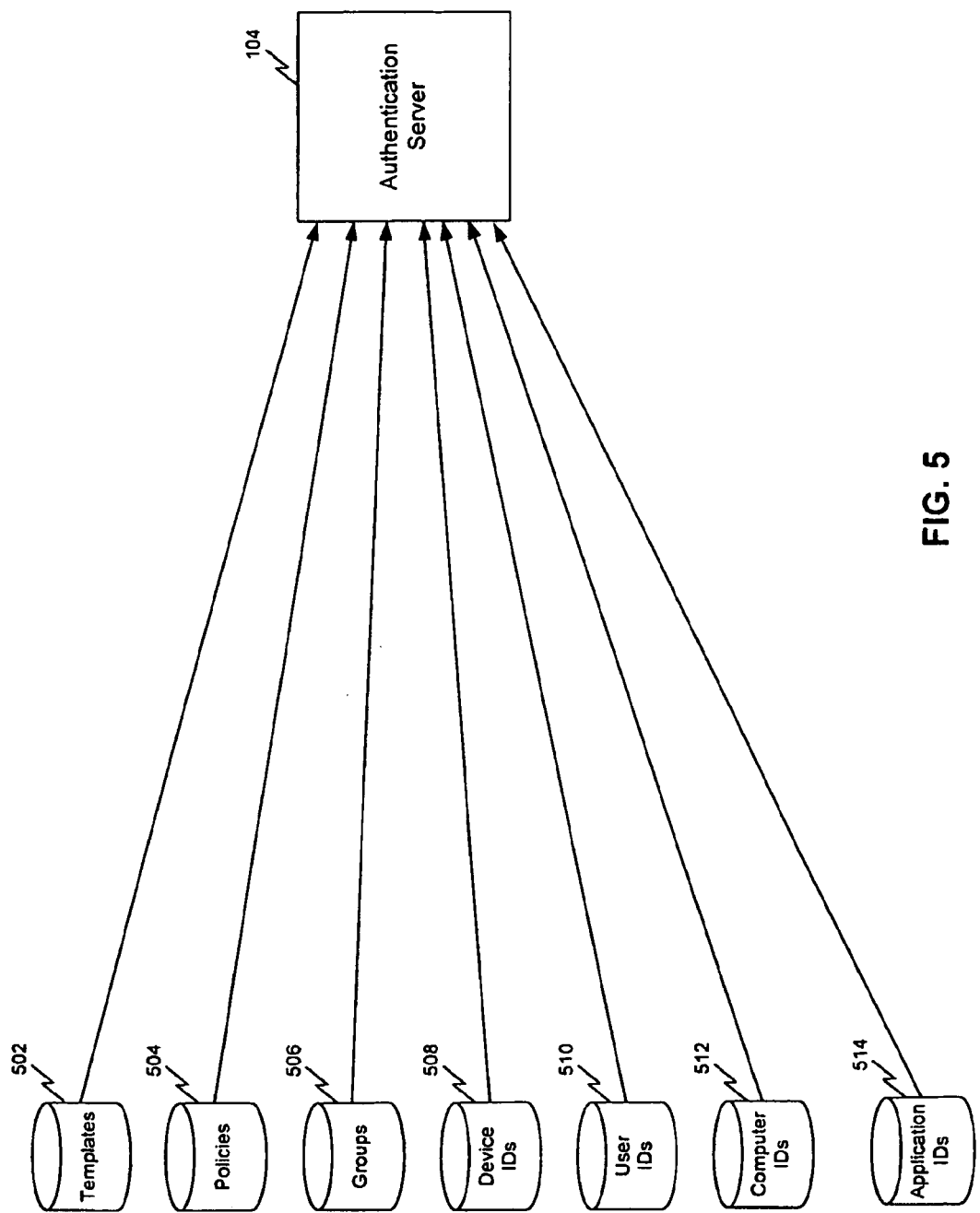
FIG. 5 illustrates various collections of data stored in an authentication server according to a preferred embodiment of the present invention.

In FIG. 5, server 104 (FIG. 1) stores collections of templates 502, policies 504, groups 506, device IDs 508, user IDs 510, computer IDs 512 and application IDs 514. One or more unique template 502 is created and stored in server 104 each time a user enrolls on a different device. Template 502 stores the user's unique measurement for a particular biometric device (which is then used to match against the user's "live" measurement when the device is attempting to identify the user) or password, etc., for a non-biometric device.

Policies 504 determine the method or way in which a user is to be authenticated by server 104. Specific examples of pre-defined policies provided by the present invention include an OR policy, an AND policy, a CONTINGENT policy, a RANDOM policy, a THRESHOLD policy, a multi-user policy, a multi-location policy, a multi-template policy, a user dependent policy, a location restriction policy, and a computer/device specific policy. The present invention also allows the administrator to define or configure other policies 504.

Each pre-defined policy 504 has a list of devices associated with it. The list of devices identifies the devices that are used to execute the particular policy 504. Each device in the list of devices may have a threshold value and a timeout value associated with it (this is typically true with biometric devices). The threshold value (e.g., false acceptance rate) indicates the level of identification the device must determine for the user to pass the device. The timeout value indicates the time in which the device has to identify the user to the level of identification indicated by the threshold value.

Figure 44:
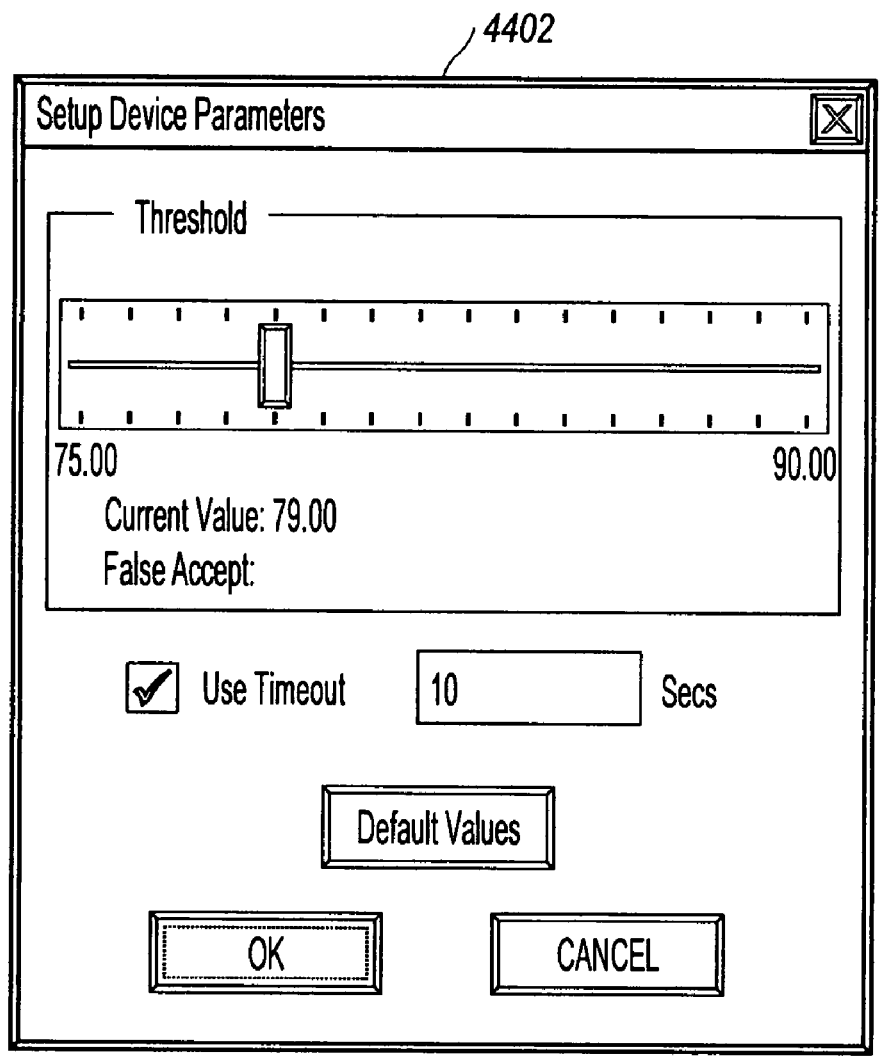
FIG. 44 is an exemplary GUI screen for configuring the threshold and timeout values according to a preferred embodiment of the present invention.

An exemplary graphical user interface (GUI) screen for configuring the threshold and timeout values is shown in FIG. 44. Referring to FIG. 44, GUI screen 4402 includes a slider may be used to adjust the threshold value. Here, the threshold value ranges from 75.00 to 90.00. The administrator may also specify the number of seconds to use for the timeout value. Once the threshold and timeout values are specified, the administrator clicks on the "OK" button. Alternatively, the administrator may click on the "Default Values" button and the threshold and timeout values will each be set to a predetermined default value.

Each administrator defined policy 504 can either have a list of policies or a list of policies or devices. The list of policies identifies the policies that are used to execute the particular policy 504. The list of policies or devices identifies the policies and/or devices that are used to execute the particular policy 504.

FIG. 5 illustrates that groups 506 are also stored in server 104. Groups 506 are a logical way of combining one or more users that need access to the same set of resources. For example, all users in the accounting department of an enterprise need specific resources to perform accounting tasks. Therefore, one of group 506 can be defined as "accounting group." Here, when a user is put into "accounting group," that user (once authenticated by system 102) has access to the same resources as all the other users in "accounting group."

Each user can be put into one or more groups 506. When the user attempts to gain access to a resource in a particular group, the user must be authenticated by whichever policy 504 is associated with that particular group. When a user first attempts to log into network system 202, system 102 may be implemented so that the user has a default group 506 and is therefore first authenticated by the policy 504 associated with the user's default group 506. An example of default groups 506 may be dependent on the location from which the user is attempting to gain access to network system 202. Possible different locations include from a location within network system 202 itself and from a remote location outside of network system 202.

Another way in which multiple groups 506 for a single user may be implemented in system 102 is to query the user for the group 506 in which the user wishes to be authenticated into. An additional way is for system 102 to prioritize each user's group 506. Here, if the user is authenticated by system 102 into a group 506 with a higher priority, then the user is automatically authentication into the user's groups 506 that have a lower priority. One possible way in which the priority scheme may be implemented is to give a higher priority to groups 506 that the most difficult policies 504 associated with them.

A device ID 508 identifies a device. Each device has a unique ID. Thus, the collection of device IDs 508 of FIG. 5 allows the present invention to uniquely identify each device in network system 102 (FIG. 2). Similarly, a user ID 510 uniquely identifies a user in network system 102.

As discussed above, various points a user may be required to be authenticated at by system 102 include network system 202, one or more host computers, application 204 and/or user computer 208 of FIG. 2. Each computer 208 and application 204 within network system 202 must be registered. This registration is done by assigning unique IDs to each computer 208 and application 204, as will be discussed below. A computer ID 512 uniquely identifies each computer 208 in network system 202. Similarly, an application ID 514 uniquely identifies each application 204 in network system 202. Thus, collections of computer IDs 512 and application IDs 514 allow the present invention to uniquely identify each location in network system 120 that a user may be required to be authenticated at by system 102.

2. Setup of Server Data

Figure 6:
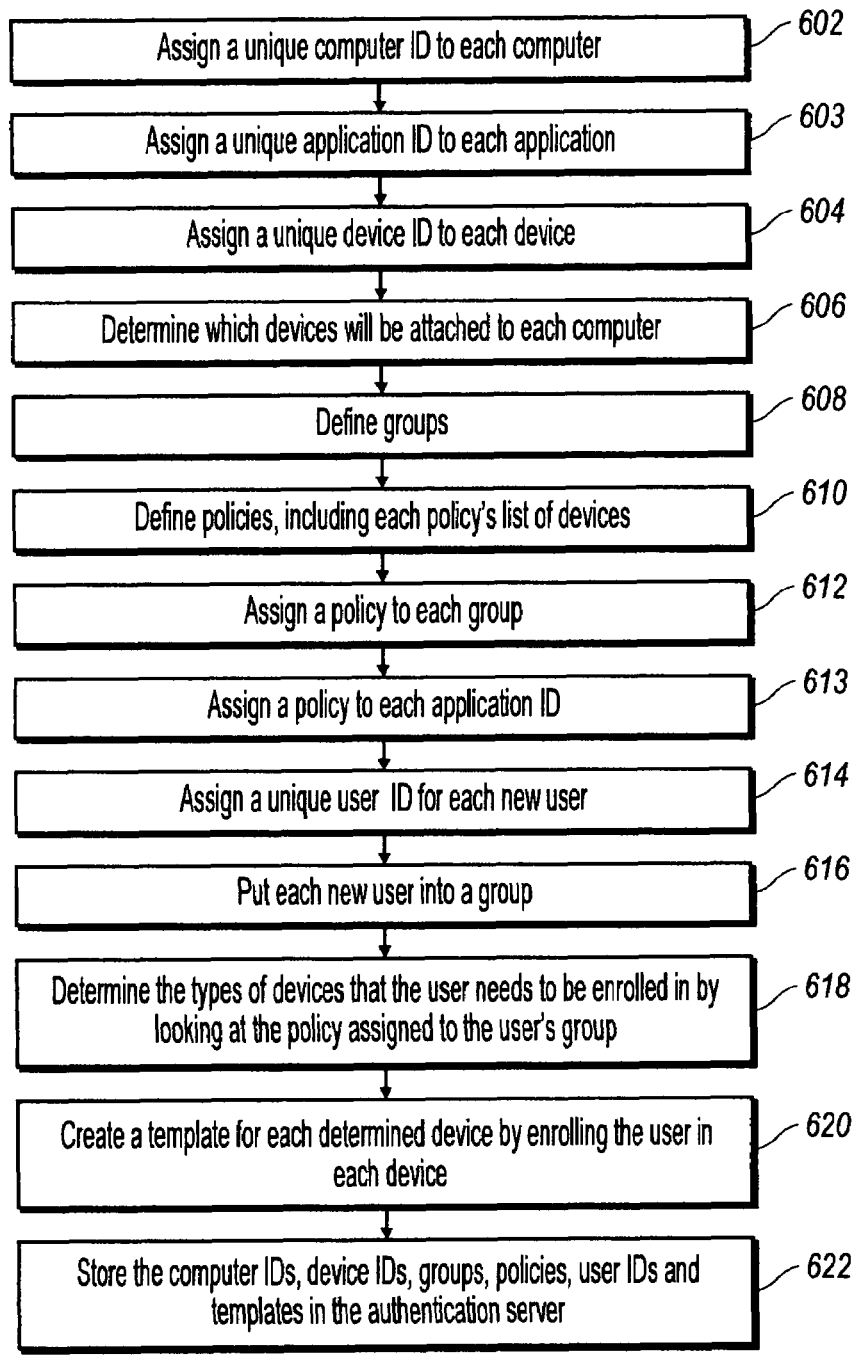
FIG. 6 is a flowchart illustrating a typical sequence of steps an administrator may take to initially setup the authentication server according to a preferred embodiment of the present invention.

In the present invention, preferably the administrator of system 102 determines the data that is stored in server 104. FIG. 6 is a flowchart illustrating a typical sequence of steps an administrator may take to initially setup server 104. In step 602, a unique computer ID 512 is assigned to each computer in network system 202. In step 603, a unique application ID 514 is assigned to each application in network system 202. Similarly, in step 604, a unique device ID 508 is assigned to each device in network system 202. Next, as shown in step 606, a determination is made as to which devices will be attached to each computer 208 (FIG. 2).

Figure 51:
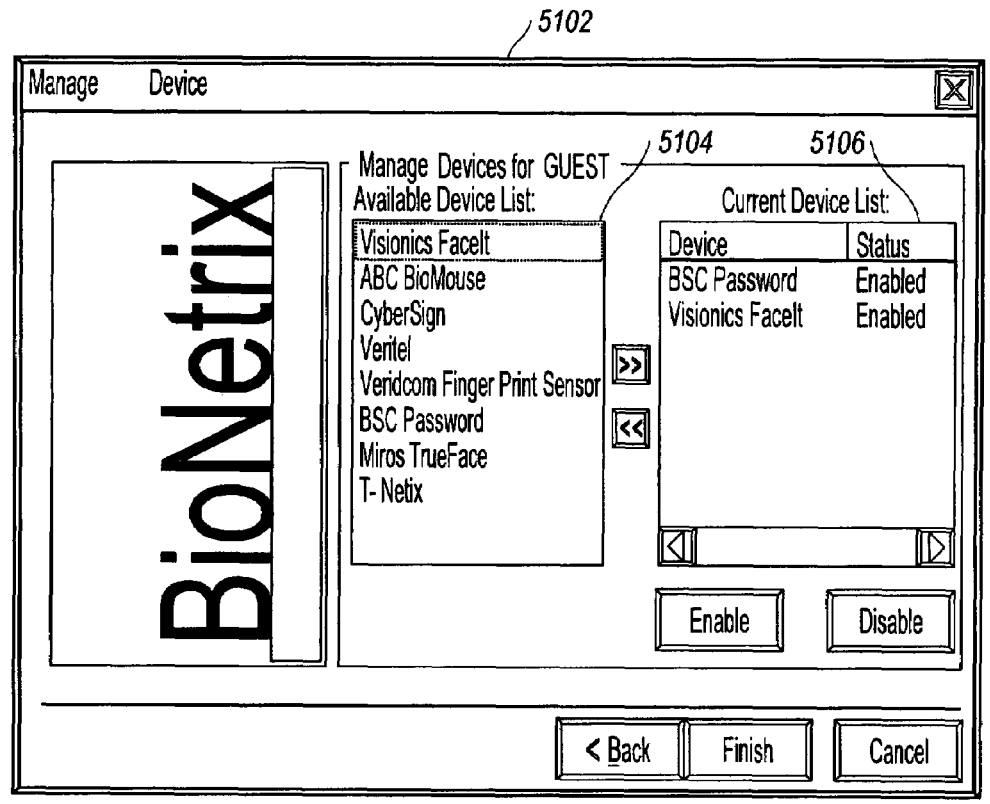
FIG. 51 is an exemplary GUI screen for managing devices according to a preferred embodiment of the present invention.
Figure 52:
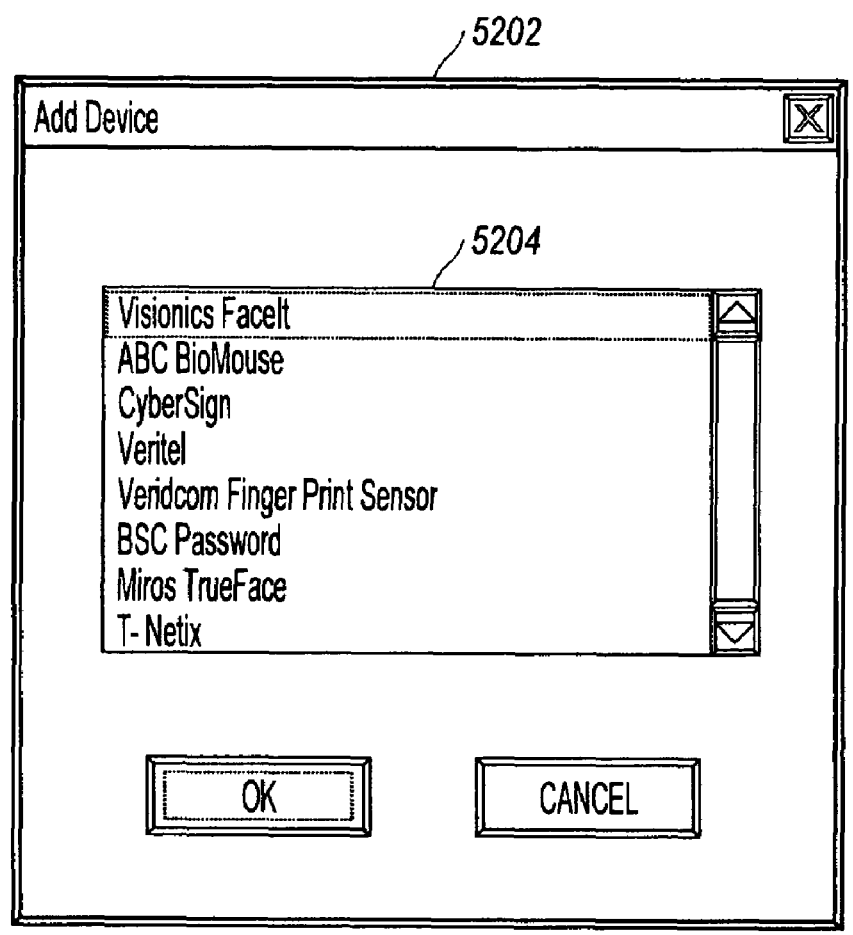
FIG. 52 is an exemplary GUI screen for adding devices according to a preferred embodiment of the present invention.

Exemplary GUI screens for managing and adding devices are shown in FIGS. 51 and 52, respectively. Referring to FIG. 51, GUI screen 5102 includes a available device list window 5104 and a current device list window 5106. For a particular user (via a user ID 510) indicated in screen 5102, window 5106 indicates the devices that the particular user is enrolled in (out of the available devices in system 102 listed in window 5104). Referring to FIG. 52, GUI screen 5202 includes window 5204 which lists devices that the administrator can add to system 102.

Figure 56:
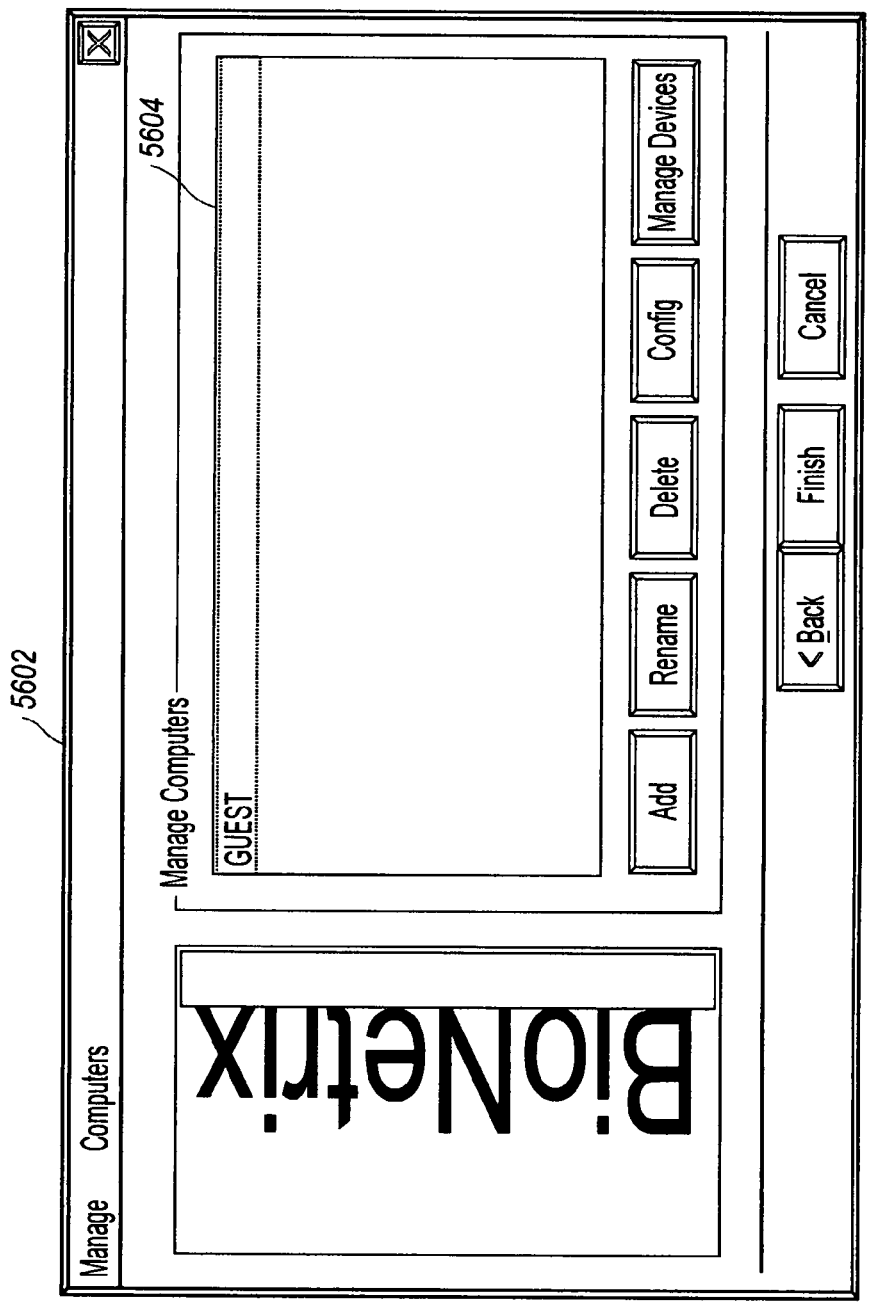
FIG. 56 is an exemplary GUI screen for managing computers according to a preferred embodiment of the present invention.

An exemplary GUI screen for managing computers is shown in FIG. 56. Referring to FIG. 56, GUI screen 5602 includes a manage computers window 5604 which lists the computers (via computer IDs 512) that are defined by system 102. The administrator simply highlights one of the computer IDs 512 and clicks on either the "Add," "Rename," "Delete," "Config," or "Manage Devices" button. The "Add" button allows an administrator to add a computer to system 102. The "Delete" button causes the highlighted computer ID 512 to no longer be included as one the computers currently defined or available in system 102. The present invention allows the administrator to rename the highlighted computer ID 512 by clicking on the "Rename" button. The "Config" button allows the administrator to configure the highlighted computer ID 512. When the administrator clicks on the "Manage Devices" button, this causes GUI screen 5102 of FIG. 51 to be displayed.

Figure 55:
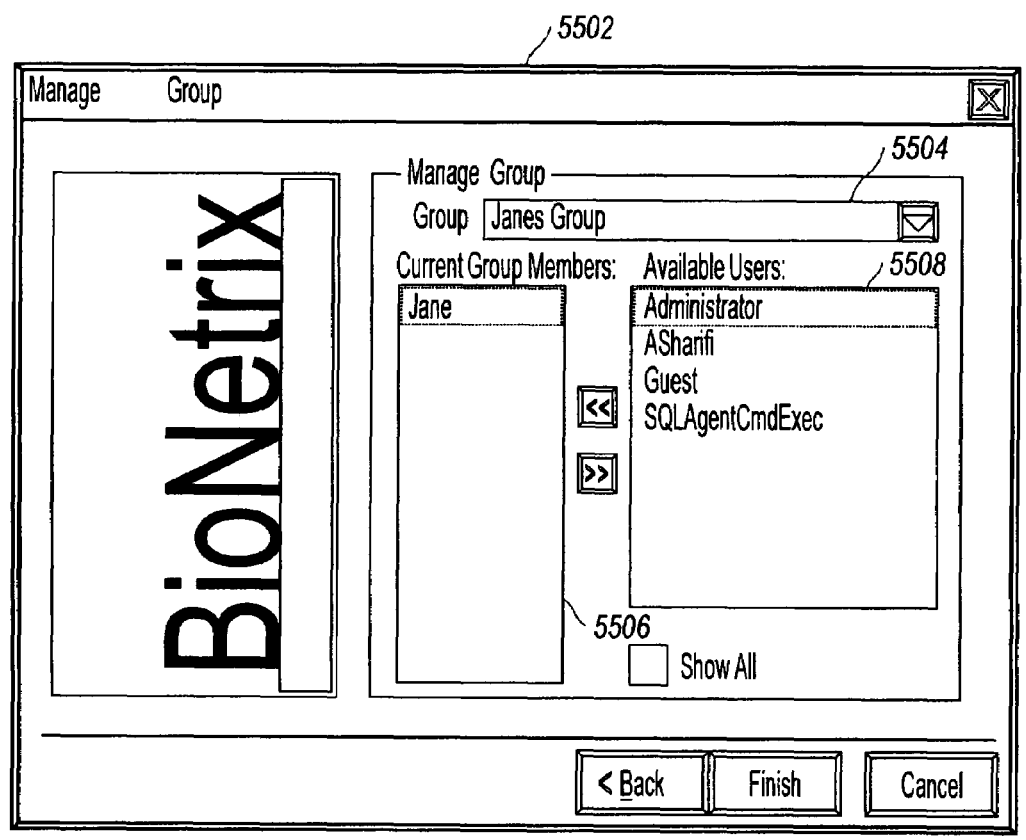
FIG. 55 is an exemplary GUI screen for managing groups according to a preferred embodiment of the present invention.

In step 608, groups 506 to be used within system 102 are defined. In particular, the administrator defines each group 504 by determining a logical grouping of resources within network system 202 that each member of that group 504 will need to access. An exemplary GUI screen for managing groups 504 is shown in FIG. 55. Referring to FIG. 55, GUI screen 5502 includes a manage group window 5504, a current group members window 5506 and an available users window 5508. For the particular group indicated in screen 5502, window 5506 lists the current members or users (via user IDs 510) of that group and window 5508 lists the members (via user IDs 510) that could be added to the particular group.

Figure 38:
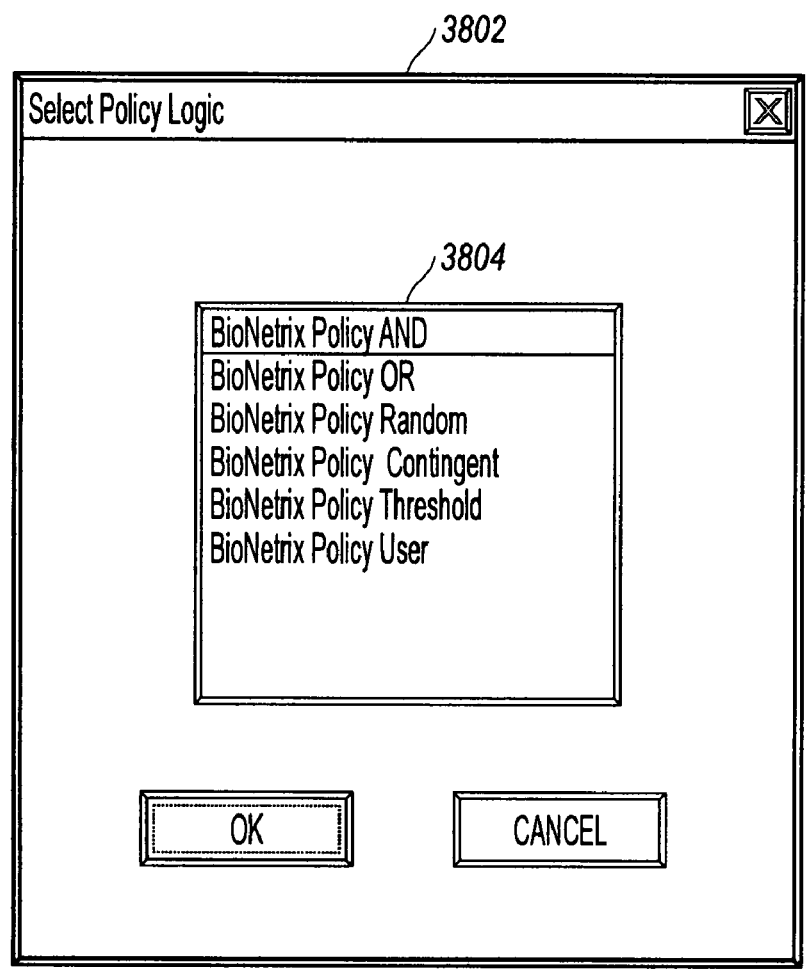
FIG. 38 is an exemplary GUI screen for selecting policy logic according to a preferred embodiment of the present invention.

Next, in step 610, policies 504 are defined. Each policy 504 has associated with it a list of devices. Policies 504 determine the method or way in which a user is to be authenticated by server 104. One policy 504 is assigned to each group 506 in step 612. An exemplary GUI screen for selecting policy 504 logic is shown in FIG. 38. Referring to FIG. 38, GUI screen 3802 includes window 3804. Window 3804 lists policies 504 that the administrator can use to create the administrator defined policies.

Figure 45:
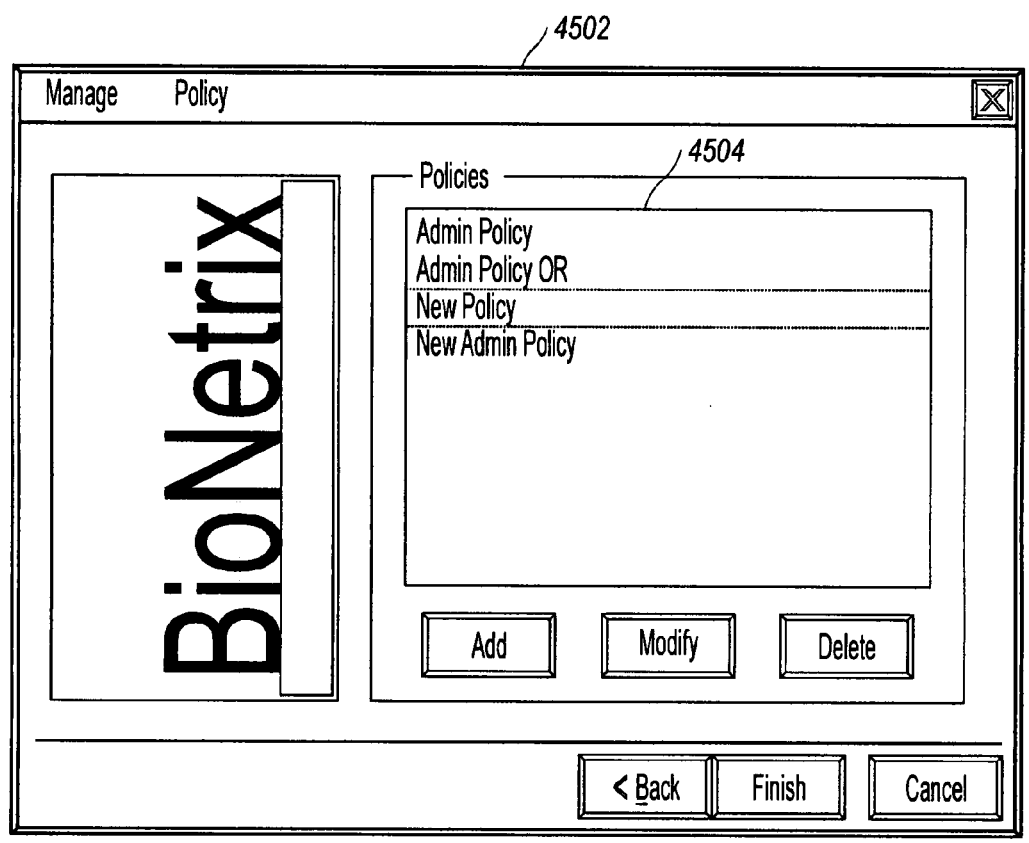
FIG. 45 is an exemplary GUI screen for managing policies according to a preferred embodiment of the present invention.
Figure 46:
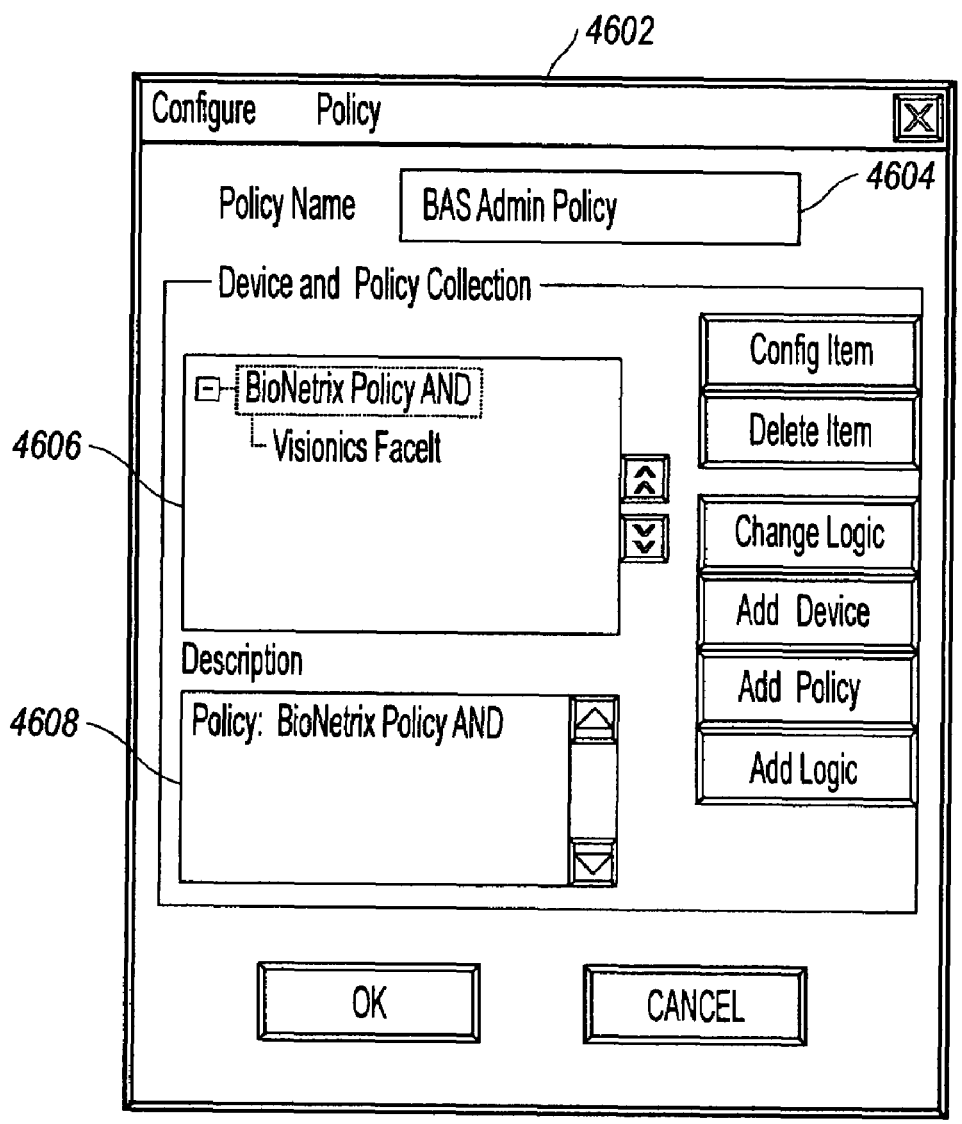
FIG. 46 is an exemplary GUI screen for configuring policies according to a preferred embodiment of the present invention.

In step 613, one policy 504 is assigned to each application ID 514. Exemplary GUI screens for managing and configuring policies 504 are shown in FIGS. 45 and 46, respectively. Referring to FIG. 45, GUI screen 4502 includes a window 4504 that lists currently defined policies 504 in system 102 in alphabetical order. Defined policies 504 may be predefined or defined by the administrator. The administrator simply highlights one of the policies 504 and clicks on either the "Add," "Modify," or "Delete" button. The "Delete" button causes the highlighted policy to no longer be included as one the policies currently defined or available in system 102. The present invention allows the administrator to define a new policy by highlighting "New Policy" and clicking on the "Add" button. The "Modify" button allows the administrator to modify or configure the highlighted policy. When the administrator clicks on either the "Add" or the "Modify" button, this causes the GUI screen of FIG. 46 to be displayed.

Referring to FIG. 46, GUI screen 4602 includes three windows, a policy name window 4604, a device and policy collection window 4606 and a description window 4608. For the particular policy referenced in the policy name window 4604, the device and policy collection window 4606 displays the policies and devices defined for it and the description window 4608 displays a description of it.

Figure 47:
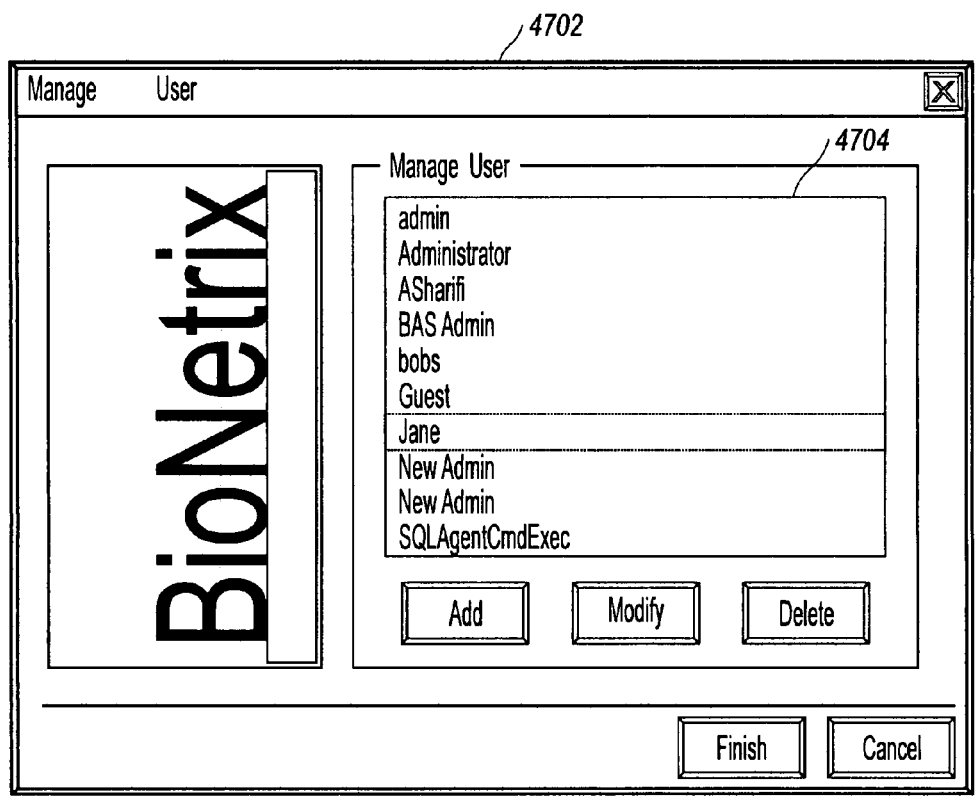
FIG. 47 is an exemplary GUI screen for managing users according to a preferred embodiment of the present invention.
Figure 48:
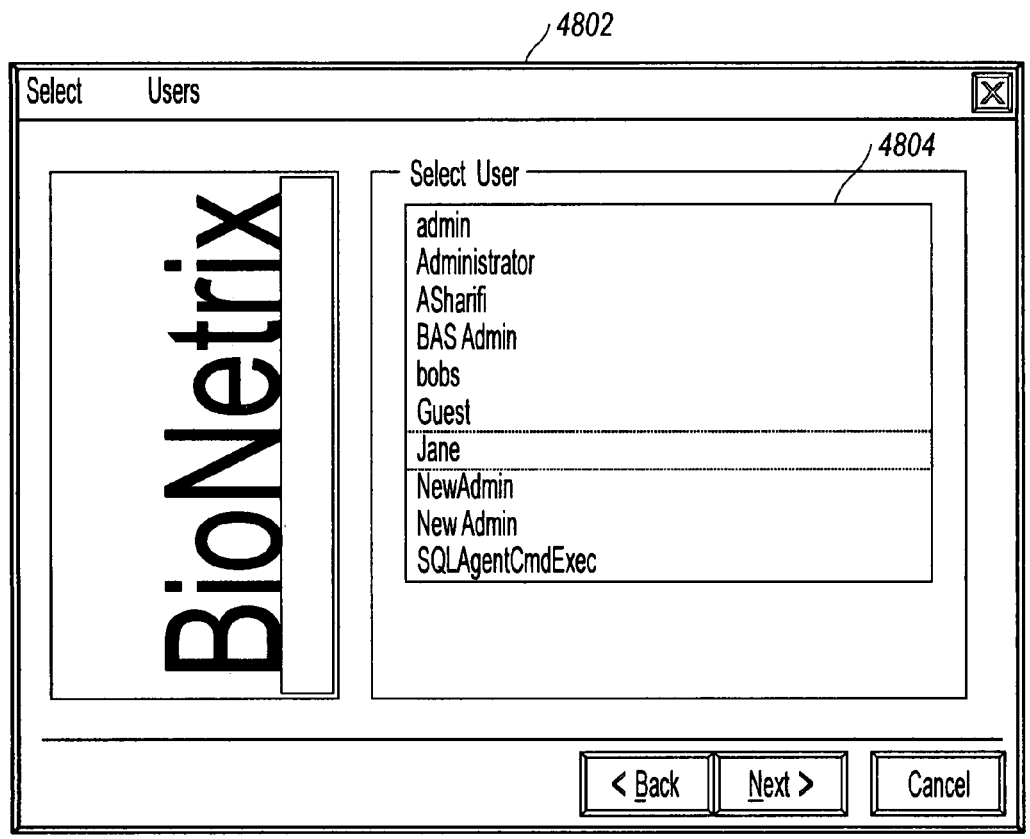
FIG. 48 is an exemplary GUI screen for selecting users according to a preferred embodiment of the present invention.

In step 614, for every user that needs to gain access to network system 202 resources, the user is assigned a unique user ID 510. Then, each new user is put into a group 506 in step 616. Exemplary GUI screens for managing and selecting a user ID 510 are shown in FIGS. 47 and 48, respectively. Referring to FIG. 47, GUI screen 4702 includes a window 4704 that lists currently enrolled user IDs 510 in system 102 in alphabetical order. The administrator simply highlights one of the user IDs 510 and clicks on either the "Add," "Modify," or "Delete" button. The "Delete" button causes the highlighted user ID 510 to no longer be enrolled in system 102. The present invention allows the administrator to enroll a new user ID 510 by clicking on the "Add" button. The "Modify" button allows the administrator to modify or configure the highlighted user ID 510. Referring now to FIG. 48, GUI screen 4802 includes a window 4804 that also lists currently enrolled user IDs 510 in system 102 in alphabetical order. SGI screen 4802 may be used by the administer to add the user to a group or policy, and so forth.

Figure 49:
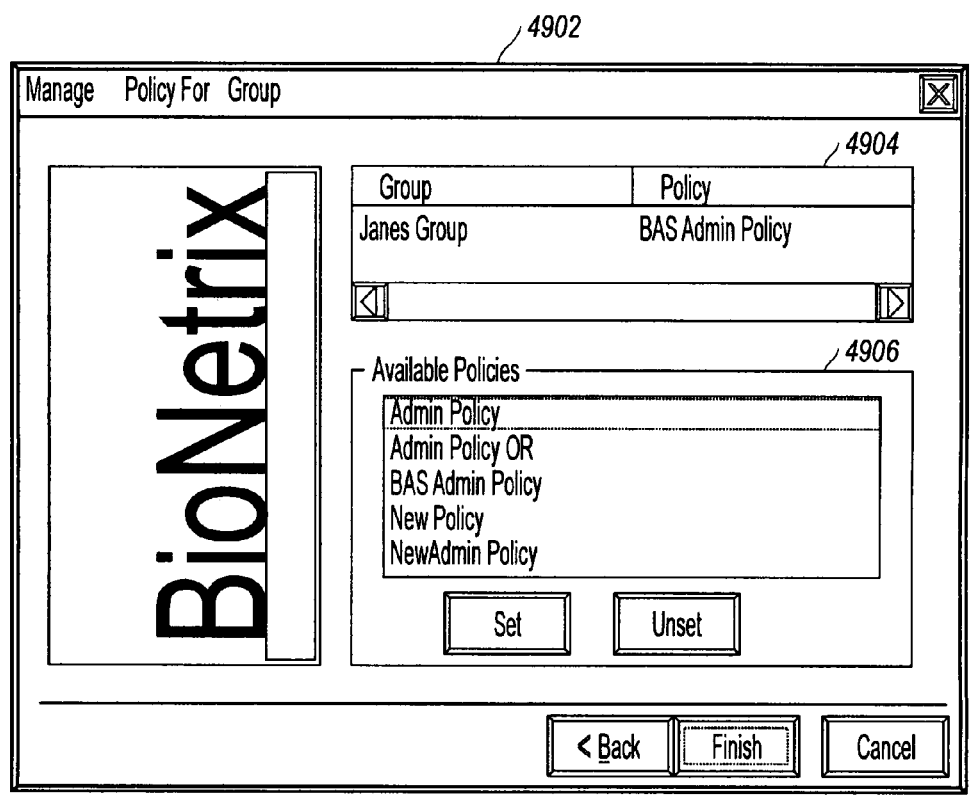
FIG. 49 is an exemplary GUI screen for managing policies for groups according to a preferred embodiment of the present invention.

Once the user's group 506 is determined, then in step 618, the types of devices the user needs to be enrolled in are determined by looking at the policy 504 assigned to the user's group 506. An exemplary GUI screen for managing policies 504 for groups 506 is shown in FIG. 49. Referring to FIG. 49, GUI screen 4902 includes a group/policy window 4904 and an available policies window 4906. Window 4904 indicates the policy that is assigned to the particular group displayed. Window 4906 lists the current policies in system 102.

Once it is known which policy 504 will be applied, a template 502 is created for each device 508 associated with the policy 504 by enrolling the user in each device. This is shown in step 620. Alternatively, a template 502 can be created for each device within network system 202.

Figure 50:
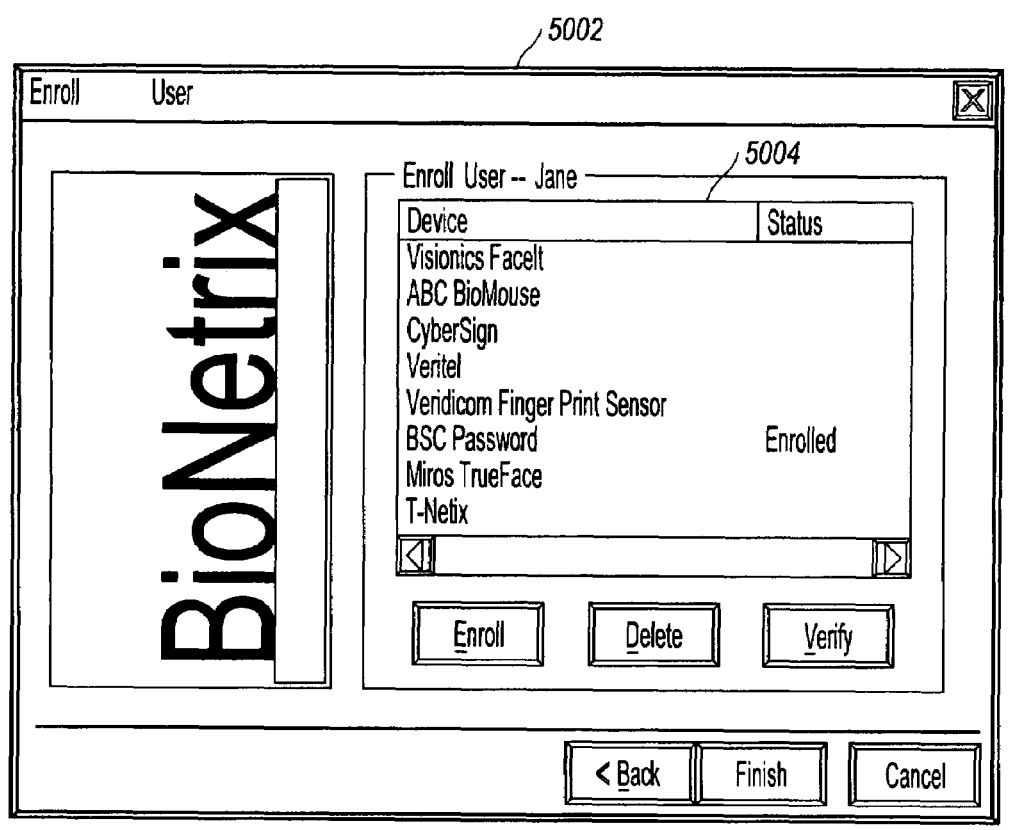
FIG. 50 is an exemplary GUI screen for enrolling users with one or more devices according to a preferred embodiment of the present invention.
Figure 53:
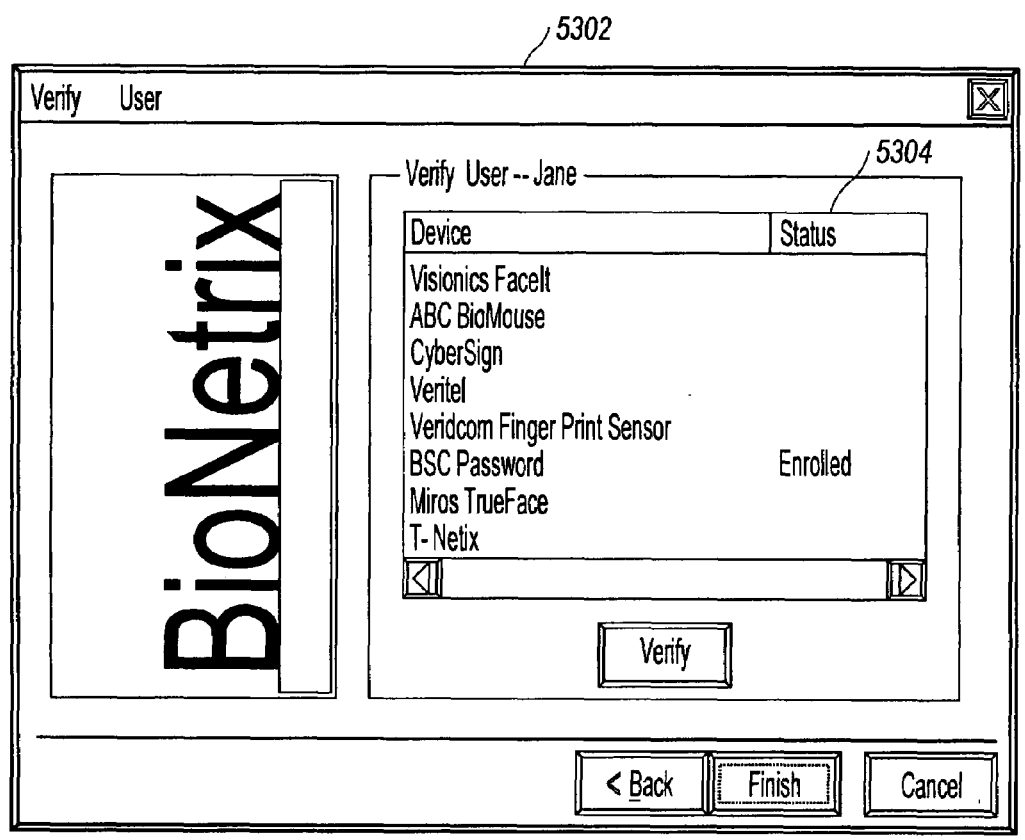
FIG. 53 is an exemplary GUI screen for verifying which devices a particular user is enrolled in according to a preferred embodiment of the present invention.

An Exemplary GUI screen for enrolling users with one or more devices is shown in FIG. 50. Referring to FIG. 50, GUI screen 5002 includes a device/status window 5004. For the particular user ID displayed in screen 5002, window 5004 indicates, for each device enrolled in system 102, which devices the particular user is enrolled in. An exemplary GUI screen for verifying which devices a particular user is enrolled in is shown in FIG. 53. Referring to FIG. 53, GUI screen 5302 includes a device/status window 5304. For the particular user ID displayed in screen 5302, window 5304 indicates, for each device enrolled in system 102, which devices the particular user is enrolled in and thus can be used to verify the user with.

Finally, in step 622, each computer ID 512, device ID 508, group 506, policy 504, user ID 510, template 502 and application ID 514 is stored in server 104.

The steps shown in FIG. 6 can be performed in a variety of orders as should be apparent to those skilled in the art. Once server 104 is setup (i.e., templates 502, policies 504, groups 506, device IDs 508, user IDs 510, computer IDs 512 and application IDs 514 are all defined) the administrator may interact via a GUI to customize server 104.

Figure 14:
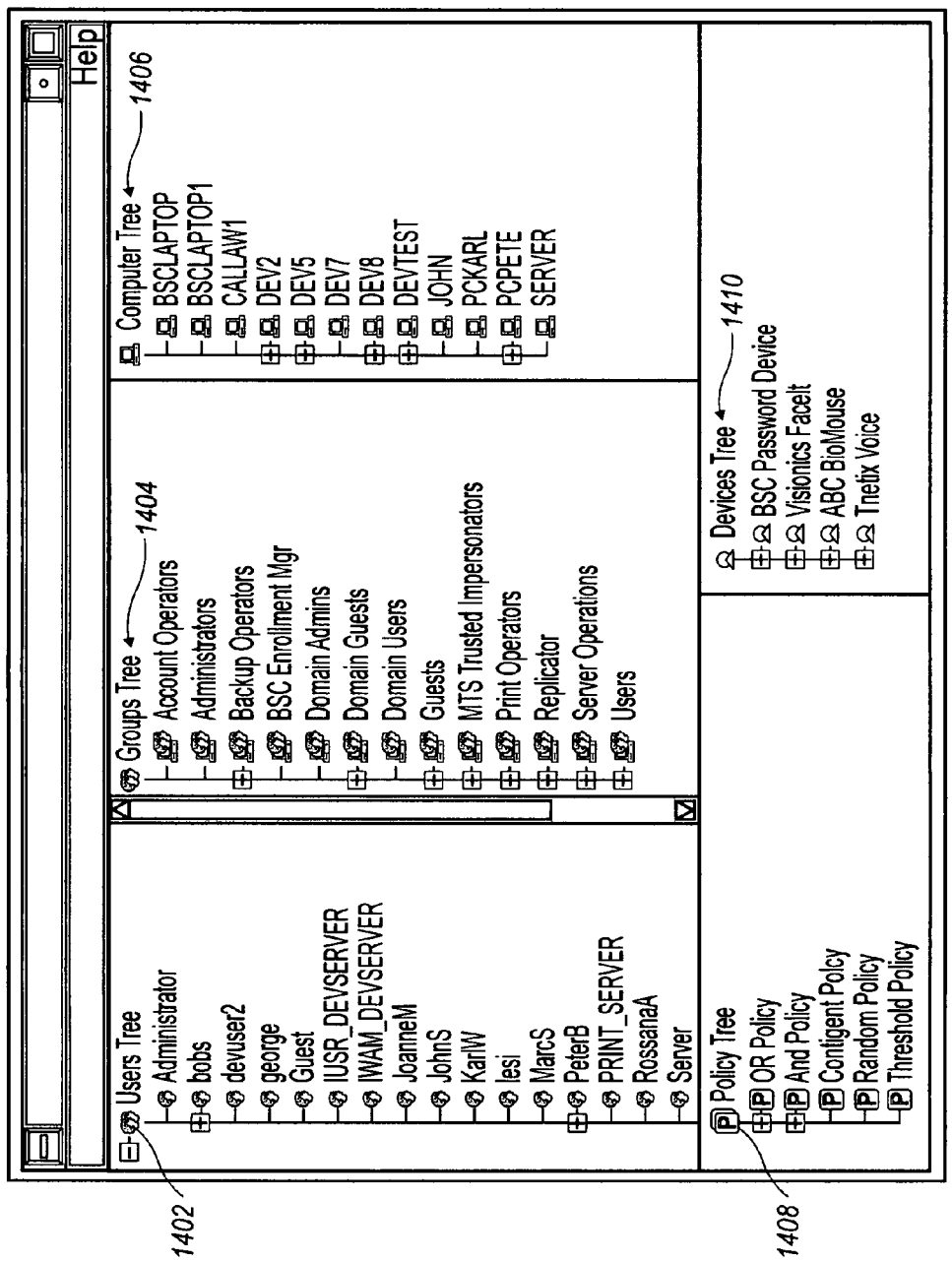
FIG. 14 is a window or screen shot generated by the graphical user interface according to a preferred embodiment of the present invention.

FIG. 14 is a sample window or screen shot generated by the GUI of the present invention. FIG. 14 illustrates the data stored in server 104 as being logically stored in five tree structures (with the exclusion of application IDs 514). The five tree structures include users tree 1402, groups tree 1404, computers tree 1406, policy tree 1408 and devices tree 1410. Users tree 1402 includes a list of user IDs 510 registered by the administrator. As illustrated in FIG. 14, "Administrator" and "bobs" are two examples of user IDs 510. Groups tree 1404 includes a list of groups 506 as defined by the administrator. Examples of groups include "Account Operators" and "Administrators."

Computers tree 1406 includes a list of computer IDs 512. The list of computer IDs 512 represent the computers registered by the administrator. Examples of computer IDs 512 includes "BSCLAPTOP" and "BSCLAPTOP1." The fourth tree illustrated in FIG. 14 is policy tree 1408. Policy tree 1408 includes the list of both pre-defined and administrator-defined policies 504. Pre-defined policies 504 include "OR policy," "AND policy," "CONTINGENT policy," "RANDOM policy" and "THRESHOLD policy" (as shown in FIG. 14). Additional policies not shown in FIG. 14 include "multi-user policy," "multi-location policy," "multi-template policy," "user dependent policy," "location restriction policy," and "computer/device specific policy." Finally, devices tree 1410 includes a list of device IDs 508 registered by the administrator. Examples of device IDs include "BSC Password Device" and "Visionics FaceIt."

An additional tree structure not shown in FIG. 14 is an application tree. As discussed above, a user may be required to be authenticated if the user attempts to access a particular application associated with a policy 504. Although an application tree is not shown in the sample window of FIG. 14, the GUI of the present invention may be modified to include not only an application tree, but any other type of tree the administrator may deem to be desirable.

The present invention also allows for an administrator to define information groups. Information groups are a logical way of combining users that need access to the same types of information within each application in network system 202. For example, one possible type of application within network system 202 is a database containing information about each user. The administrator of system 102 may determine that only the human resource department should have access to user medical information. Here, one information group can be defined as "medical information." The users put into "medical information" are only those users in the human resource department. Therefore, a policy 504 can be associated either directly with an application ID or with an information group to authenticate users prior to allowing them access to information in applications.

The present invention, through the use of the GUI, is preferably implemented as a "drag and drop" application. "Drag and drop" applications allow an administrator to drag objects to specific locations on the screen to perform actions on them. For example, in the Macintosh environment, you can drag a document to the trashcan icon to delete it. This is a classic case of "drag and drop" functionality. When implemented well, drag-and-drop functionality is both faster and more intuitive than alternatives, such as selecting options from a menu or typing in commands. Nevertheless, the present invention is not limited to being implemented as a "drag and drop" application.

Referring back again to FIG. 14, an example of "drag and drop" functionality is the ability of the administrator to drag the "OR Policy" to the "Administrators" group to either define or redefine the policy for that group. Another example includes dragging user ID "Administrator" to the "Administrators" group. Now, the user who has user ID "Administrator" must pass the "OR Policy" to be authenticated by system 102 (FIG. 1).

The administrator may also drag a policy 504 to an application ID 514 (not shown in FIG. 14). For example, if the administrator drags the "AND Policy" to a particular application ID, then every user who attempts to access the application (that the application ID is assigned to) must pass the "AND Policy." Thus, the present invention provides different levels of authentication granularity. For example, a particular user may be assigned to a group 506 that allows access to a spreadsheet if the user passes two devices. However, to gain access to a payroll application, the user must also pass a third device. Users that are not members of the group 506 do not even have the opportunity to access the payroll application. The present invention provides complete flexibility to protect network resources.

As mentioned above in reference to FIG. 6, in step 620, a template 502 is created for the user for each device that is determined to be in the list of devices associated with a policy 504 that is further associated with the user's group 506. Therefore, there is a possibility that a user may not be enrolled in a particular device that the user is required to pass in order to gain access to a particular application. This situation occurs when the policy 504 that is assigned to the user's group 506 and the policy 504 that is assigned to the application ID 514 have different devices in their list of devices. One way to avoid such a situation is to enroll the user with every device in system 102 and not just with the devices that are determined to be in the policy's 504 list of devices that is associated with the user's group 506.

As illustrated above, various duties exist within system 102. The discussion above infers that it is the administrator who performs all of these duties. In actuality, these duties can be delegated to multiple people having different positions within system 102 (FIG. 1). These positions can include an administrator (with limited duties from the ones described above), a policy manager, a device hardware and software manager, and an enrollment manager. The administrator has actual administrative privileges within system 102. The actual duties of the administrator could be limited to the adding and deleting of users, groups 506 (FIG. 5), computers 208 (FIG. 2) and applications 204 (FIG. 2) with system 102. Another position within system 102 is the policy manager. This position is akin to a security officer. The policy manager is responsible for defining policies 504 and attaching them to both groups 506 and application IDs 514. The policy manager would also be responsible for the combinations of devices and for the strength of the threshold value associated with each device.

Another position within system 102 is a device hardware and software manager. This person is responsible for managing the software and hardware for devices within system 102. The device hardware and software manager will install the devices, keep the versions up to date and maintain the devices. The final position is an enrollment manager. This person is given the ability to enroll users onto system 102. Responsibility includes taking the new users through the process of enrolling for the different devices. The enrollment manager is generally a nontechnical person working in the human resource department of an enterprise. For simplicity, the following discussion will refer only to an administrator. It should be understood that the administrator may be one person performing one, all, or any number of the positions described above.

D. AUTHENTICATION SERVER FUNCTIONS OF THE PRESENT INVENTION

In one embodiment of the present invention, server 104 is implemented as computer 302 operating as described in reference to FIG. 3 above. Computer 302 executes computer programs to enable it to perform the functions of the present invention. Thus, server 104 executes computer programs to perform its functions. As discussed above, the computer programs executed by server 104 are preferably written in an object-oriented programming language and executed in a peer-to-peer object architecture.

An advantage of any object-oriented program, and thus also with computer programs executed by server 104, is that they enable programmers to create modules that do not have to be changed when a new type of object is added. An object includes both the data and functions required to perform a task. Thus, by implementing the functions to be performed by server 104 as objects, created modules do not need to be changed when a new type of object (or function) is added. This implementation of the present invention reduces complexity and thus increases efficiency. This interchangeability of functions (implemented as objects) of the present invention is explained in more detail in reference to FIGS. 7, 8, 12 and 13 below.

Figure 12:
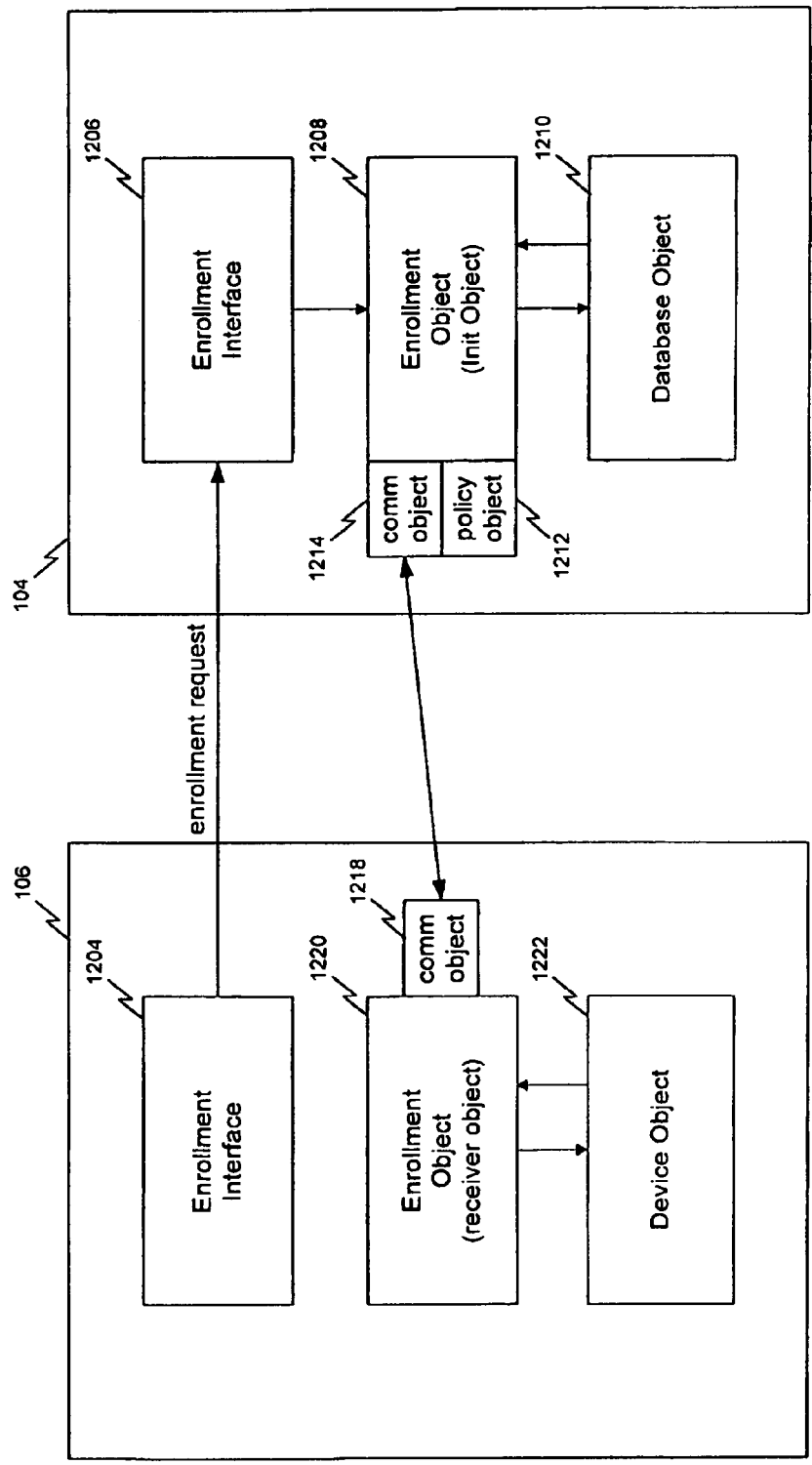
FIG. 12 is a block diagram of the objects involved in the enrollment process according to a preferred embodiment of the present invention.

Described above with reference to FIG. 4, is the dynamic steps involved in establishing communication between a client and a server executing an object-oriented program. As server 104 of the present invention executes its various functions, the same dynamic steps involved in communication between the server and client occur for each function as shown in FIGS. 4A through 4I. FIG. 4 shows a generic init object 406 and a generic receiver object 412. As is shown in FIGS. 7 and 12, for each type of function performed by server 104, init object 406 and receiver object 412 are replaced by specific init and receiver objects that perform their specific functions.

The types of functions performed by server 104, through the execution of computer software, includes authenticating a user and enrolling a user. For simplicity, the figures used to illustrate the individual functions of server 104 do not include switchboard object 402 and listen object 404 of FIG. 4.

1. Authenticating a User

Figure 7:
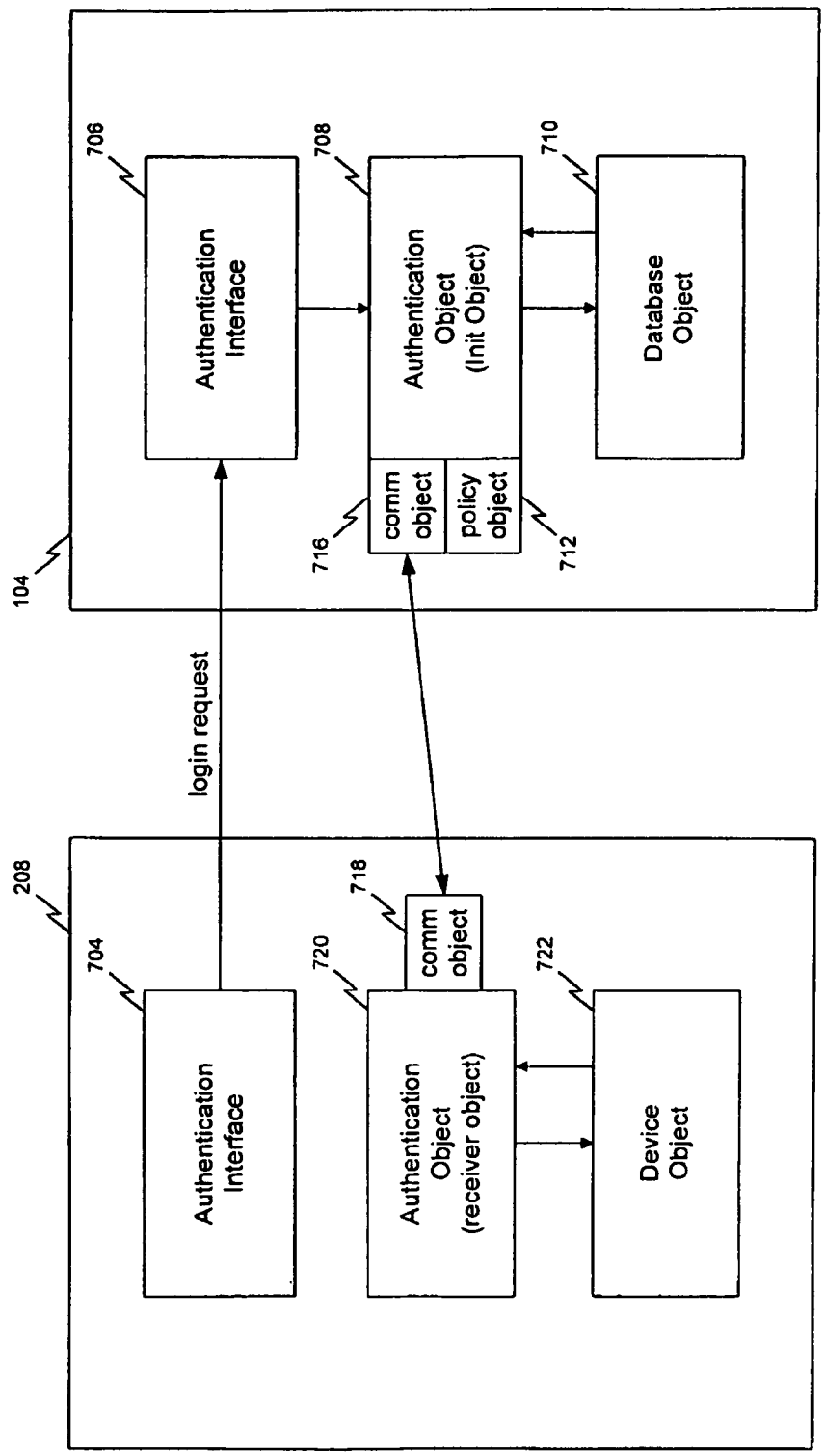
FIG. 7 is a block diagram of the objects involved in authenticating a user according to a preferred embodiment of the present invention.

FIG. 7 is a block diagram of the objects involved in authenticating a user of the present invention. As described above, a peer-to-peer object architecture is when each computer in the network has equivalent capabilities and responsibilities (e.g., a single computer can perform as a server and then at other times perform as a client). This allows for each computer in the network to initiate communication with any other computer in the network. FIG. 7 includes server 104 (FIG. 1), computer 208 (or alternatively remote/web computer 210, both from FIG. 2), authentication interface 704, authentication interface 706, authentication object 708, database object 710, policy object 712, comm object 716, comm object 718, authentication object 720 and device object 722. Here, server 104 is performing as the server and computer 208 is performing as the client.

It is important to note that authentication interface 704 and authentication interface 706 are not part of the present invention. In fact, authentication interface 704 and authentication interface 706 are specific to the particular operating system and/or application the present invention is interfacing with. In general, operating systems provide a software platform on top of which other programs, called applications, can run. Applications must be written to run on top of a particular operating system. The choice of operating system, therefore, determines to a great extent the applications that can be run. Examples of operating systems include Windows NT, UNIX and Solaris. The present invention interfaces with the applicable operating system through application interface 706.

Authentication object 708 replaces init object 406 (FIG. 4). Authentication object 708 is used to request computer 208 to authenticate a user. Comm object 716 is attached to authentication object 708 and replaces comm object 408 (FIG. 4). Authentication object 708 and authentication object 720 communicate, via comm object 716 and comm object 718.

Figure 54:
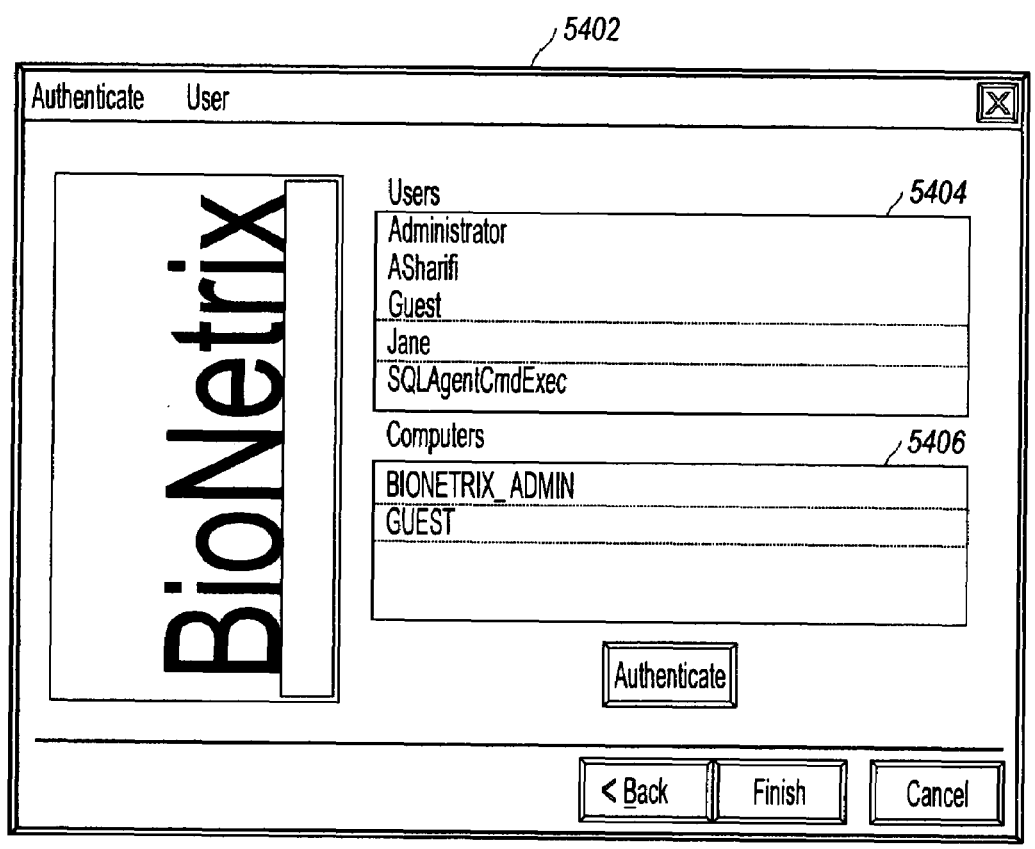
FIG. 54 is an exemplary GUI screen for authenticating a user according to a preferred embodiment of the present invention.

Policy object 712 is also attached to authentication object 708. Policy object 712 differs depending on the specific policy 504 (FIG. 5). As discussed above, it is policy 504 (FIG. 5) that determines the method or way in which a user is to be authenticated by server 104. It is important to note that a user is not authenticated until he or she passes policy 504. In the present invention, a user is never authenticated by solely passing one or more devices without also passing his or her policy 504. The type of communication between authentication object 708 and authentication object 720 is very dependent on the particular policy 504 being used to authenticate the user. An exemplary GUI screen authenticating a user is shown in FIG. 54. Referring to FIG. 54, GUI screen 5402 includes a users window 5404 and a computers window 5406. Users window 5404 lists the users (via user IDs 510) and computers window 5406 lists the computers (via computer IDs 512) in system 102.

In FIG. 7, database object 710 stores the data described above in reference to FIG. 5. The data includes collections of templates 502, policies 504, groups 506, device IDs 508, user IDs 510, computer IDs 512 and application IDs 514. Authentication object 720 replaces receiver object 412 (FIG. 4). Authentication object 720 is used to perform the specific task requested by authentication object 708. Comm object 718 replaces comm object 410 (FIG. 4). Finally, device object 722 is used to identify the user by determining if the user passes the device. device object 722 differs depending on what device the user is attempting to pass.

Figure 8A:
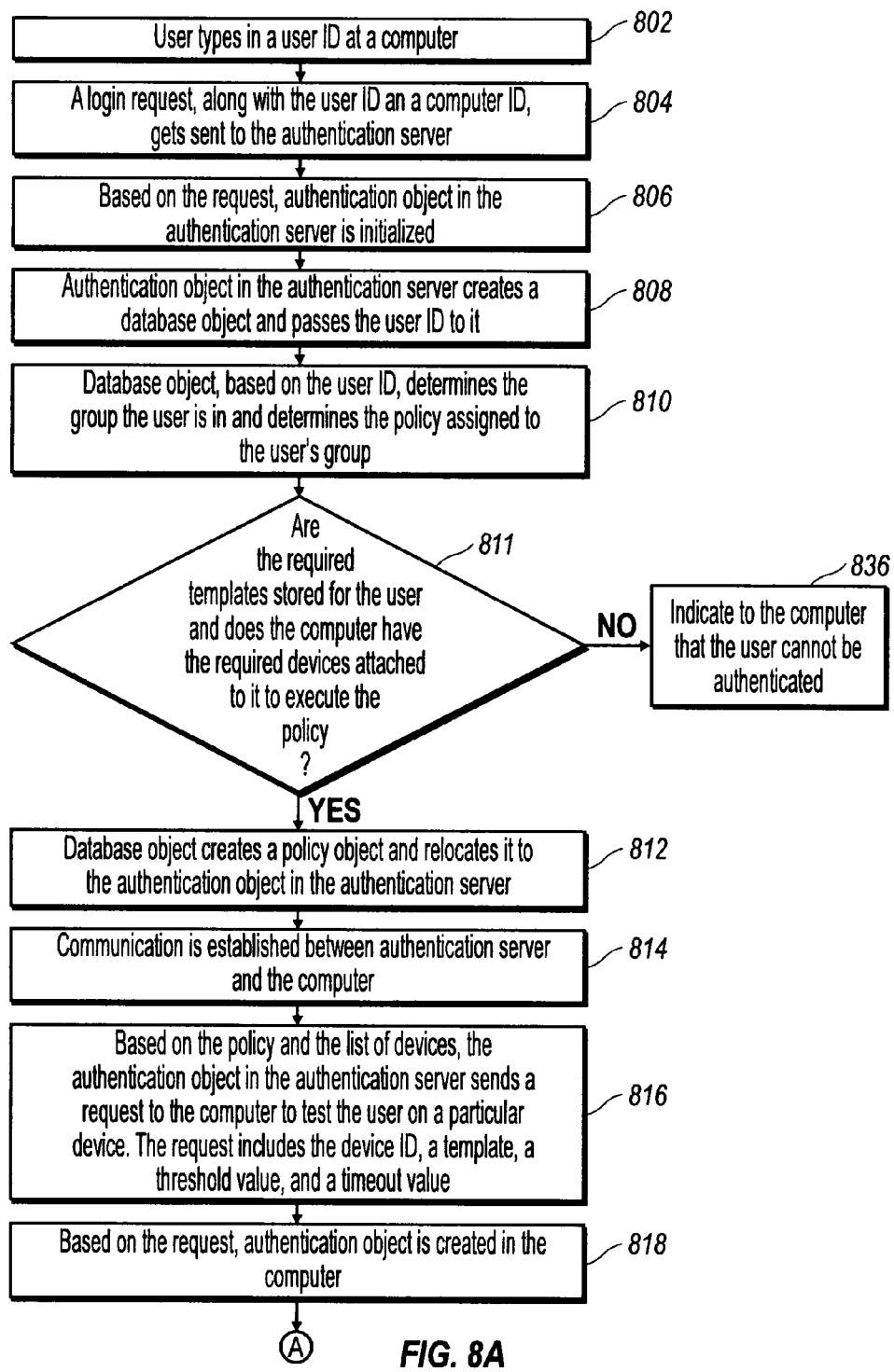
FIGS. 8A and 8B are a flowchart depicting the high-level operation of authenticating a user according to a preferred embodiment of the present invention.
Figure 8B:
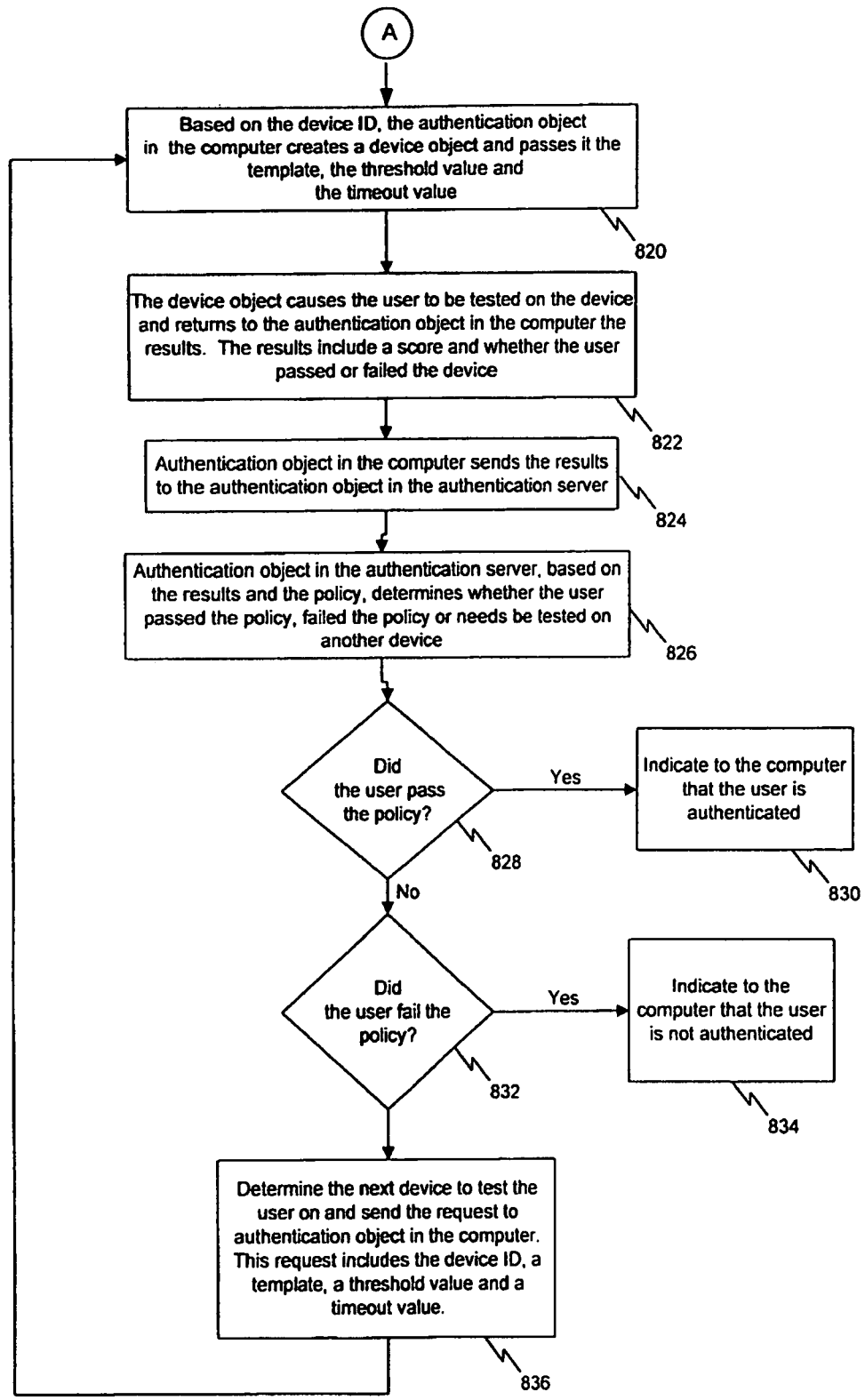

FIGS. 8A and 8B present a flowchart depicting the high-level operation of the objects in FIG. 7. In step 802, a user is at computer 208 and types in user ID 510 (FIG. 5) given to him or her by the administrator. Authentication interface 704 recognizes this as a login request. As mentioned above, to facilitate user access, each computer 208 provides an interface for users to be authenticated by system 102 (FIG. 1). This interface is authentication interface 704. In step 804, authentication interface 704 sends the login request, which includes a computer ID 512 (FIG. 5) and user ID 510, to server 104. Application interface 706 actually receives the login request. Based on the fact that the request is one for login, authentication object 708 gets initialized in step 806 (e.g., the login request starts the engine in system 102). Prior to authentication object 708 being initialized, it is a generic init object 406 as described in reference to FIG. 4.

In step 808, authentication object 708 creates database object 710 and passes user ID 510 to it. Based on user ID 510, database object 710 determines the user's group 506 (FIG. 5) in step 810. As described previously, the administrator has already determined which group 506 the user is in. Based on group 506, database object 710 determines the policy 504 (FIG. 5) that is assigned to group 506.

In step 811, database object 710 determines whether the required templates 502 (FIG. 5) for the user are stored in object 710 to execute the user's policy 504. In addition, database object 710 also determines if computer 208 has the required devices attached to it to execute the user's policy 504. If the required templates 502 or the required devices do not exist, then control transfers to step 836. In step 836, server 104 communicates, via authentication interface 706 and authentication interface 704, to computer 208 that the user cannot be authenticated. Authentication interface 704 then denies the user access. At this point the flowchart in FIGS. 8A and 8B ends. Alternatively, if in step 811 the required templates 502 and the required devices do exist, then control transfers to step 812.

In step 812, database object 710 creates policy object 712 and relocates policy object 712 to authentication object 708. Policy object 712 knows the specific type of policy 504 (e.g. OR policy, AND policy, etc.), the list of devices for policy 504 and the required templates 502. Generally, there is one template 502 for each device ID (FIG. 5) 508 listed in the list of devices. Each template 502 contains the user's stored data to be used in testing the user on a particular device. Alternatively, one template 502 could be configured such that it contains the user's stored data for all devices in system 102, as should be apparent to one skilled in the relevant art. In addition, each device in the list of devices may have associated with it a threshold value and a timeout value. As explained above, the threshold value indicates the level of identification the device must determine for the user to pass the device. The timeout value indicates the time in which the device has to identify the user to the level of identification indicated by the threshold value.

In step 814, communication is established between server 104 and computer 208. This communication is established exactly as described in reference to FIG. 4. In step 816, based on policy 504 and its list of devices, authentication object 708 sends a request to computer 208 to test the user on a particular device. The request includes device ID 508, template 502, the threshold value and the timeout value. Template 502, the threshold value and the timeout value may be determined by user ID 510 and device ID 508.

In step 818, based on the request, authentication object 720 is created. In step 820, authentication object 720 looks at device ID 508 and creates device object 722. Authentication object 720 then passes to device object 722 template 502, the threshold value and the timeout value. In step 822, device object 722 tests the user on the specific device and returns the results to authentication object 720. The results include a score and whether the user passed or failed the device. (In another embodiment, the results may only include whether the user passed or failed where it is not appropriate to return a score.) Authentication object 720 then sends the results back to authentication object 708 in step 824, via comm object 718 and comm object 716.

In step 826, authentication object 708 looks at both the results and policy object 712 and determines whether the user passed policy 504, failed policy 504 or needs to be tested on another device. Policy object 712 determines how many different devices the user needs to be tested on. In step 828, if the user passed policy 504, then control transfers to step 830. In step 830, the fact that the user passed policy 504 is communicated, via authentication interface 706 and authentication interface 704, to computer 208. Authentication interface 704 then allows the user access to enterprise resources. Alternatively, if in step 828, the user did not pass policy 504, then control transfers to step 832.

In step 832, if the user failed policy 504, then control transfers to step 834. In step 834, the fact that the user failed policy 504 is communicated, via authentication interface 706 and authentication interface 704, to computer 208. Authentication interface 704 then denies the user access to enterprise resources. Alternatively, if in step 832, the user did not fail policy 504, then control transfers to step 836. In step 836, the next device to test the user on is determined and another request is sent to authentication object 720. At this point control returns to step 820 and the user gets tested on the next device. The flowchart in FIG. 8 continues until the user either passes or fails policy 504.

Figure 9:
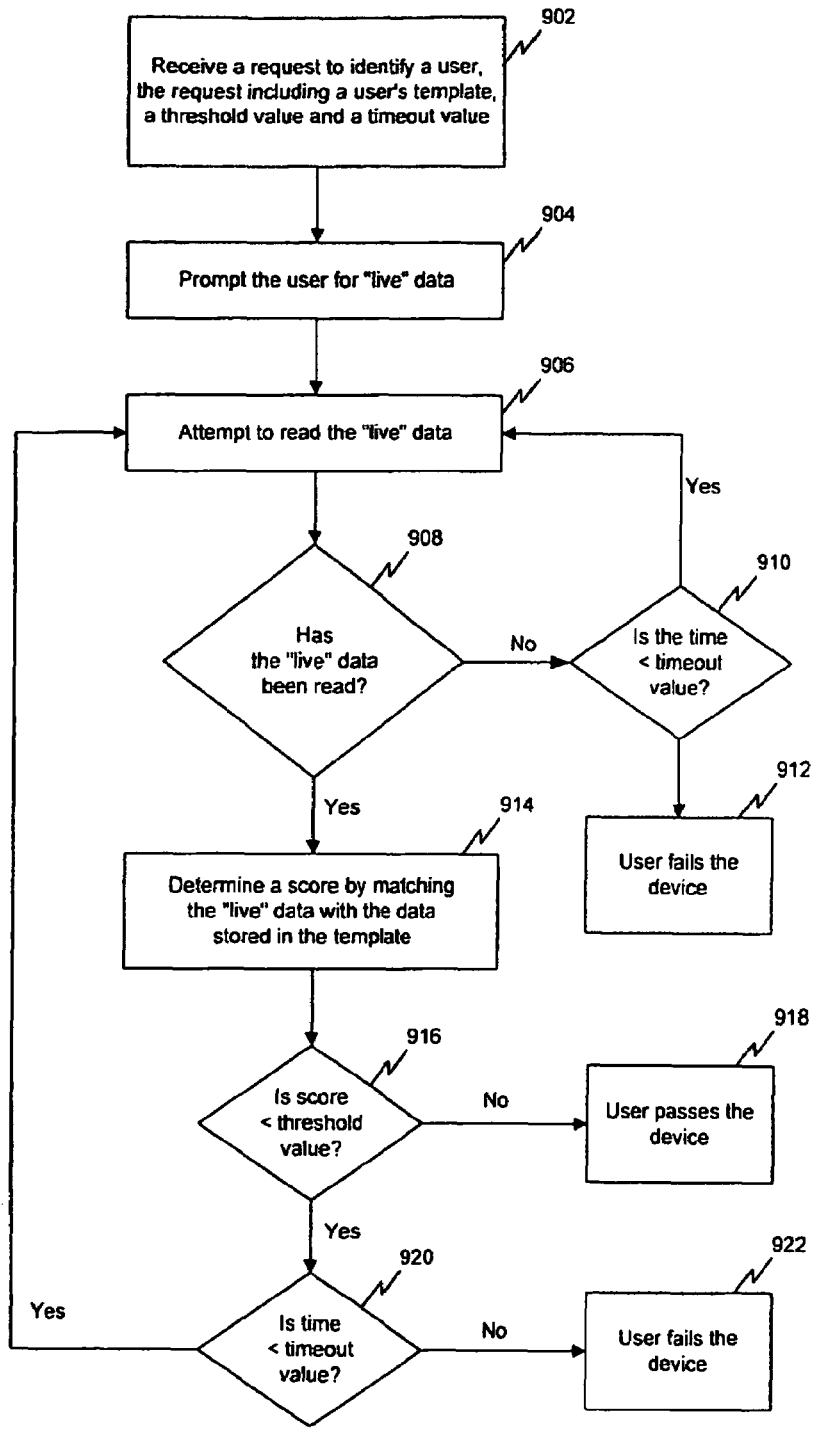
FIG. 9 is a flowchart illustrating the typical operation of a biometric device as it tests a user according to a preferred embodiment of the present invention.

Step 822 of FIG. 8. is further explained in FIG. 9. FIG. 9 is a flowchart illustrating the typical operation of a biometric device as it tests a user. Similar steps may be used while testing a user on a non-biometric device, as should be apparent to one skilled in the relevant art. In step 902, the device receives a request to test a user. The request includes the user's template 502, a threshold value and a timeout value. Again, the threshold value and timeout value are user ID 510 and device ID 508. In step 904, the device prompts the user for "live" data. In step 906, the device attempts to read the "live" data.

The device, in step 908, determines whether or not the data has been read. As discussed above, if the environment is not conducive for reading the particular measurement (e.g., the environment has poor lighting and the device is trying to read facial image data), then the device may not be able to read the "live" data. If the "live" data has not been read in step 908, then in step 910, the actual time the device has attempted to read the "live" data is compared to the timeout value. If the actual time is greater than or equal to the timeout value, then control transfers to step 912 and the user fails the device. Alternatively, if the actual time is less than the timeout value, then control transfers back to step

906 and the device attempts to read the "live" data again. This loop continues until either the "live" data has been read or the actual time is greater than or equal to the timeout value (i.e., the time expires to read the "live" data).

In step 908, if the "live" data has been read, then control transfers to step 914. In step 914, a score is determined by matching the "live" data with the data stored in template 502. In step 916, the score determined by step 914 is compared to the threshold value. If the score is greater than or equal to the threshold value, then control transfers to step 918. In step 918, the user passes the device and the flowchart in FIGS. 8A and 8B ends. Alternatively, in step 916, if the score is less than the threshold value then control passes to step 920. In step 920, the actual time is once again compared to the timeout value. If the actual time is greater than or equal to the timeout value, then control transfers to step 922 and the user fails the device. At this point the flowchart in FIG. 9 ends. If the actual time is less than the timeout value, then control transfers back to step 906 and the device attempts again to read the "live" data.

The process described above to authenticate a user shows template 502 being matched on the client side (i.e., at computer 208). While this is a preferred embodiment of the present invention, it is important to recognize that template 502 can just as easily be matched on the server side (i.e., at server 104).

Figure 10:
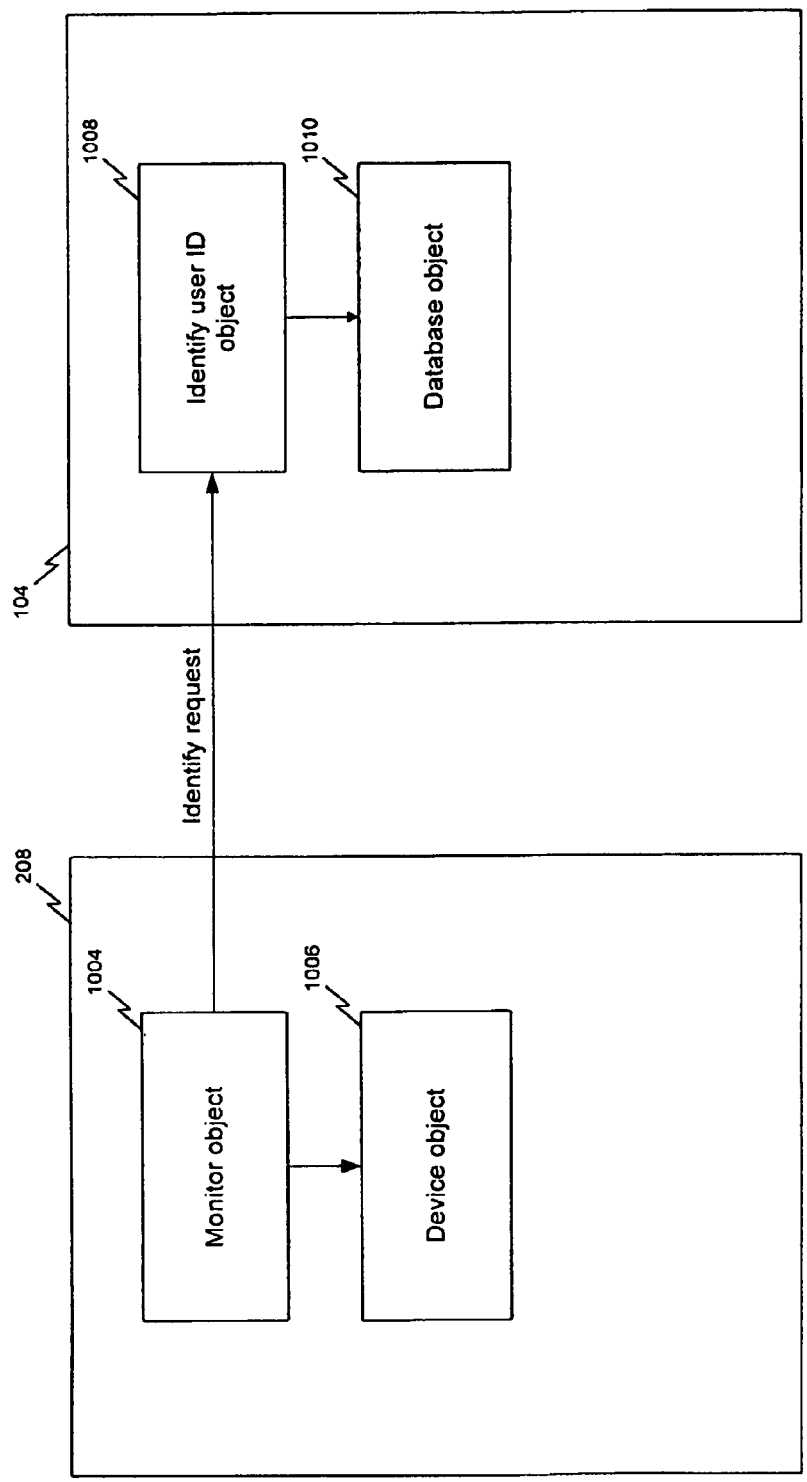
FIG. 10 is a block diagram of the objects involved in starting the authentication process with "live" biometric data according to an embodiment of the present invention.

As pointed out above, it is the login request that starts the engine in system 102 to authenticate a user. The login request is initiated by a user typing in a user ID 510 (FIG. 5). In another embodiment of the present invention, it is "live" data that identifies the user and starts the engine in system 102 to authenticate a user. FIG. 10 is a block diagram of the objects involved in starting the authentication process of the present invention with "live" data. FIG. 10 includes computer 208 (or alternatively remote/web computer 210, both from FIG. 2), monitor object 1004, device object 1006, identify user ID object 1008 and database object 1010.

Monitor object 1004 is provided by the present invention for each computer 208 in the enterprise where the administrator desires to have "live" data start off the engine in system 102 to authenticate a user. Monitor object 1004 is up and waiting for "live" data to be presented. In addition, monitor object 1004 is specialized (e.g., a fingerprint monitor object waits for "live" fingerprint data and a facial image monitor object waits for "live" facial image data).

Figure 11:
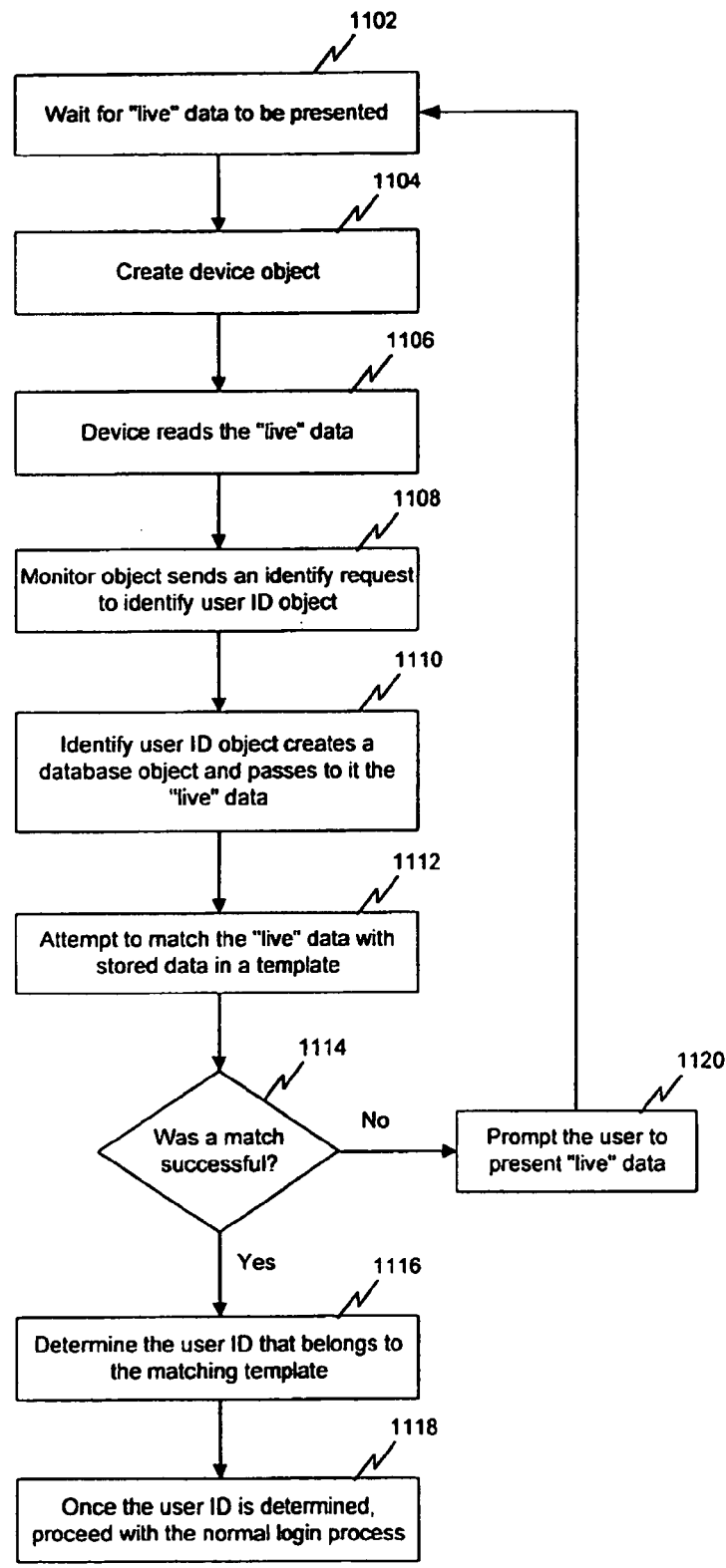
FIG. 11 presents a flowchart depicting the high-level operation of the objects in FIG. 10 according to a preferred embodiment of the present invention.

FIG. 11 presents a flowchart depicting the high-level operation of the objects in FIG. 10. In step 1102, monitor object 1004 is waiting for "live" data to be presented. In step 1104, once "live" has been presented, monitor object 1004 creates device object 1006. Because monitor object 1004 is specialized, there is no need for monitor object 1004 to be aware of any device IDs 508 (FIG. 5). In step 1106, device object 1006 causes a device to read the "live" data. This "live" gets returned to monitor object 1004.

In step 1108, monitor object 1004 sends an identify request to identify user ID object 1008. The identify request includes the "live" data and computer ID 512 (FIG. 5). The "live" data is used to identify user ID object 1008 on server 104 (FIG. 1). Computer ID 512 uniquely identifies computer 208. Although not illustrated in FIGS. 10 and 11 for simplicity reasons, the same steps in establishing communication between objects must occur as shown in FIG. 4. In step 1110, identify user ID object 1008 creates a database object 1010 and passes to it the "live" data. Database object 1010 contains the same data as described in reference to database object 710 in FIG. 7. In step 1112, an attempt is made to match the "live" data with data stored in a template 502 (FIG. 5).

In step 1114, if a match was successful, then control transfers to step 1116. In step 1116, the user ID 510 (FIG. 5) that belongs to the matching template 502 is determined. In step 1118, once user ID 510 is determined, then the authentication process proceeds as described in step 804 in FIG. 8. If in step 1114 a match was not successful, then control transfers to step 1120. In step 1120, the user is prompted to present "live" data and control transfers back to step 1102. Because monitor object 1004 is always waiting for "live" data to be presented, it does not matter if the same user presents the next "live" data. Each time "live" data is presented to monitor object 1004, it does not distinguish it from previously presented "live" data.

2. Enrolling a User

As stated above, one of the advantages of object-oriented programming techniques over procedural programming techniques is that they enable programmers to create modules that do not need to be changed when a new type of object is added. This advantage is illustrated in FIG. 12. FIG. 12 is a block diagram of the objects involved in the enrollment process of the present invention. FIG. 12 includes server 104 (FIG. 1), enrollment interface 1206, enrollment object 1208, comm object 1214, policy object 1212, database object 1210, enrollment station 106 (FIG. 1), enrollment interface 1204, enrollment object 1220, comm object 1218 and device object 1222. Here, server 104 is performing as the server and enrollment station 106 is performing as the client.

Enrollment station 106 is used to enroll users into system 102. Enrollment station 106 has attached to it every type of identification device used by system 102 to identify and ultimately authenticate users. It is important to note that enrollment interface 1204 and enrollment interface 1206 are not part of the present invention. In fact, enrollment interface 1204 and enrollment interface 1206 are specific to the particular operation system the present invention is interfacing with.

Enrollment object 1208 replaces init object 406 (FIG. 4). Enrollment object 1208 is used to request enrollment station 106 to enroll a user on a device. Comm object 1214 is attached to enrollment object 1208 and replaces comm object 408 (FIG. 4). Enrollment object 1208 and enrollment object 1220 communicate, via comm object 1214 and comm object 1218.

Policy object 1212 is also attached to enrollment object 1208. Policy object 1212 is the same as policy object 712 (FIG. 7). As discussed above, it is the policy that determines the method or way in which a user is to be authenticated by server 104. Database object 1210 stores the same data as database object 710 as described in reference to FIG. 7. Enrollment object 1220 replaces receiver object 412 (FIG. 4). Enrollment object 1220 is used to perform the specific task in enrolling a user on a device. Comm object 1218 replaces comm object 410 (FIG. 4). Finally, device object 1222 is used to enroll the user by requesting multiple samples of a particular type of "live" data from the user. device object 1222 uses the samples of data to create a unique template 502 (FIG. 5) for the user.

Figure 13:
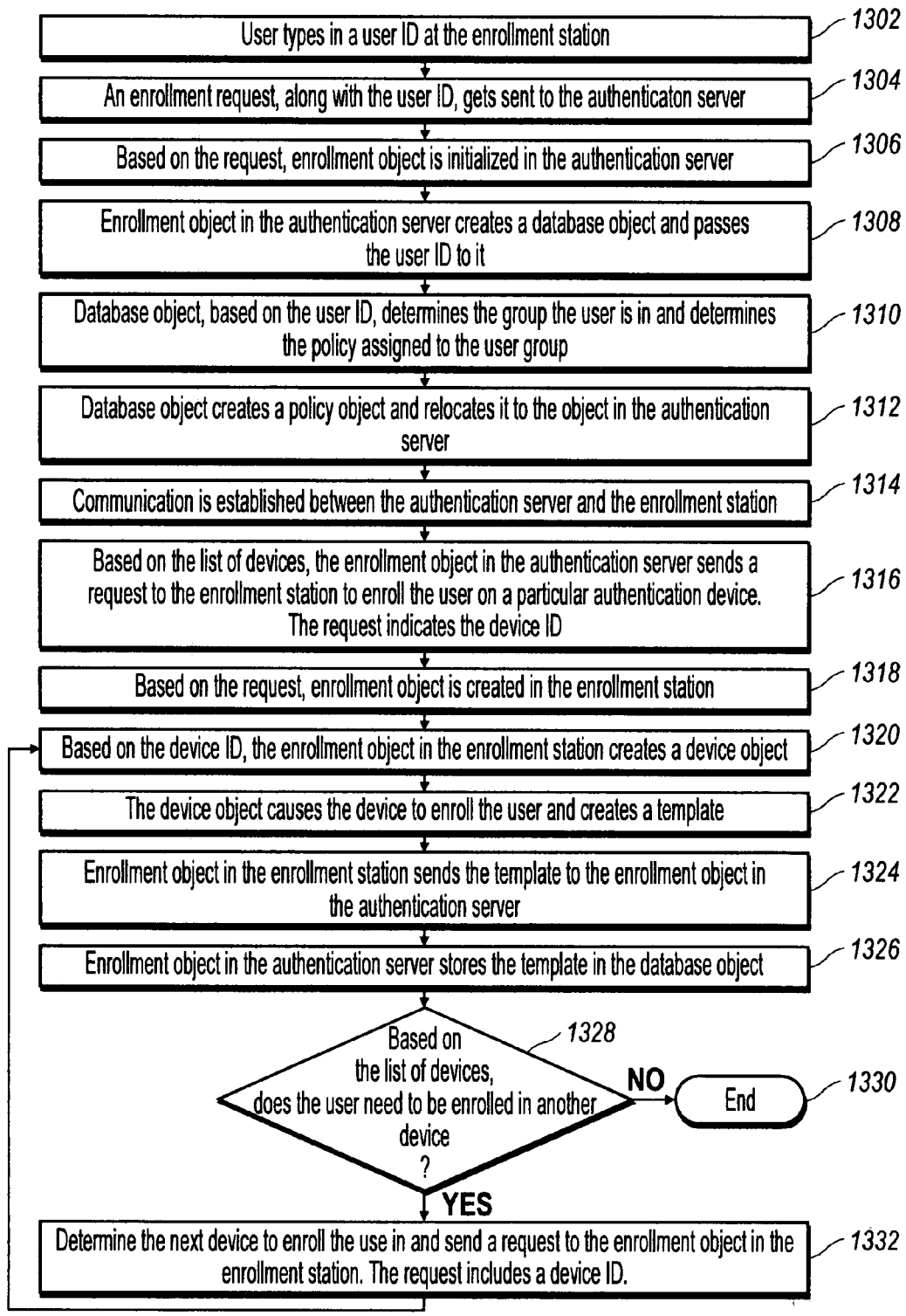
FIG. 13 is a flowchart illustrating the typical operation of the enrollment process according to a preferred embodiment of the present invention.

FIG. 13 presents a flowchart depicting the high-level operation of the objects in FIG. 12. In step 1302, a user is at enrollment server 106 and types in user ID 510 (FIG. 5) given to the user by the administrator. Enrollment interface 1204 recognizes this as an enrollment request. To facilitate user enrollment, enrollment station 106 provides an interface for users to be enrolled by system 102 (FIG. 1). This interface is enrollment interface 1204. In step 1304, enrollment interface 1204 sends an enrollment request, which includes computer ID 512 (FIG. 5) and user ID 510, to server 104. Enrollment interface 1206 actually receives the enrollment request. Based on the fact that the request is one for enrollment, enrollment object 1208 gets initialized in step 1306 (e.g., the enrollment request starts the engine in system 102). Prior to enrollment object 1208 being initialized, it is generic init object 406 as described in reference to FIG. 4.

In step 1308, enrollment object 1208 creates database object 1210 and passes user ID 510 to it. Based on user ID 510, database object 1210 determines the user's group 506 (FIG. 5) in step 1310. As described previously, the administrator has already determined which group 506 the user is in. Based on group 506, database object 1210 determines the policy 504 (FIG. 5) that is assigned to group 506.

In step 1312, database object 1210 creates policy object 1212 and relocates policy object 1212 to enrollment object 1208. Policy object 1212 knows the specific type of policy 504 (e.g. OR policy, AND policy, etc.) and its list of devices for that policy 504. In step 1314, communication is established between server 104 and enrollment station 106. This communication is established exactly as described in reference to FIG. 4. In step 1316, based on the list of devices, enrollment object 1208 sends a request to enrollment station 106 to test the user on a particular device. The request includes device ID 508 (FIG. 5) that identifies the particular device the user is to be enrolled in.

In step 1318, based on the request, enrollment object 1220 is created. In step 1320, enrollment object 1220 looks at device ID 508 and creates device object 1222. Device object 1222 causes the device to enroll the user in step 1322. In particular, the user is asked to give measurements a few different times. For example, the user may be asked to give multiple fingerprint measurements for each finger. The enrollment of a user in a device creates a template 502 (FIG. 5). In step 1324, enrollment object 1220 sends template 502 to enrollment object 1208, via comm object 1218 and comm object 1214. Then, in step 1326, enrollment object 1208 stores template 502 in database object 1210.

In step 1328, it is determined based on the list of devices, if the user needs to be enrolled in another device. Although the user should at least be enrolled in the devices listed in his or her list of devices, the administrator can decide to enroll the user in a device not listed in the list of devices. If in step 1328, it is determined the user does not need to be enrolled in another device, then control transfers to step 1330 and the flowchart in FIG. 13 ends. Alternatively, if the user does need to be enrolled in another device, then control transfers to step 1332. In step 1332, the next device to enroll the user in is determined and a request is sent to enrollment object 1220. The request includes device ID 508 for the next device. Control transfers again to step 1320. This process continues until the user is enrolled in all the required devices.

As described with reference to FIGS. 12 and 13, in one embodiment of the present invention the user is enrolled through enrollment station 106. Typically, enrollment station 106 and the administrator are physically located at the same location within the enterprise. When a new user needs to enroll into the resource protection system, it may not be convenient for that user to physically be at the same location as administration. This presents two additional limitations for networked environments.

The first limitation deals with the use of any identification device. To enroll a user into system 102 (FIG. 1) an administrator needs to be sure that the user enrolling is really the right person. This is difficult to do when the user and administrator are not physically at the same location.

The second limitation deals with the use of identification devices. Many measurements change over time. In addition, passwords and tokens may expire over time. For example, people grow older, lose or gain weight, etc. In the case of templates storing a user's facial image, the data in the template may need to be updated from time to time. Once again, if the user and administrator are not physically at the same location in the network, the administrator needs to be sure the user requesting to update a template is really the person he or she says.

The inventors of the present invention recognized that what is needed is a scheme for remotely authenticating a user prior to allowing that user to either enroll or re-enroll with a particular device to update a template. Remote enrollment and/or re-enrollment (refreshing of templates) can be either initiated by the administrator or the user.

There are several scenarios of where remote enrollment and/or re-enrollment is used. The first scenario already mentioned above is when the administrator and the user desiring to be enrolled or re-enrolled in system 102 are not physically at the same location in the network. The administrator still needs to authenticate the user first. There are at least two possible solutions to this problem. The first involves assigning a temporary password (or token or smart card) to the user. The user goes to one of remote/web computers 210 (FIG. 2) and types in the password. Once system 102 authenticates the user by the password, then the user starts the enrollment process. Of course, the temporary password expires after one use. In the case of re-enrollment (refreshing of templates) if the user is currently enrolled in multiple devices, then one of the other devices can be used to authenticate the user prior to allowing the user to refresh a template 502 (FIG. 5) on the desired device.

The second solution for remote enrollment and/or re-enrollment takes advantage of the fact that certain devices are attached to remote/web computer 210. Several examples involve the use of facial image and voice recognition devices. If an administrator is familiar with how the user looks, then the administrator can use video conferencing to authenticate the user prior to allowing the enrollment process to begin. If an administrator is familiar with the user's voice, then a voice recognition device can be used to speak to the administrator to authenticate the user.

A second scenario is when an enterprise desires not to use an administrator to enroll users into system 102. Here, if the enterprise has an existing identification system in place, it is easier to changeover from its existing system to system 102. What is important to note is that the integrity of the existing identification system must not be in question. For instance, if User B has access to another User A's password, then User B can enroll into system 102 and gain access to User A's resources. Assuming the integrity of the existing identification system is good, then the method of authentication of the existing identification system is used to introduce the user to system 102. Once the user is introduced to system 102, the user can no longer gain access to enterprise resources through the old method. This is also important because it provides flexibility in rolling out system 102 by not having to enroll all users at the same time.

E. POLICIES

The inventors of the present invention recognized a limitation when identification devices are used in any environment, whether or not the environment is networked. Enterprises with many resources have the desire to protect some resources more than others. For example, an enterprise may not care if its electronic bulletin board is accessed by every user in the enterprise. Whereas, an enterprise may want only the enterprise president to access merger and acquisition information. If an enterprise applies the same level of protection to all its resources, then one of two scenarios will occur. The first scenario is applying a lower-end level of protection to all resources. Here the result is inadequate authentication to some network resources. The second scenario is applying a higher-end level of protection to all resources. While this scenario may adequately protect all resources in the network, it would make the administration of resource protection more complex and thus decrease network productivity.

Policies 504 (FIG. 5) of the present invention provides the flexibility to apply the appropriate level of protection to each network resource without decreasing network productivity. As discussed above, it is the policies 504 of the present invention that determine the method or way in which a user is to be authenticated by server 104 (FIG. 1). It is important to note that a user is not authenticated until he or she passes a policy 504. In the present invention, a user is never authenticated by solely passing one or more devices without the user also passing his or her policy 504.

The specific way in which policies 504 provide flexibility to the level of protection for each resource is through the layering of identification devices, including both biometric and/or non-biometric devices. The layering of identification devices allows the administrator of system 102 (FIG. 1) to combine one or more identification devices in a logical way to protect each resource. Layering also allows the administrator to adjust the level of identification each device must determine in order for the user to pass the device. This is accomplished through threshold values as described above.

Figure 15:
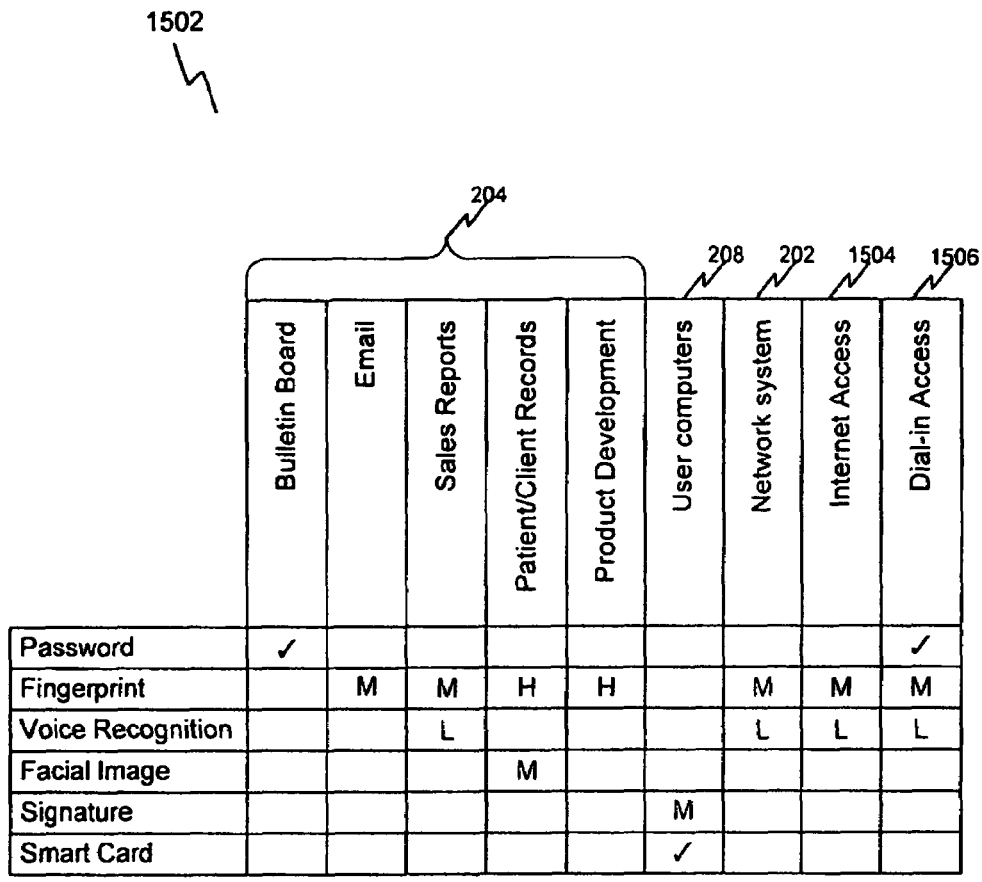
FIG. 15 is a chart illustrating the layering process according to a preferred embodiment of the present invention.

FIG. 15 is a chart illustrating an example of the layering process of system 102 for a particular enterprise. Chart 1502 has columns and rows. Users can be required to be authenticated by system 102 when they try to access various points in network system 202. The columns of chart 1502 represent the various points in network system 202. The various points (in this particular enterprise) include network system 202 itself, one or more of applications 204, one or more of user computers 208, Internet access 1504 and dial-in access 1506. The rows in chart 1502 represent the identification devices used in system 102. The identification devices include both and non-biometric devices. Non-biometric devices (in this particular enterprise) include password and smart card devices. Biometric devices (in this particular enterprise) include fingerprint, voice recognition, facial image and signature.

Once the administrator identifies the various points in network system 202 that require protection and the identification devices, the administrator determines the layering process of the present invention. The layering process for a single resource can include the steps illustrated by FIG. 16.

Figure 16:
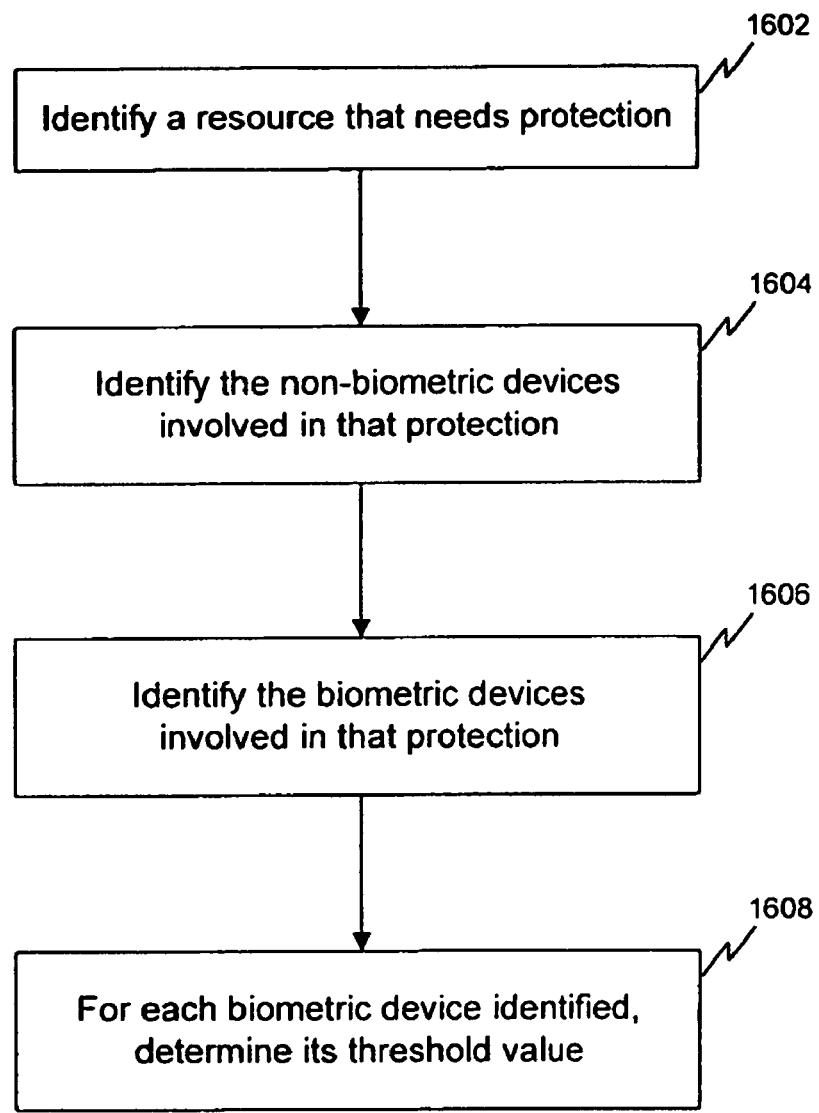
FIG. 16 is a flowchart illustrating the process of layering using policies according to a preferred embodiment of the present invention.

FIG. 16 is a flowchart that illustrates the process of layering for a single resource of the present invention. In step 1602, a resource in network system 202 that requires protection is identified. In step 1604, the non-biometric devices that are going to be utilized in protecting the resource are identified. Here, the administrator may decide to use all non-biometric devices, all biometric devices, or some combination thereof. In step 1606, the devices that are going to be utilized in protecting the resource are identified. Again, the administrator may decide to use zero, one or more of the devices. Finally, in step 1608, for each identified device its threshold value is determined. Chart 1502 (FIG. 15) illustrates the possible values of threshold value as being L (low), M (medium) and H (high). The present invention is not limited to representing the values of threshold values this way. In fact, possible values of threshold values can be represented in other ways. One possible way is numerically where the threshold value can have as many different values as the administrator desires.

Referring again to FIG. 15, network system 202 is protected by two devices and no non-biometric devices. The two devices include a fingerprint device and a voice recognition device. Fingerprint device's threshold value is set at M. Voice recognition device's threshold value is set at L. Therefore, for a user to access network system 202, the user might potentially be tested on both a fingerprint device and a voice recognition device. When tested, the user might have to pass the fingerprint device with at least a M threshold value and pass the voice recognition device with at least a L threshold value.

The reason why the user might only potentially be tested on both devices is because ultimate authentication into system 102 is governed by polices 504. For example, an OR policy would only require the user from above to pass either the fingerprint device or the voice recognition device. The only way the user will be tested on both devices is if the user fails the first device tested on. An AND policy requires the user to be tested on both devices to be authenticated. But even with the AND policy the user may be tested on one of the devices. If the user fails the first device tested on, then the user automatically fails the AND policy and there is no need to test the user on the second device.

Although policies 504 have been introduced above, this section first introduces a BNF for a policy of the present invention. Then, this section gives examples of how different policies function according to the BNF. Such examples are provided for both pre-defined policies and administrator-defined policies as described below for OR, AND, CONTINGENT, RANDOM functions below.

BNF is an acronym for "Backus-Naur Form," which is a metasyntactic notation used to specify the syntax of programming languages, command sets, and the like. Following is a BNF of a policy of the present invention. It illustrates the syntax and describes policies as functions connected by AND or OR.

```
<policy>     ::=  <function> | <policy><connector><policy>
<function>   ::=  <identifier> ({<parameter>})
<parameter>  ::=  <identifier> | <identifier>
<identifier> ::=  <letter> {<letter> | <digit>}
<letter>     ::=  A | B | C | D | E | F | G | H | I | J | K | L | M |
                  N | O | P | Q | R | S | T | U | V | W | X | Y | Z
<digit>      ::=  0 | 1 | 2 | 3 | 4 | 5 | 6 | 7 | 8 | 9
<connector>  ::=  AND |
                  OR
```

As explained above, each policy has a list of devices associated with it. The list of devices identifies the devices that are used to execute the policy. If appropriate, each device in the list of devices has a threshold value and a timeout value associated with it. The threshold value indicates the level of identification the device must determine for the user to pass the device. The timeout value indicates the time in which the device has to identify the user to the level of identification indicated by the threshold value.

In addition to what has already been explained above, the policies of the present invention may be configured to contain a time component. The time component indicates a start and stop time for a typical day. When a user attempts to be authenticated by the present invention and the actual time of day is not within the start and stop time specified by the time component, then the policy automatically returns a failed result. This feature limits users to the time of day they can access network resources.

Certain policies of the present invention may be viewed as being hierarchical in nature. As described above, users can be required to be authenticated by biometric system 102 when they try to access various points in network system 202. Examples of the various points include network system 202 itself, one or more of applications 204, one or more of user computers 208, Internet access 1504 and dial-in access 1506. With the hierarchical nature of certain policies of the present invention, the present invention will only attempt to authenticate the user into a desired point in network system 202 if that user has already gained access to (i.e., been authenticated into) a list of required points.

Figure 40:
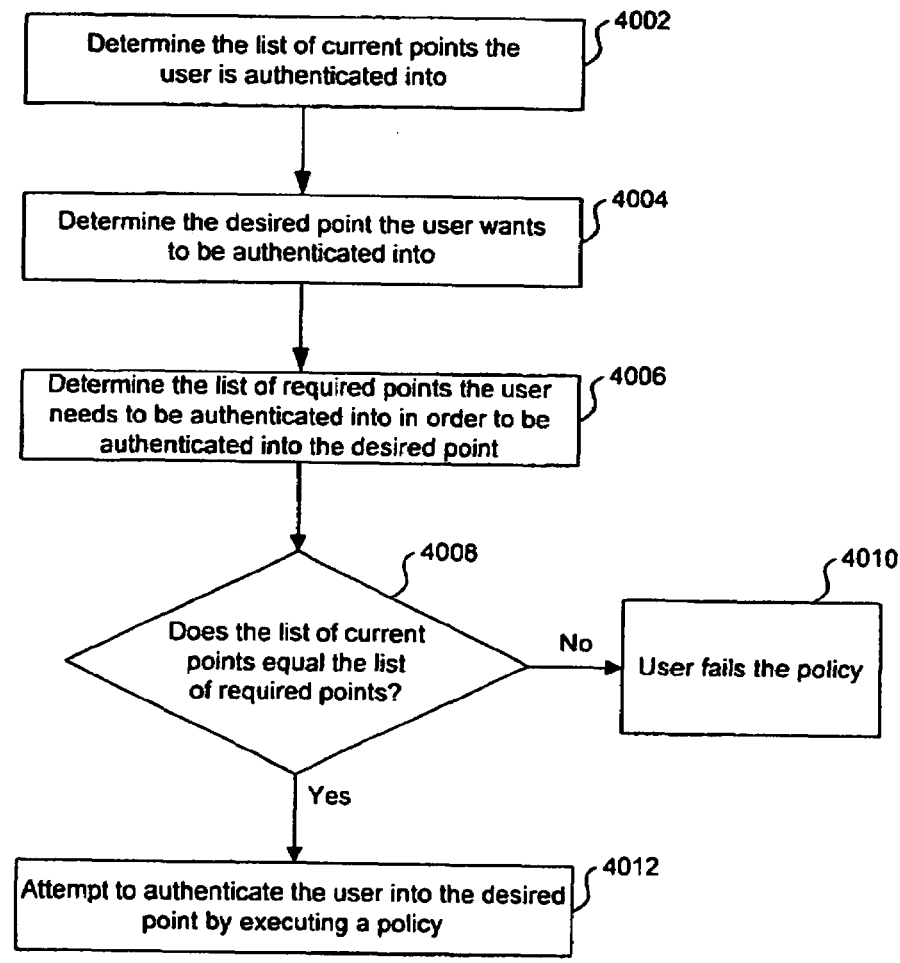
FIG. 40 is a flowchart illustrating the hierarchical nature of certain policies according to a preferred embodiment of the present invention.

FIG. 40 is a flowchart illustrating the hierarchical nature of certain policies of the present invention. In step 4002, the list of current points the user is currently authenticated into is determined. In step 4004, the desired point the user wants to be authenticated into is determined. In step 4006, the list of required points the user needs to be authenticated prior to being authenticated into the desired point is determined.

In step 4008, it is determined whether the list of current points equal the list of required points. If the outcome of step 4008 is negative, then control transfers to step 4010. Alternatively, if the outcome of step 4008 is positive, then control transfers to step 4012.

In step 4010, the user has not been authenticated into all of the required points in order for the present invention to authenticate the user into the desired point. Here, the user fails the policy and the flowchart in FIG. 40 ends. At this point the user has not been authenticated by biometric system 102. Alternatively, in step 4012 the present invention attempts to authenticate the user into the desired point by executing one of the biometric policies 504 described herein.

As stated above, the present invention not only provides specific pre-defined policies but also allows the administrator to define other administrator-defined policies. Examples of pre-defined polices include an OR policy, an AND policy, a CONTINGENT policy, a RANDOM policy, a THRESHOLD policy, a multi-user policy, a multi-location policy, a multi-template policy, a user dependent policy, a location restriction policy, and a computer/device specific policy. These pre-defined policies are limited to having only devices in their list of devices. Therefore, the present invention also provides administrator-defined policies having a list of policies or devices. An additional administrator-defined type of policy includes policies within a policy. Described in detail below, are the examples of pre-defined policies and the administrator-defined policies.

1. OR Policy

Figure 17:
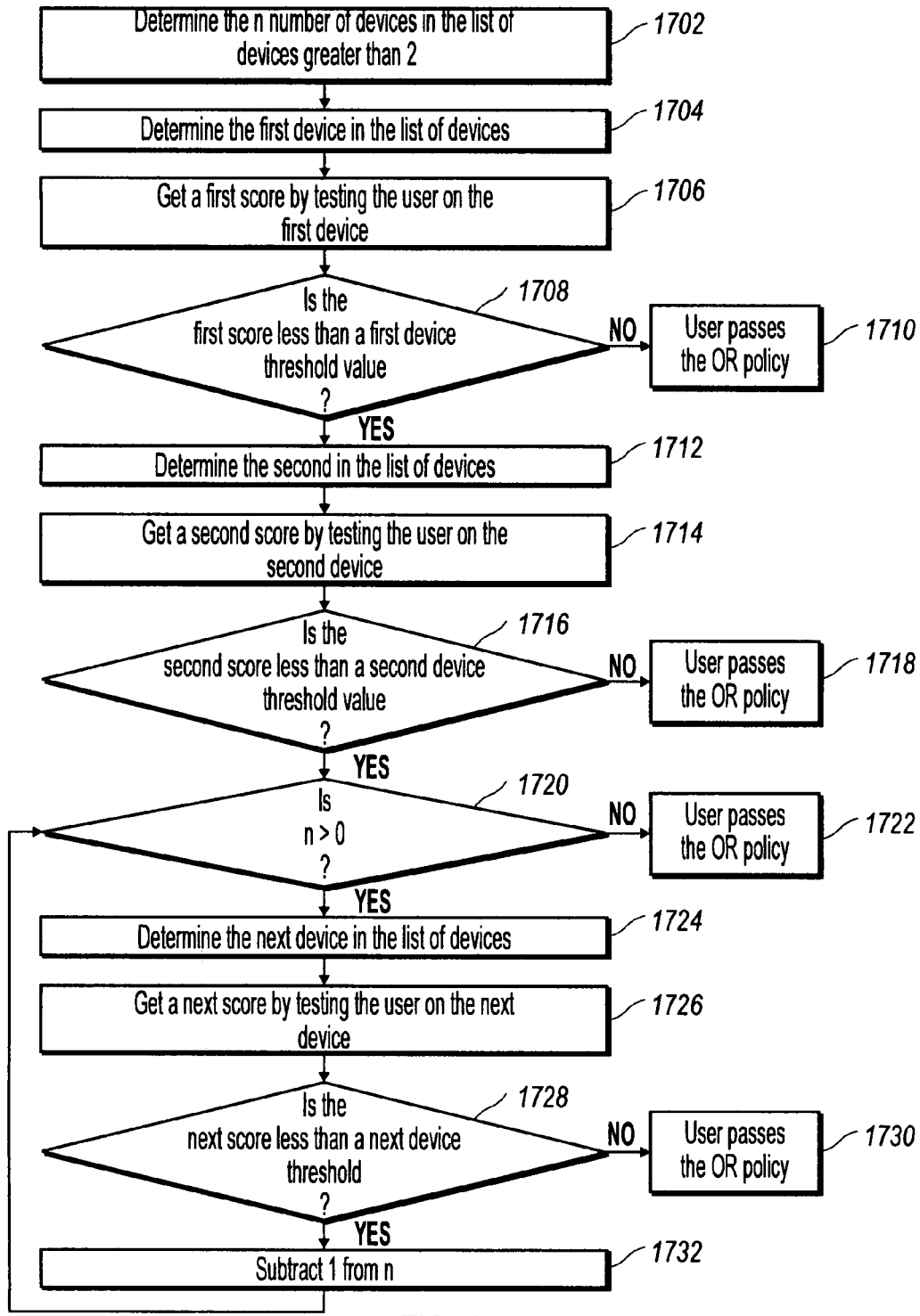
FIG. 17 is a flowchart illustrating the steps involved in executing an OR policy according to a preferred embodiment of the present invention.

The user passes an OR policy of the present invention (functions connected by OR) if the user passes one of the devices in the list of devices. For illustration purposes, assume all of the devices in the list of devices are a biometric device. However, the devices may be all biometric, all non-biometric, or some combination thereof. FIG. 17 is a flowchart illustrating the steps involved in executing the OR policy of the present invention. In step 1702, the n number of devices in the list of devices greater than two is determined. An OR policy will typically have at least two different devices in its list of devices. In step 1704, the first device in the list of devices is determined. Once the first device is determined, the user is tested on the first device to produce a first score in step 1706. In step 1708, the first score is compared to a first device threshold value. If the first score is greater than or equal to the first device threshold value, then control transfers to step 1710. In step 1710, the user has passed the OR policy and the flowchart in FIG. 17 ends. At this point the user has been authenticated by system 102 (FIG. 1). Alternatively, if in step 1708 the first score is less than the first device threshold value, then control transfers to step 1712.

In step 1712, the second device in the list of devices is determined. Once the second device is determined, the user is tested on the second device to produce a second score in step 1714. In step 1716, the second score is compared to a second device threshold value. If the second score is greater than or equal to the second device threshold value, then control transfers to step 1718. In step 1718, the user has passed the OR policy and the flowchart in FIG. 17 ends. At this point the user has been authenticated by system 102. Alternatively, if in step 1716 the second score is less than the second device threshold value, then control transfers to step 1720.

In step 1720, if n is not greater than zero, then control transfers to step 1722. If control transfers to step 1722 it means that the list of devices has only two devices in it and the user has failed both devices. In step 1722, the user has failed the OR policy and the flowchart in FIG. 17 ends. Alternatively, if in step 1720 $n$ is greater than zero, then control transfers to step 1724. In this situation the list of devices has more than two devices in it. In step 1724, the next device is determined. Once the next device is determined, the user is tested on the next device to produce a next score in step 1726. In step 1728, the next score is compared to a next device threshold value. If the next score is greater than or equal to the next device threshold value, then control transfers to step 1730. In step 1730, the user has passed the OR policy and the flowchart in FIG. 17 ends. At this point the user has been authenticated by system 102. Alternatively, if in step 1728 the next score is less than the next device threshold value, then control transfers to step 1732.

In step 1732, one is subtracted from n and control returns to step 1720. In step 1720, if n is not greater than zero then the user has failed all the devices in the list of devices. Here, control transfers to step 1722. In step 1722, the user has failed the OR policy and the flowchart in FIG. 17 ends. At this point the user has not been authenticated by system 102. Alternatively, if in step 1720 $n$ is greater than zero, this means there are still more devices in the list of devices that the user has not been tested on yet. The flowchart in FIG. 17 continues until the user has either failed all the devices or the user passes one device in the list of devices.

Although the OR policy will typically have at least two different devices in its list of devices, the list of devices may have a single device. Here, the user is tested on a single device with multiple measurements to pass the OR policy. For example, if the single device is a fingerprint device, the user may be required to pass the OR policy by being tested on the fingerprint device with the left index finger and by being tested on the fingerprint device with the right index finger. The user only needs to pass the fingerprint device using one of the measurements to pass the OR policy. Other single devices that can be used to test multiple measurements are facial image (different angles of a face), retina image (right and left retina), hand geometry (right and left hand), voice recognition (two different phrases), different lighting (visible and infra red), etc.

2. AND Policy

Figure 18:
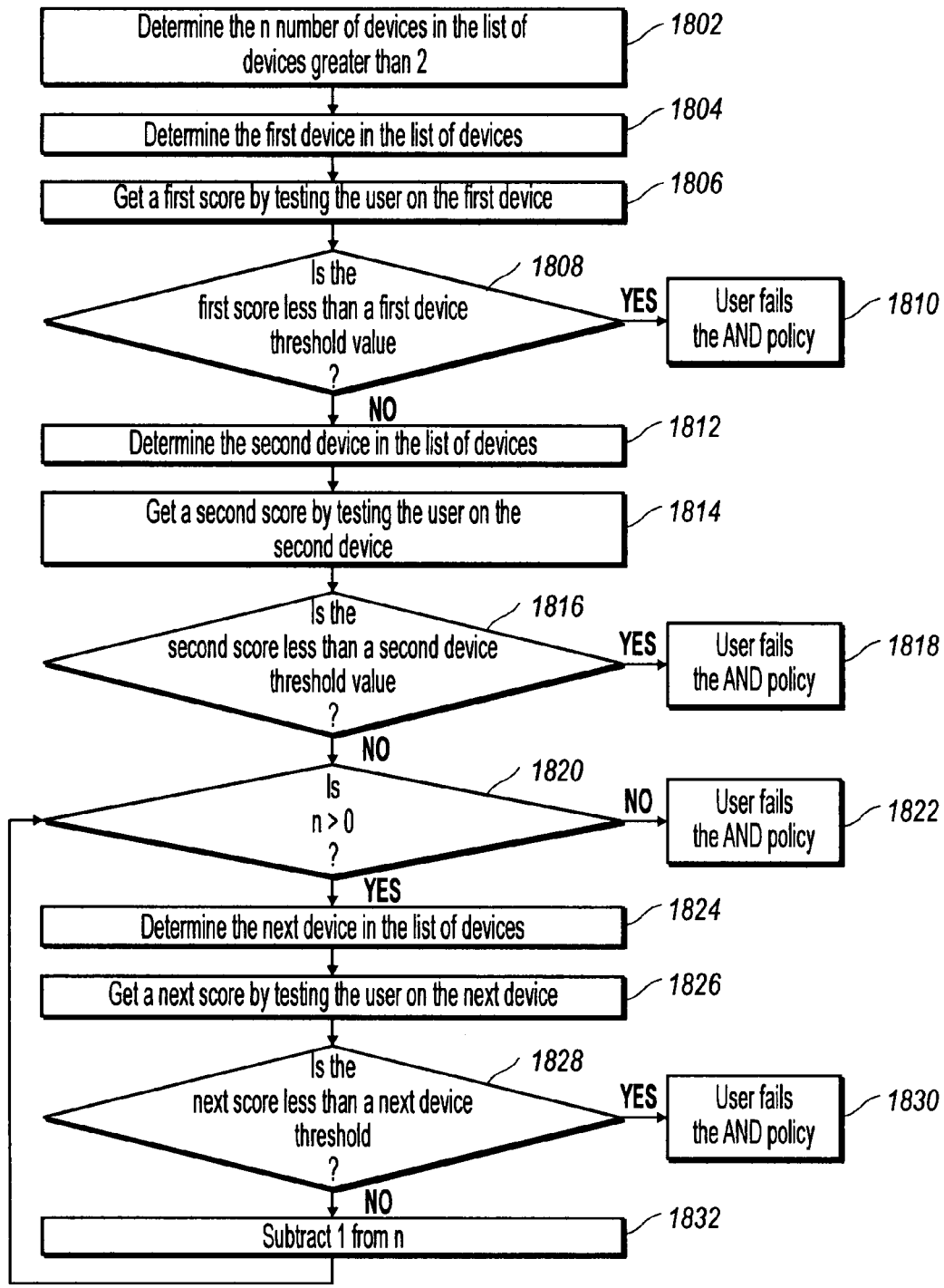
FIG. 18 is a flowchart illustrating the steps involved in executing an AND policy according to a preferred embodiment of the present invention.

The user passes an AND policy of the present invention (functions connected by AND) if the user passes all of the devices in the list of devices. For illustration purposes, assume all of the devices in the list of devices are a biometric device. However, the devices may be all biometric, all non-biometric, or some combination thereof. FIG. 18 is a flowchart illustrating the steps involved in executing the AND policy of the present invention. In step 1802, the n number of devices in the list of devices greater than two is determined. An AND policy will typically have at least two different devices in its list of devices. In step 1804, the first device in the list of devices is determined. Once the first device is determined, the user is tested on the first device to produce a first score in step 1806. In step 1808, the first score is compared to a first device threshold value. If the first score is less than the first device threshold value, then control transfers to step 1810. In step 1810, the user has failed the AND policy and the flowchart in FIG. 18 ends. At this point the user has not been authenticated by system 102 (FIG. 1). Alternatively, if in step 1808 the first score is greater than or equal to the first device threshold value, then control transfers to step 1812.

In step 1812, the second device in the list of devices is determined. Once the second device is determined, the user is tested on the second device to produce a second score in step 1814. In step 1816, the second score is compared to a second device threshold value. If the second score is less than the second device threshold value, then control transfers to step 1818. In step 1818, the user has failed the AND policy and the flowchart in FIG. 18 ends. At this point the user has not been authenticated by system 102. Alternatively, if in step 1816 the second score is greater than or equal to the second device threshold value, then control transfers to step 1820.

In step 1820, if n is not greater than zero, then control transfers to step 1822. If control transfers to step 1822 it means that the list of devices has only two devices in it and the user has passed both devices. In step 1822, the user has passed the AND policy and the flowchart in FIG. 18 ends. Alternatively, if in step 1820 n is greater than zero, then control transfers to step 1824. In this situation the list of devices has more than two devices in it. In step 1824, the next device is determined. Once the next device is determined, the user is tested on the next device to produce a next score in step 1826. In step 1828, the next score is compared to a next device threshold value. If the next score is less than the next device threshold value, then control transfers to step 1830. In step 1830, the user has failed the AND policy and the flowchart in FIG. 18 ends. At this point the user has not been authenticated by system 102. Alternatively, if in step 1828 the next score is greater than or equal to the next device threshold value, then control transfers to step 1832.

In step 1832, one is subtracted from n and control returns to step 1820. In step 1820, if n is not greater than zero then the user has passed all the devices in the list of devices. Here, control transfers to step 1822. In step 1822, the user has passed the AND policy and the flowchart in FIG. 18 ends. At this point the user has been authenticated by system 102. Alternatively, if in step 1820 n is greater than zero, this means there are still more devices in the list of devices that the user has not been tested on yet. The flowchart in FIG. 18 continues until the user has either passed all the devices or the user fails one device in the list of devices.

Although the AND policy will typically have at least two devices in its list of devices, the list of devices may have a single device. Here, the user is tested on a single device with multiple measurements to pass the AND policy. For example, if the single device is a fingerprint device, the user may be required to pass the AND policy by being tested on the fingerprint device with the left index finger and by being tested on the fingerprint device with the right index finger. The user needs to pass the fingerprint device using both of the measurements to pass the AND policy. As mentioned above with the OR policy, the other single devices can also be used with the AND policy to test multiple measurements.

3. CONTINGENT Policy

Figure 19:
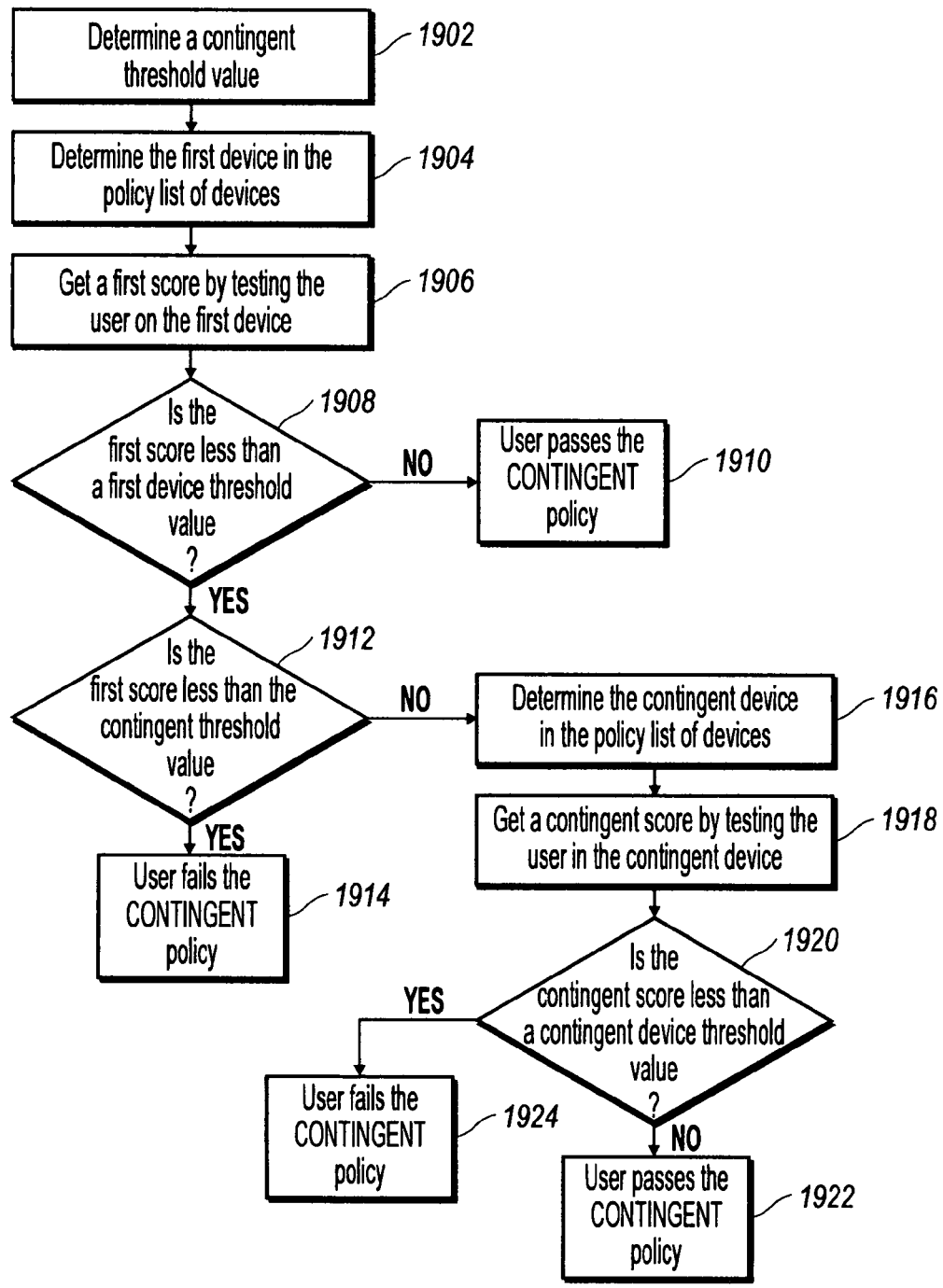
FIG. 19 is a flowchart illustrating the steps involved in executing a CONTINGENT policy according to a preferred embodiment of the present invention.

The user passes a CONTINGENT policy of the present invention if either the user exceeds a minimum threshold (i.e., a first device threshold value) associated with a first device or if the user exceeds a contingent threshold associated with the first device and the user exceeds a minimum threshold (i.e., a contingent device threshold value) associated with a contingent device. For illustration purposes, assume all of the devices in the list of devices are a biometric device. However, the devices may be all biometric, all non-biometric, or some combination thereof. FIG. 19 is a flowchart illustrating the steps involved in executing the CONTINGENT policy of the present invention. The are typically two different devices in the list of devices for the CONTINGENT policy. In step 1902, a contingent threshold value is determined. In step 1904, the first device in the list of devices is determined. Once the first device is determined, the user is tested on the first device to produce a first score in step 1906.

In step 1908, the first score is compared to a first device threshold value. If the first score is greater than or equal to the first device threshold value, then control transfers to step 1910. In step 1910, the user has passed the CONTINGENT policy and the flowchart in FIG. 19 ends. At this point the user has been authenticated by system 102 (FIG. 1). Alternatively, if in step 1908 the first score is less than the first device threshold value, then control transfers to step 1912.

In step 1912, the first score is compared to the contingent threshold value. In step 1912, if the first score is less than the contingent threshold value, then control transfers to step 1914. In step 1914, the user has failed the CONTINGENT policy. At this point the user has not been authenticated by system 102. Alternatively, if in step 1912 the first score is greater than or equal to the contingent threshold value, then control transfers to step 1916. The contingent threshold value is used to give the user a second chance to pass the CONTINGENT policy and thus be authenticated by system 102.

In step 1916, the contingent device in the list of devices is determined. The type of device selected for the contingent device may be based environmental conditions as discussed above. Once the contingent device is determined, the user is tested on the contingent device to produce a contingent score in step 1918. In step 1920, the contingent score is compared to a contingent device threshold value. If the contingent score is less than the contingent device threshold value, then control transfers to step 1924. In step 1924, the user has failed the CONTINGENT policy and the flowchart in FIG. 19 ends. At this point the user has not been authenticated by system 102. Alternatively, if in step 1920 the contingent score is greater than or equal to the contingent device threshold value, then control transfers to step 1922. In step 1922, the user has passed the CONTINGENT policy and the flowchart in FIG. 19 ends. At this point the user has been authenticated by system 102.

Although the CONTINGENT policy will typically have two devices in its list of devices, the list of devices may have a single device. Here, the user is tested on a single device with multiple measurements to pass the CONTINGENT policy. For example, if the single device is a fingerprint device, the user may be required to pass the CONTINGENT policy by being tested on the fingerprint device with the user's left index finger first. If the user passes the fingerprint device with his or her left index finger, then the user passes the CONTINGENT policy. If the user fails the fingerprint device with his or her left index finger, and the first score is greater than or equal to the contingent threshold value score, the user is tested on the fingerprint device with the right index finger. As mentioned above with the OR policy, the other single devices can also be used with the CONTINGENT policy to test multiple measurements.

4. RANDOM Policy

Figure 20:
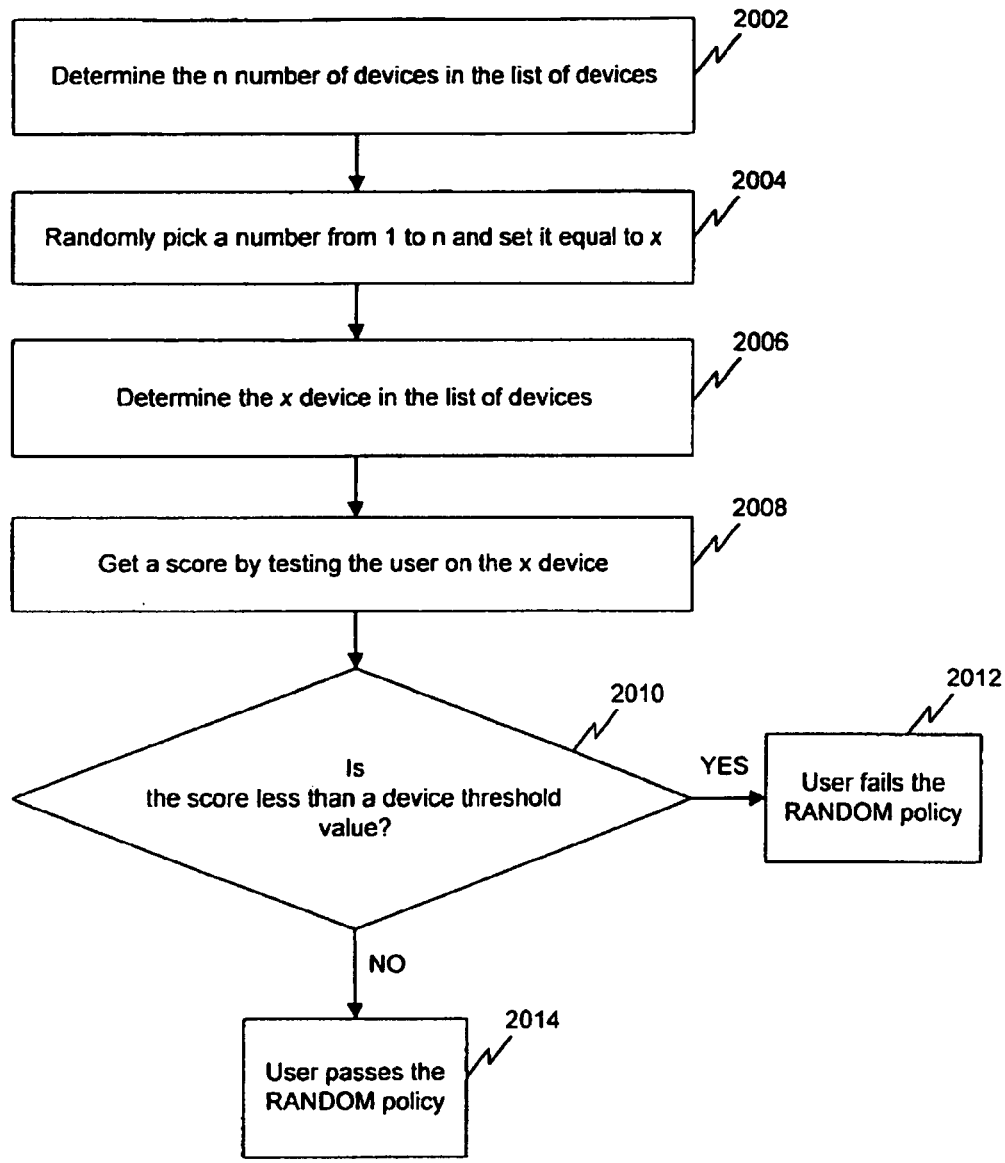
FIG. 20 is a flowchart illustrating the steps involved in executing a RANDOM policy according to a preferred embodiment of the present invention.

The user passes a RANDOM policy of the present invention if the user passes a random device. For illustration purposes, assume all of the devices in the list of devices are a biometric device. However, the devices may be all biometric, all non-biometric, or some combination thereof. FIG. 20 is a flowchart illustrating the steps involved in executing a RANDOM policy of the present invention. In step 2002, the n number of devices in the list of devices is determined. A RANDOM policy will typically have at least two different devices in its list of devices. In step 2004, a random number from one to n is picked and the random number is set equal to x. In step 2006, the X device in the list of devices is determined. Once the X device is determined, the user is tested on the X device to produce a score in step 2008.

In step 2010, the score is compared to a device threshold value. If the score is less than the device threshold value, then control transfers to step 2012. In step 2012, the user has failed the RANDOM policy and the flowchart in FIG. 20 ends. At this point the user has not been authenticated by system 102 (FIG. 1). Alternatively, if in step 2010 the score is greater than or equal to the device threshold value, then control transfers to step 2014. In step 2014, the user has passed the RANDOM policy and the flowchart in FIG. 20 ends. At this point the user has been authenticated by system 102.

The RANDOM policy is used to request a random measurement from the user each time the user attempts to be authenticated by system 102. Another embodiment of the RANDOM policy is to modify the list of devices to be a list of either fingerprints or word phrases. Here, the user may be tested on a random fingerprint (e.g., the index finger of the user's left hand). Alternatively, the user may be tested on a random word phrase (e.g., "My name is Bob Smith."). Although the RANDOM policy will typically have at least two different devices in its list of devices, the list of devices may have a single device. Here, the user is tested on a single device with any one of multiple measurements to pass the RANDOM policy. For example, if the single device is a fingerprint device, the user may be required to pass the RANDOM policy by being tested on any one of the user's fingers. If the user passes the fingerprint device with the random finger, then the user passes the RANDOM policy. As mentioned above with the OR policy, the other single devices can also be used with the RANDOM policy to test multiple measurements.

5. THRESHOLD Policy

Figure 21:
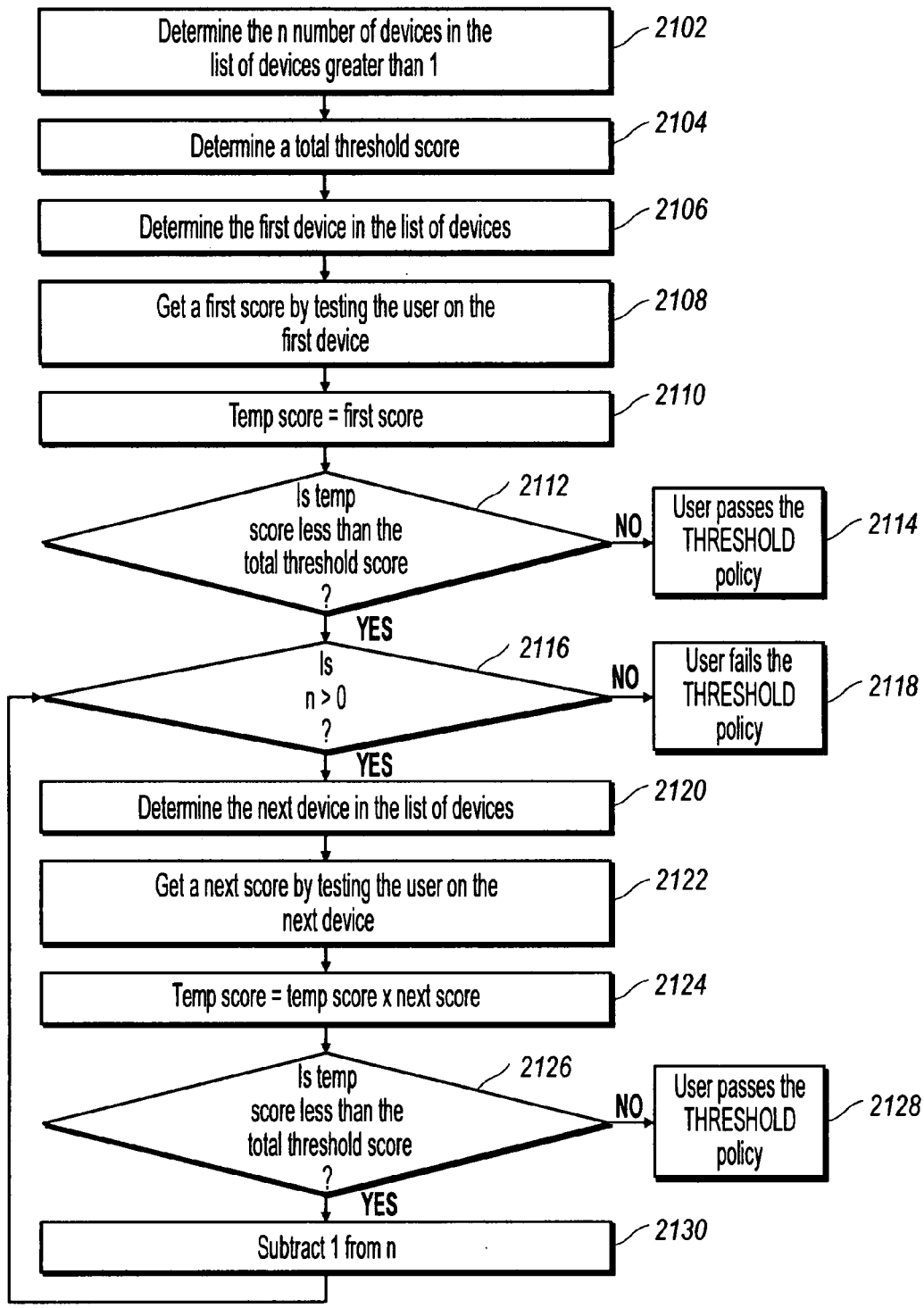
FIG. 21 is a flowchart illustrating the steps involved in executing a THRESHOLD policy according to a preferred embodiment of the present invention.

The user passes a THRESHOLD policy of the present invention if the user exceeds a total threshold (i.e., total threshold score) while being tested on one or more devices in the list of devices. For illustration purposes, assume all of the devices in the list of devices are a biometric device. However, the devices may be all biometric, all non-biometric, or some combination thereof. FIG. 21 is a flowchart illustrating the steps involved in executing a THRESHOLD policy of the present invention. In step 2102, the n number of devices in the list of devices greater than one is determined. A THRESHOLD policy typically has one or more different devices in its list of devices. In step 2104 a total threshold score is determined. In step 2106, the first device in the list of devices is determined. Once the first device is determined, the user is tested on the first device to produce a first score in step 2108.

In step 2110, a temp score is set equal to the first score. In step 2112, the temp score is compared to the total threshold score. If the temp score is greater than or equal to the total threshold score, then control transfers to step 2114. In step 2114, the user has passed the THRESHOLD policy and the flowchart in FIG. 21 ends. At this point the user has been authenticated by system 102 (FIG. 1). Alternatively, if in step 2112 the temp score is less than the total threshold score, then control transfers to step 2116.

In step 2116, if n is not greater than zero, then control transfers to step 2118. In step 2118, the user has failed the THRESHOLD policy and the flowchart in FIG. 21 ends. At this point the user has not been authenticated by system 102 (FIG. 1). Alternatively, if in step 2116 $n$ is greater than zero, then control transfers to step 2120. In step 2120, the next device in the list of devices is determined. Once the next device is determined, the user is tested on the next device to produce a next score in step 2122.

In step 2124, temp score gets multiplied by the next score and the product gets stored back into temp score. In another embodiment of the RANDOM policy, temp score may be added to the next score and the sum stored back into temp score. In step 2126, the temp score is compared to the total threshold score. If the temp score is greater than or equal to the total threshold score, then control transfers to step 2128. In step 2128, the user has passed the THRESHOLD policy and the flowchart in FIG. 21 ends. At this point the user has been authenticated by system 102 (FIG. 1). Alternatively, if in step 2126 the temp score is less than the total threshold score, then control transfers to step 2130.

In step 2130, one is subtracted from n and control returns to step 2116. In step 2116, if n is not greater than zero then the user has been tested all the devices in the list of devices. Here, control transfers to step 2118. In step 2118, the user has failed the THRESHOLD policy and the flowchart in FIG. 21 ends. At this point the user has not been authenticated by system 102. Alternatively, if in step 2116 $n$ is greater than zero, this means there are still more devices in the list of devices that the user has not been tested on yet. The flowchart in FIG. 21 continues until the user has either been tested on all the devices in the list of devices or temp score is greater than or equal to the total threshold score.

Although the THRESHOLD policy typically has one or more different devices in its list of devices, the list of devices may have a single device. Here, the user is tested on a single device with any one of multiple measurements to pass the THRESHOLD policy. For example, if the single device is a fingerprint device, the user may be required to pass the THRESHOLD policy by being tested on multiple fingers until the total threshold score is reached. As mentioned above with the OR policy, the other single devices can also be used with the THRESHOLD policy to test multiple measurements.

6. Policies Having a List of Policies

As discussed above, the present invention allows for administrator-defined policies. Once type of administrator-defined policy is a policy having a list of policies. Here, instead of the policy having a list of devices as discussed above, this type of policy has a list of policies. The types of policies that can be listed in the list of policies include any policy discussed herein. The other type of administrator-defined policy is a policy having a policy list of policies or devices.

a. OR Policy Having a List of Policies

Figure 22:
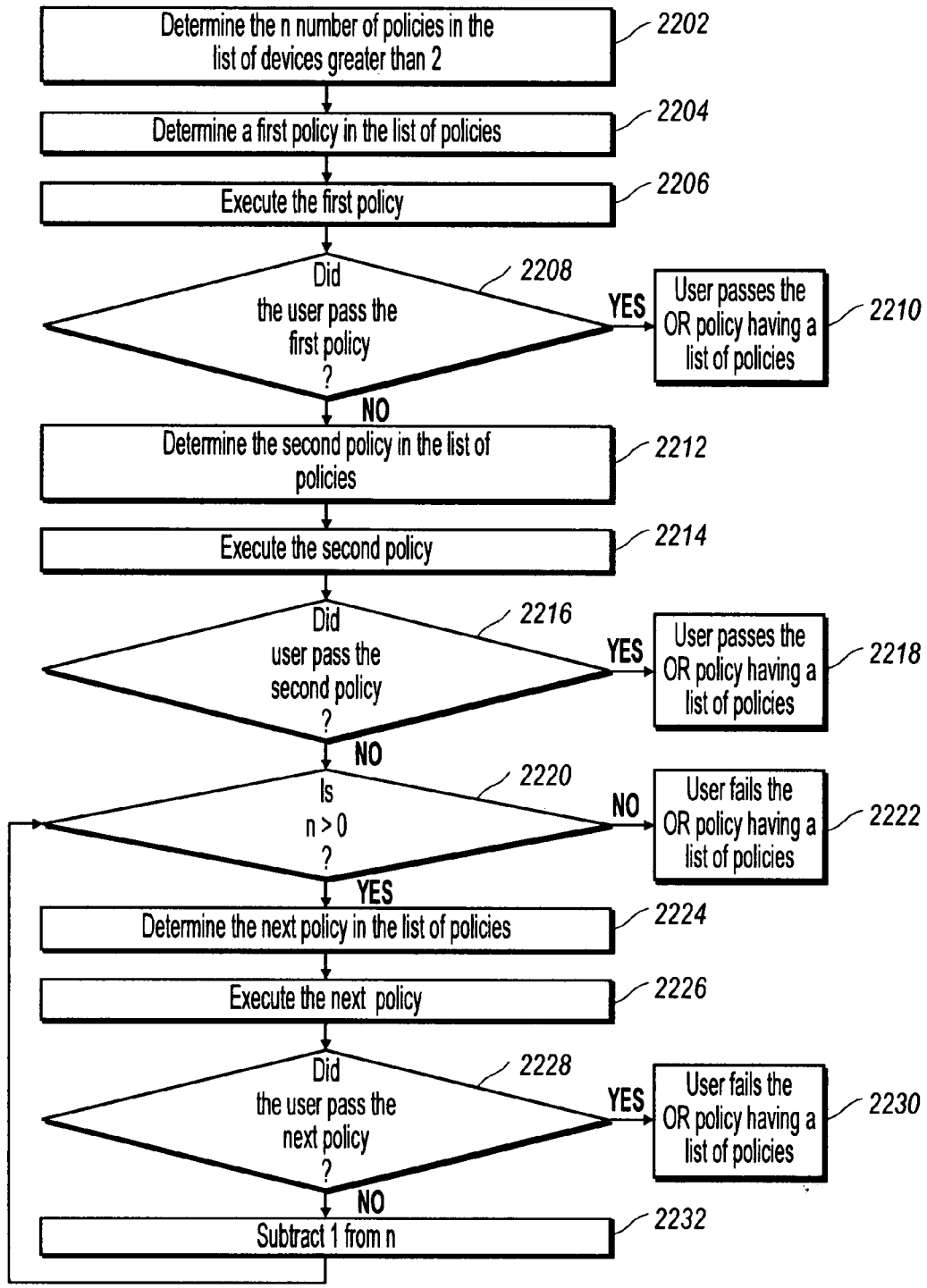
FIG. 22 is a flowchart illustrating the steps involved in executing OR policy having a list of policies according to a preferred embodiment of the present invention.

The user passes an OR policy having a list of policies of the present invention if the user passes one of the policies in the list of policies. FIG. 22 is a flowchart illustrating the steps involved in executing the OR policy having a list of policies of the present invention. In step 2202, the n number of policies in the list of policies greater than two is determined. The OR policy will always have at least two policies in its list of policies. In step 2204, the first policy in the list of policies is determined. Once the first policy is determined, the first policy is executed in step 2206. Here, the steps in the flowchart that applies to the first policy are executed. For example, if the first policy is a CONTINGENT policy, then the flowchart in FIG. 19 would be executed. Referring to FIG. 19, the outcome of FIG. 19 is either the user passes or fails the CONTINGENT policy. Therefore, this information gets returned to step 2206 of FIG. 22.

In step 2208, if the user passes the first policy, then control transfers to step 2210. In step 2210, the user has passed the OR policy and the flowchart in FIG. 22 ends. At this point the user has been authenticated by system 102 (FIG. 1). Alternatively, if in step 2208 the user fails the first policy, then control transfers to step 2212.

In step 2212, the second policy in the list of policies is determined. Once the second policy is determined, the second policy is executed in step 2214. Here, the steps in the flowchart that applies to the second policy are executed. For example, the second policy can be the same type of policy as the first policy or it can be one of the other policies.

In step 2216, if the user passes the second policy, then control transfers to step 2218. In step 2218, the user has passed the OR policy and the flowchart in FIG. 22 ends. At this point the user has been authenticated by system 102. Alternatively, if in step 2216 the user fails the second policy, then control transfers to step 2220.

In step 1220, if n is not greater than zero, then control transfers to step 2222. If control transfers to step 2222 it means that the list of policies has only two policies in it and the user has failed both policies. In step 2222, the user has failed the OR policy and the flowchart in FIG. 22 ends. At this point the user has not been authenticated by system 102. Alternatively, if in step 2220 n is greater than zero, then control transfers to step 2224. In this situation the list of policies has more than two policies in it. In step 2224, the next policy is determined. Once the next policy is determined, the next policy is executed in step 2226.

In step 2228, if the user passes the next policy, then control transfers to step 2230. In step 2230, the user has passed the OR policy and the flowchart in FIG. 22 ends. At this point the user has been authenticated by system 102. Alternatively, if in step 2228 the user fails the next policy, then control transfers to step 2232.

In step 2232, one is subtracted from n and control returns to step 2220. In step 2220, if n is not greater than zero then the user has failed all the policies in the list of policies. Here, control transfers to step 2222. In step 2222, the user has failed the OR policy and the flowchart in FIG. 22 ends. At this point the user has not been authenticated by system 102. Alternatively, if in step 2220 n is greater than zero, this means there are still more policies in the list of policies that have not been executed. The flowchart in FIG. 22 continues until the user has either failed all the policies or the user passes one policy in the list of policies.

b. AND Policy Having a List of Policies

Figure 23:
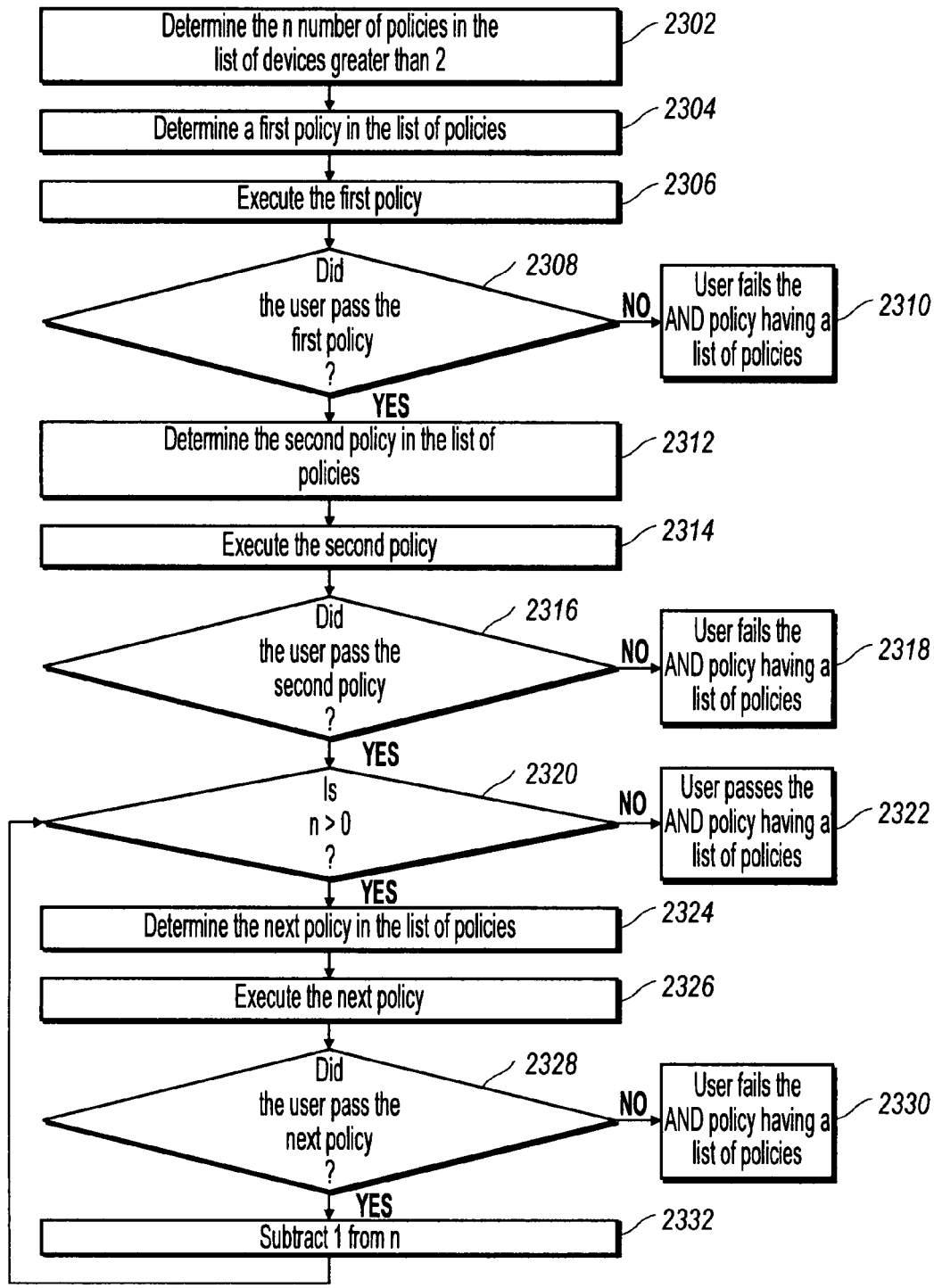
FIG. 23 is a flowchart illustrating the steps involved in executing an AND policy having a list of policies according to a preferred embodiment of the present invention.

The user passes an AND policy having a list of policies of the present invention if the user passes all of the policies in the list of policies. FIG. 23 is a flowchart illustrating the steps involved in executing an AND policy having a list of policies of the present invention. In step 2302, the n number of policies in the list of policies greater than two is determined. This type of AND policy will always have at least two policies in its list of policies. In step 2304, the first policy in the list of policies is determined. Once the first policy is determined, the first policy is executed in step 2306. Here, the steps in the flowchart that applies to the first policy are executed. For example, if the first policy is a AND policy, then the flowchart in FIG. 18 would be executed. Referring to FIG. 18, the outcome of FIG. 18 is either the user passes or fails the AND policy. Therefore, this information gets returned to step 2306 of FIG. 23.

In step 2308, if the user fails the first policy, then control transfers to step 2310. In step 2310, the user has failed the AND policy and the flowchart in FIG. 23 ends. At this point the user has not been authenticated by system 102 (FIG. 1). Alternatively, if in step 2308 the user passes the first policy, then control transfers to step 2312.

In step 2312, the second policy in the list of policies is determined. Once the second policy is determined, the second policy is executed in step 2314. Here, the steps in the flowchart that apply to the second policy are executed.

In step 2316, if the user fails the second policy, then control transfers to step 2318. In step 2318, the user has failed the AND policy and the flowchart in FIG. 23 ends. At this point the user has not been authenticated by system 102. Alternatively, if in step 2316 the user passes the second policy, then control transfers to step 2320.

In step 1320, if n is not greater than zero, then control transfers to step 2322. If control transfers to step 2322 it means that the list of policies has only two policies in it and the user has passed both policies. In step 2322, the user has passed the AND policy and the flowchart in FIG. 23 ends. At this point the user has been authenticated by system 102. Alternatively, if in step 2320 n is greater than zero, then control transfers to step 2324. In this situation the list of policies has more than two policies in it. In step 2324, the next policy is determined. Once the next policy is determined, the next policy is executed in step 2326.

In step 2328, if the user fails the next policy, then control transfers to step 2330. In step 2330, the user has failed the AND policy and the flowchart in FIG. 23 ends. At this point the user has not been authenticated by system 102. Alternatively, if in step 2328 the user passes the next policy, then control transfers to step 2332.

In step 2332, one is subtracted from n and control returns to step 2320. In step 2320, if n is not greater than zero then the user has passed all the policies in the list of policies. Here, control transfers to step 2322. In step 2322, the user has passed the AND policy and the flowchart in FIG. 23 ends. At this point the user has been authenticated by system 102. Alternatively, if in step 2320 n is greater than zero, this means there are still more policies in the list of policies that have not been executed. The flowchart in FIG. 23 continues until the user has either passed all the policies or the user fails one policy in the list of policies.

C. RANDOM Policy Having a List of Policies

Figure 24:
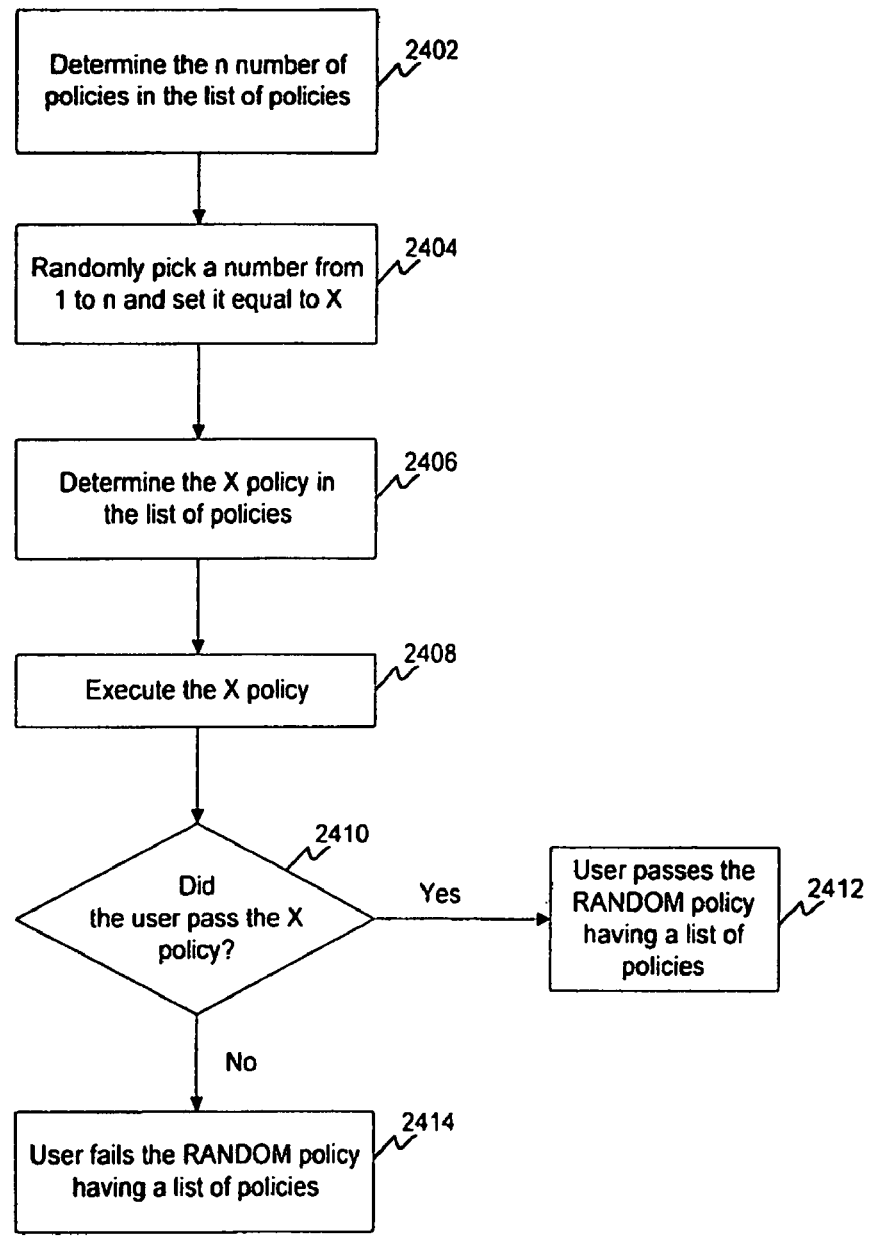
FIG. 24 is a flowchart illustrating the steps involved in executing a RANDOM policy having a list of policies according to a preferred embodiment of the present invention.

The user passes a RANDOM policy having a list of policies of the present invention if the user passes a random policy. FIG. 24 is a flowchart illustrating the steps involved in executing the RANDOM policy having a list of policies of the present invention. In step 2402, the n number of policies in the list of policies is determined. This type of RANDOM policy will always have at least two policies in its list of policies. In step 2404, a random number from one to n is picked and the random number is set equal to x. In step 2406, the x policy in the list of policies is determined. Once the x policy is determined, the x policy is executed in step 2408. Here, the steps in the flowchart that applies to the first policy are executed.

In step 2410, if the user passes the x policy, then control transfers to step 2412. In step 2412, the user has passed the RANDOM policy and the flowchart in FIG. 24 ends. At this point the user has been authenticated by system 102. Alternatively, if in step 2410 the user fails the x policy, then control transfers to step 2414. In step 2414, the user has failed the RANDOM policy and the flowchart in FIG. 24 ends. At this point the user has not been authenticated by system 102.

The RANDOM policy having a list of policies is used to request the user to pass a random policy 504 each time the user attempts to be authenticated by system 102.

d. CONTINGENT Policy Having a List of Policies

As discussed above each policy returns a pass/fail result. In addition, the policy can also provide one or more threshold values relating to the devices in the list of devices associated with the policy. In other words, each policy returns a composite threshold value that is generated from one or more of the threshold values generated by the devices. The composite threshold values are returned regardless of whether the policy was passed or failed by the user. These composite threshold values can then be used by a CONTINGENT policy having a list of policies. This feature provides the administrator with flexibility to adjust the level of authentication.

Figure 31:
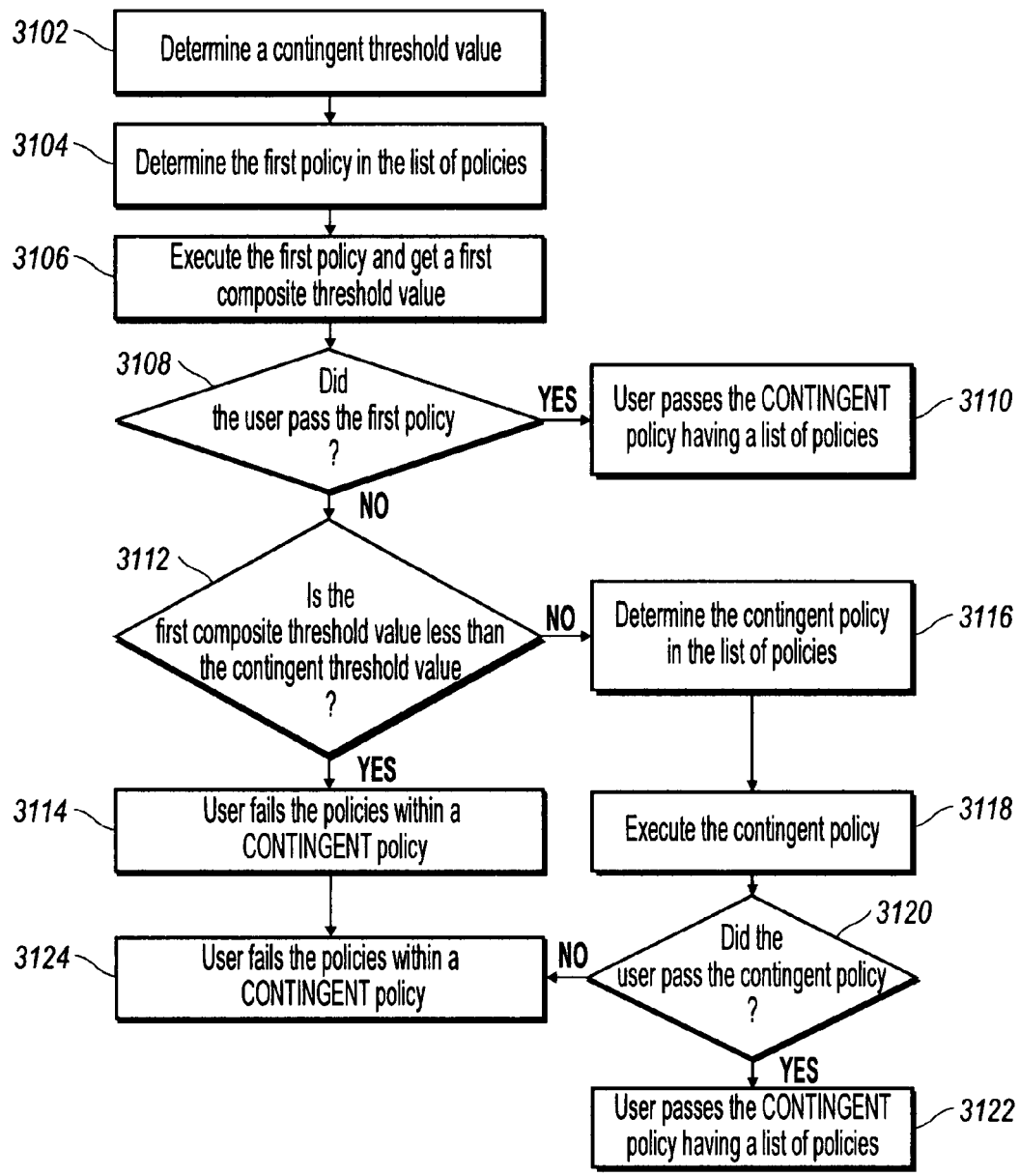
FIG. 31 is a flowchart illustrating the steps involved in executing a CONTINGENT policy having a list of policies according to a preferred embodiment of the present invention.

The user passes a CONTINGENT policy having a list of policies of the present invention if either the user exceeds a minimum threshold (i.e., a first composite threshold value) associated with a first policy or if the user exceeds a contingent threshold associated with the first policy and the user exceeds a minimum threshold (i.e., a contingent threshold value) associated with a contingent policy. FIG. 31 is a flowchart illustrating the steps involved in executing the CONTINGENT policy having a list of policies of the present invention. With this type of CONTINGENT policy there is always two policies in the list of policies.

In step 3102, a contingent threshold value is determined. In step 3104, the first policy in the list of policies is determined. Once the first policy is determined, then the first policy is executed in step 3106. The results from the execution of the first policy are whether or not the user passed the first policy and a first composite threshold value.

In step 3108, whether the user passed the first policy is determined. If the user passed the first policy, then control transfers to step 3110. In step 3110, the user has passed the CONTINGENT policy and the flowchart in FIG. 31 ends. At this point the user has been authenticated by system 102 (FIG. 1). Alternatively, if in step 3108 the user failed the first policy, then control transfers to step 3112.

In step 3112, the first composite threshold value is compared to the contingent threshold value. If the first composite threshold value is less than the contingent threshold value, then control transfers to step 3114. In step 3114, the user has failed the CONTINGENT policy. At this point the user has not been authenticated by system 102. Alternatively, if in step 3112 the first composite threshold value is greater than or equal to the contingent threshold value, then control transfers to step 3116. The contingent threshold value is used to give the user a second chance to pass the CONTINGENT policy and thus be authenticated by system 102.

In step 3116, the contingent policy in the list of policies is determined. Once the contingent policy is determined, then the contingent policy is executed in step 3118. In step 3120, if the user passed the contingent policy, then control transfers to step 3122. In step 3122, the user has passed the CONTINGENT policy and the flowchart in FIG. 31 ends. At this point the user has been authenticated by system 102. Alternatively, if in step 3120 the user failed the contingent policy, then control transfers to step 3124. In step 3124, the user has failed the CONTINGENT policy and the flowchart in FIG. 31 ends. At this point the user has not been authenticated by system 102.

e. THRESHOLD Policy Having a List of Policies

As discussed above each policy returns a pass/fail result. In addition, the policy can also provide one or more threshold values relating to the devices in the list of devices associated with the policy. In other words, each policy returns a composite threshold value that is generated from one or more of the threshold values generated by the devices. The composite threshold values are returned regardless of whether the policy was passed or failed by the user. These composite threshold values can then be used by a THRESHOLD policy having a list of policies. This feature provides the administrator with flexibility to adjust the level of authentication.

Figure 32:
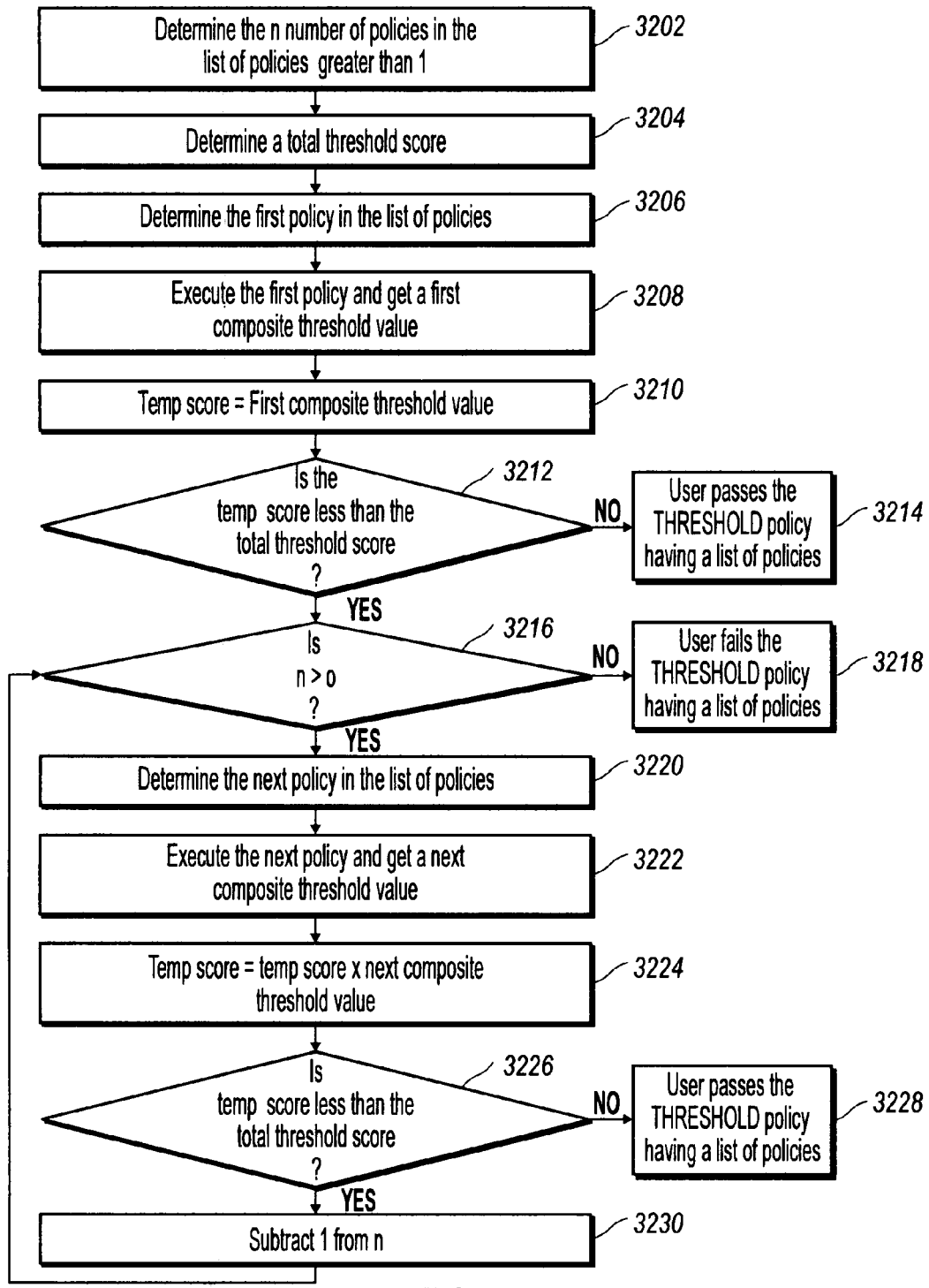
FIG. 32 is a flowchart illustrating the steps involved in executing a THRESHOLD policy having a list of policies according to a preferred embodiment of the present invention.

The user passes a THRESHOLD policy having a list of policies of the present invention if the user exceeds a total threshold (i.e., total threshold score) while being tested on one or more policies in the list of policies. FIG. 32 is a flowchart illustrating the steps involved in executing the THRESHOLD policy having a list of policies of the present invention. In step 3202, the n number of policies in the list of policies greater than one is determined. This type of THRESHOLD policy can have one or more policies in its list of policies. In step 3204 a total threshold score is determined. In step 3206, the first policy in the list of policies is determined. Once the first policy is determined, the first policy is executed in step 3208. The results from the execution of the first policy are whether or not the user passed the first policy and a first composite threshold value.

In step 3210, a temp score is set equal to the first composite threshold value. In step 3212, the temp score is compared to the total threshold score. If the temp score is greater than or equal to the total threshold score, then control transfers to step 3214. In step 3214, the user has passed the THRESHOLD policy and the flowchart in FIG. 32 ends. At this point the user has been authenticated by system 102 (FIG. 1). Alternatively, if in step 3212 the temp score is less than the total threshold score, then control transfers to step 3216.

In step 3216, if n is not greater than zero, then control transfers to step 3218. In step 3218, the user has failed the THRESHOLD policy and the flowchart in FIG. 32 ends. At this point the user has not been authenticated by system 102 (FIG. 1). Alternatively, if in step 3216 $n$ is greater than zero, then control transfers to step 3220. In step 3220, the next policy in the list of policies is determined. Once the next policy is determined, the next policy gets executed in step 3222. The results from the execution of the next policy are whether or not the user passed the next policy and a next composite threshold value.

In step 3224, temp score gets multiplied by the next composite threshold value and the product gets stored back into temp score. In step 3226, the temp score is compared to the total threshold score. If the temp score is greater than or equal to the total threshold score, then control transfers to step 3228. In step 3228, the user has passed the THRESHOLD policy and the flowchart in FIG. 32 ends. At this point the user has been authenticated by system 102. Alternatively, if in step 3226 the temp score is less than the total threshold score, then control transfers to step 3230.

In step 3230, one is subtracted from n and control returns to step 3216. In step 3216, if n is not greater than zero then all the policies in the list of policies have been executed. Here, control transfers to step 3218. In step 3218, the user has failed the THRESHOLD policy and the flowchart in FIG. 32 ends. At this point the user has not been authenticated by system 102. Alternatively, if in step 3216 *n* is greater than zero, this means there are still more policies in the list of policies that have not been executed. The flowchart in FIG. 32 continues until all the policies in the list of policies have been executed or temp score is greater than or equal to the total threshold score.

7. Policies Having a List of Policies or Devices

The other type of administrator-defined policy is a policy with a policy list of policies or devices. This administrator-defined policy allows for the combined use of biometric devices, non-biometric devices and/or policies. This type of policy gives added flexibility that all the other policies mentioned above do not provide. With this type of policy, it is possible for a user to be authenticated by system 102 by being tested on a single device. This is important because it provides flexibility in converting to system 102 by not having to enroll all users at the same time with devices. Here, a user can continue to use the device the user has always used to log into system 102.

There are two ways in which system 102 provides flexibility in rolling out system 102 by not having to enroll all users at the same time with devices. The first way is by not assigning a user to a group 506. Here, when system 102 discovers that the user does not have a group 506, the previous way of allowing users to gain access to enterprise resources (e.g., passwords, tokens or smart cards) takes control to authenticate the user. The second way is when the administrator has assigned the user to a group 506. The second way involves an OR policy with a list of policies or devices of the present invention as described below.

If the user has been assigned to a group 506, then the flexibility of not requiring all users to be enrolled in devices at the same time requires a slight variation from what was described in reference to FIGS. 8A and 8B above. As described above, in step 811, database object 710 (FIG. 7) determines whether the required templates 502 (FIG. 5) for the user are stored in object 710 (FIG. 7) to execute the user's policy 504 (FIG. 5). In addition, database object 710 also determines if computer 208 (FIG. 2) has the required devices attached to it to execute the user's policy 504. If the required templates 502 or the required devices do not exist, then control transfers to step 836. In step 836, server 104 (FIG. 1) communicates to computer 208 that the user cannot be authenticated. Authentication interface 704 (FIG. 7) then denies the user access. Therefore, to provide the flexibility of not requiring all users to be enrolled in devices at the same time, server 104 knows when to skip over step 811 (e.g., a flag) and go directly to step 812 (FIGS. 8A and 8B).

a. OR Policy Having a List of Policies or Devices

Figure 25A:
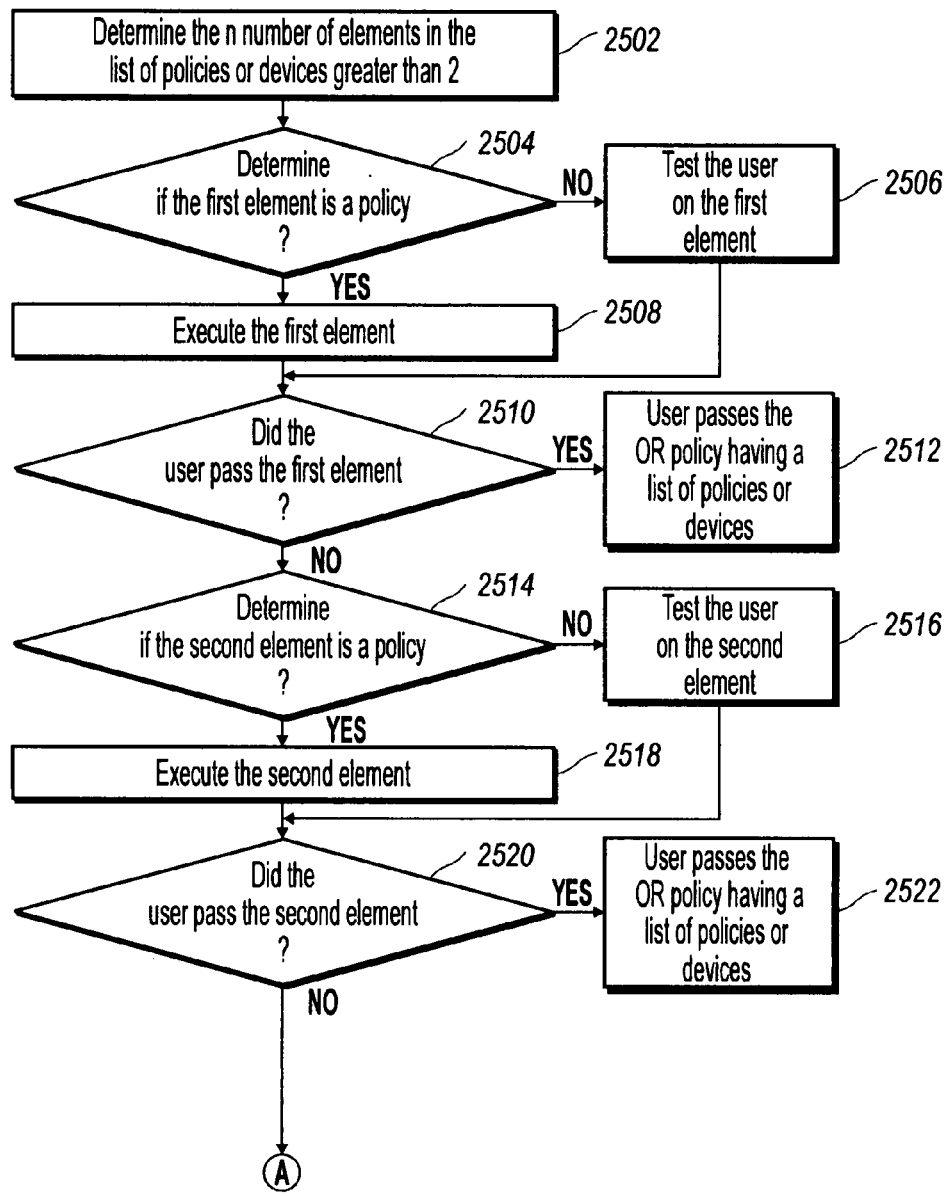
FIG. 25 is a flowchart illustrating the steps involved in executing an OR policy having a list of policies or devices according to a preferred embodiment of the present invention.
Figure 25B:
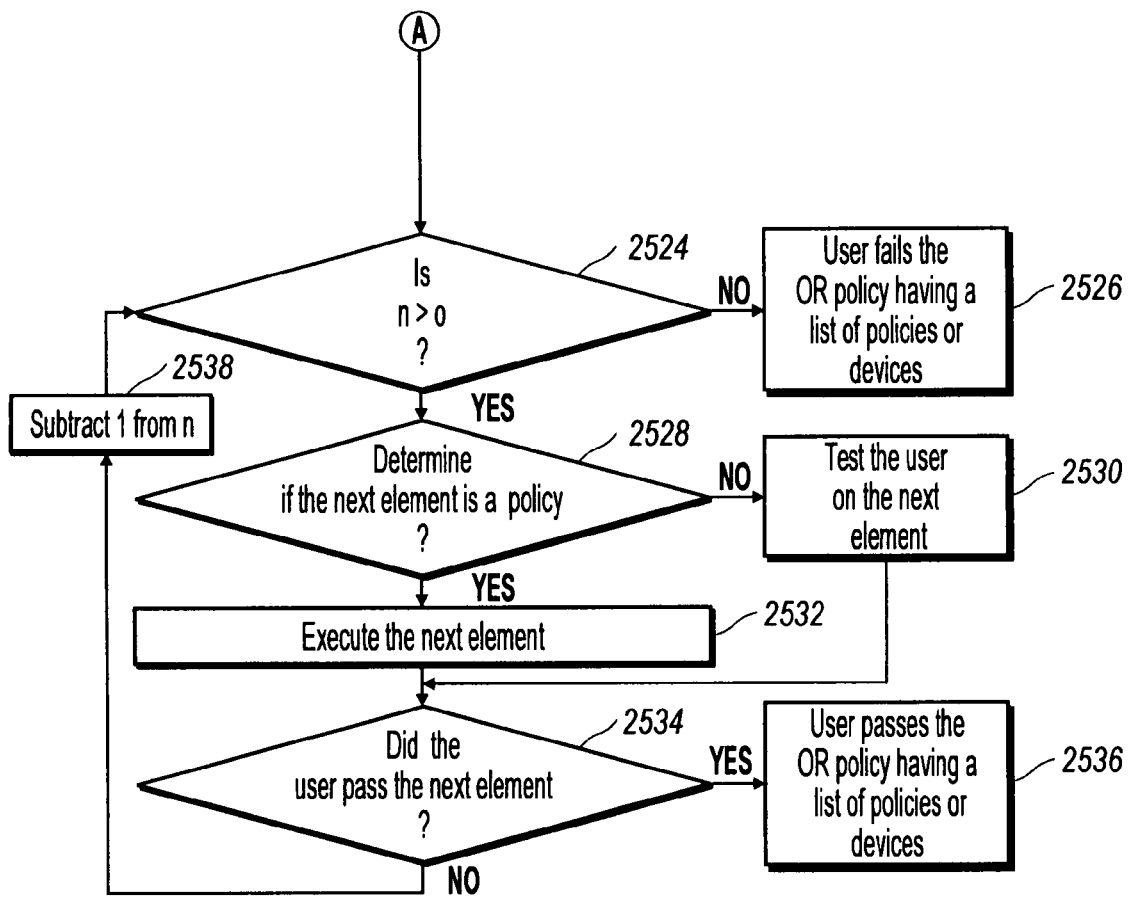

The user passes an OR policy having a list of policies or devices of the present invention if the user passes one of the elements in the list of policies or devices. FIG. 25 is a flowchart illustrating the steps involved in executing the OR policy having a list of policies or devices of the present invention. In step 2502, the n number of elements in the list of policies or devices greater than two is determined. An element can be one of the polices described herein, a device or a non-biometric device. This type of OR policy will always have at least two elements in its list of polices or devices. In step 2504, it is determined whether the first element in the list of policies or devices is a policy. If the first element is not a policy, then control transfers to step 2506.

In step 2506, the first element is either a biometric or a non-biometric device. FIGS. 8A, 8B and 9 involve the user being tested on a device. Referring again to FIGS. 8A, 8B and 9, when a user gets tested on a device, the result returned may include both a score (if applicable) and whether the user passed or failed the device. The flowchart in FIG. 25 utilizes the information of whether the user passed or failed only. As with devices, when the user is tested on a non-biometric device, the result includes whether the user passed or failed the non-biometric device. Thus, in step 2506, the user is tested on the first element (i.e., either a or a non-biometric device) and the result indicates whether the user passed or failed the first element (i.e., the device).

Alternatively, in step 2504, if the first element is a policy, then control transfers to step 2508. In step 2508, the first element (i.e., the policy) is executed and the result indicates whether the user passed or failed the first element (i.e., the policy). Whether the first element is a policy or a device, controls transfers to step 2510.

In step 2510, if the user passes the first element, then control transfers to step 2512. In step 2512, the user has passed the OR policy and the flowchart in FIG. 25 ends. At this point the user has been authenticated by system 102 (FIG. 1). An example of the flexibility system 102 provides by not forcing all users to be enrolled in system 102 at the same time can be illustrated here. Assume the non-biometric device the user has used in the past to gain access to enterprise resources is a password device. If the first element in the list of policies or devices is a password device, the user can be authenticated by system 102 by passing the password device.

Alternatively, if in step 2510 the user fails the first element, then control transfers to step 2514. In step 2514, it is determined whether the second element in the list of policies or devices is a policy. If the second element is not a policy, then control transfers to step 2516. In step 2516, the second element is either a biometric or a non-biometric device. The user is tested on the second element and the result indicates whether the user passed or failed the second element (i.e, the device).

Alternatively, in step 2514, if the second element is a policy, then control transfer to step 2518. The second element is executed to determine whether the user passes or fails the second element (i.e., the policy). Whether the second element is a policy or a device, control transfers to step 2520. In step 2520, if the user passes the second element, then control transfers to step 2522. In step 2522, the user has passed the OR policy and the flowchart in FIG. 25 ends. At this point the user has been authenticated by system 102. Alternatively, if in step 2520 the user fails the second element, then control transfers to step 2524.

In step 2524, if n is not greater than zero, then control transfers to step 2526. If control transfers to step 2526 it means that the list of policies or devices has only two elements in it and the user has failed both elements. In step 2526, the user has failed the OR policy and the flowchart in FIG. 25 ends. At this point the user has not been authenticated by system 102. Alternatively, if in step 2524 n is greater than zero, then control transfers to step 2528. In this situation the list of policies or devices has more than two elements in it.

In step 2528, it is determined whether the next element in the list of policies or devices is a policy. If the next element is not a policy, then control transfers to step 2530. In step 2530, the next element is either a biometric or a non-biometric device. The user is tested on the next element and the result indicates whether the user passed or failed the next element (i.e, the device).

Alternatively, in step 2528, if the next element is a policy, then control transfers to step 2532. The next element is executed to determine whether the user passes or fails the next element (i.e., the policy). Whether the next element is a policy or a device, control transfers to step 2534. In step 2534, if the user passes the next element, then control transfers to step 2536. In step 2536, the user has passed the OR policy and the flowchart in FIG. 25 ends. At this point the user has been authenticated by system 102 (FIG. 1). Alternatively, if in step 2534 the user fails the next element, then control transfers to step 2538.

In step 2538, one is subtracted from n and control returns to step 2524. In step 2524, if n is not greater than zero then the user has failed all the elements in the list of policies or devices. Here, control transfers to step 2526. In step 2526, the user has failed the OR policy and the flowchart in FIG. 25 ends. At this point the user has not been authenticated by system 102. Alternatively, if in step 2524 $n$ is greater than zero, this means there are still more elements in the list of policies or devices. The flowchart in FIG. 25 continues until the user has either failed all the elements or the user passes one element in the list of policies or devices.

b. AND Policy Having a List of Policies or Devices

Figure 26A:
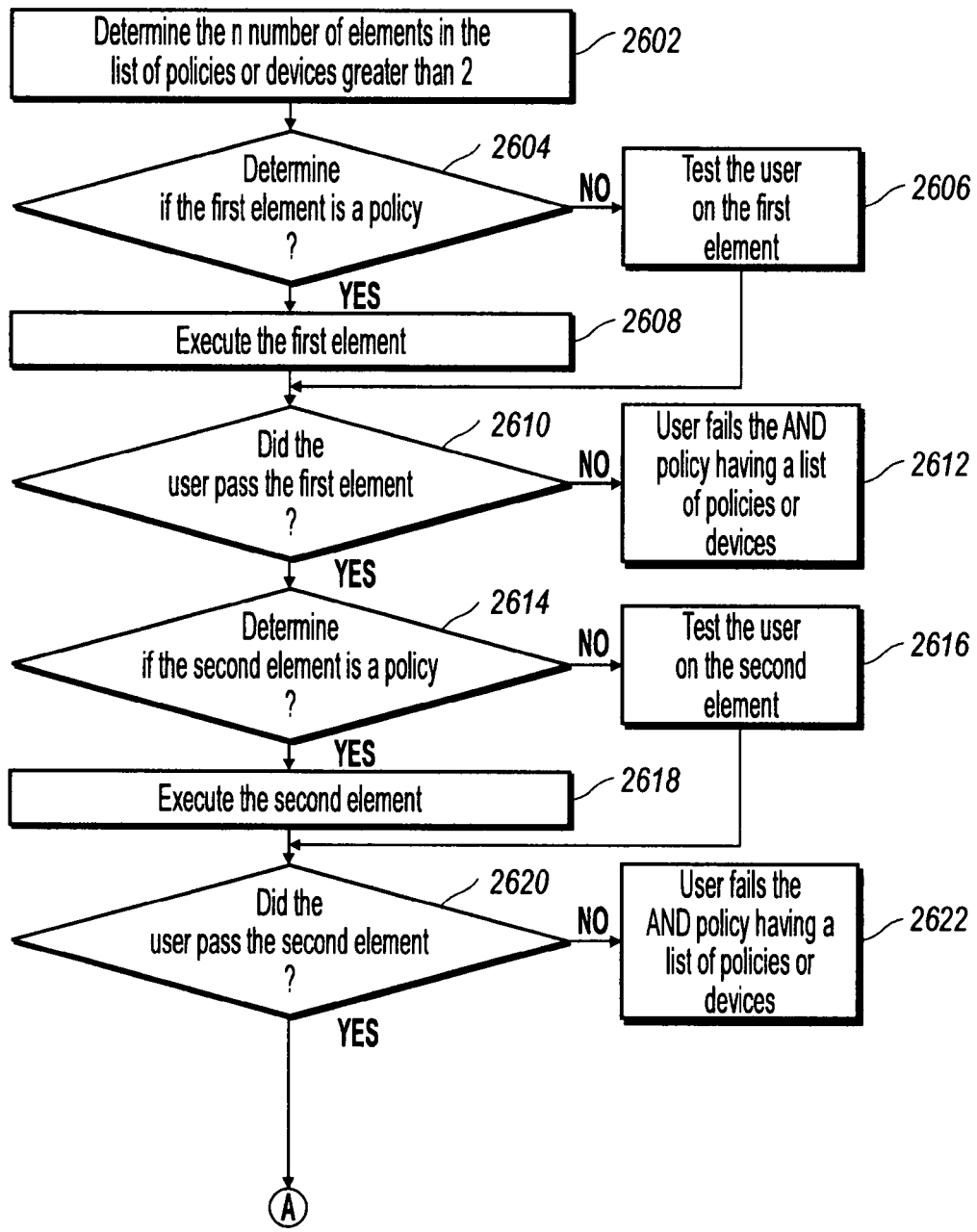
FIG. 26 is a flowchart illustrating the steps involved in executing an AND policy having a list of policies or devices according to a preferred embodiment of the present invention.
Figure 26B:
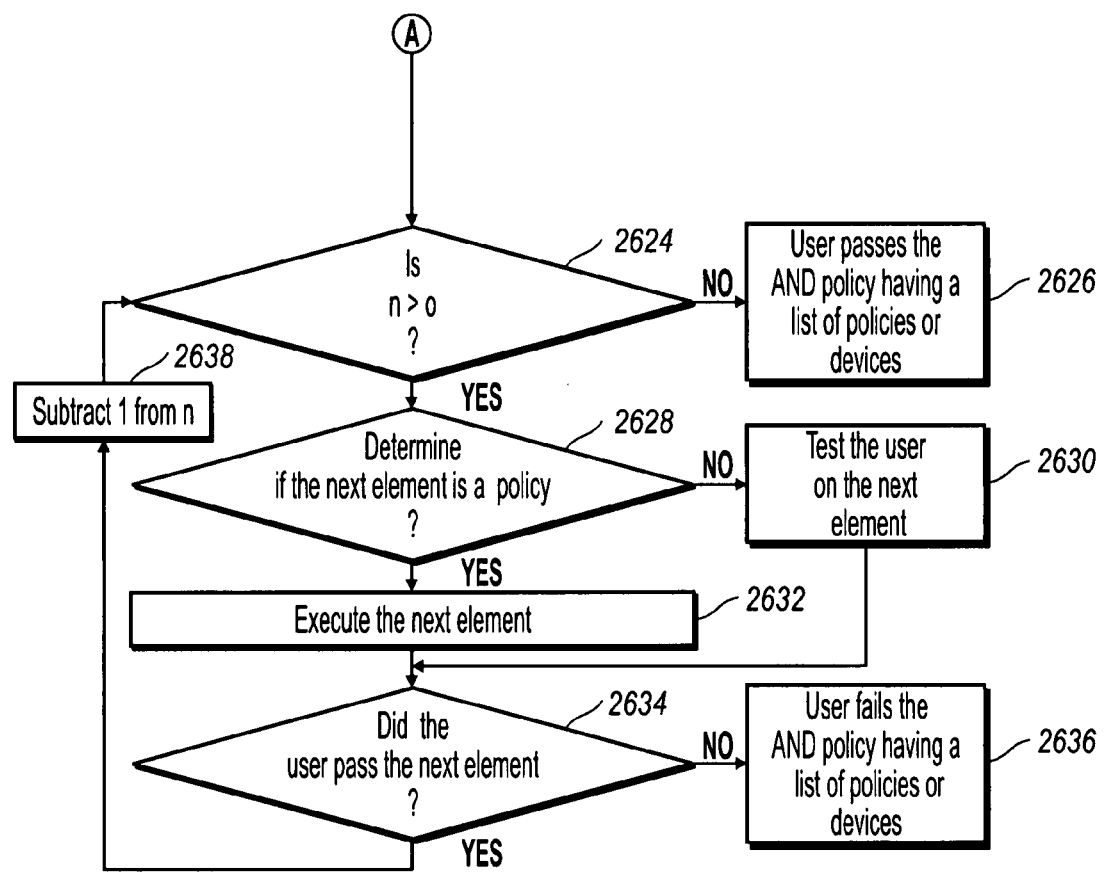

The user passes an AND policy having a list of policies or devices of the present invention if the user passes all of the elements in the list of policies or devices. FIG. 26 is a flowchart illustrating the steps involved in executing the AND policy having a list of policies or devices of the present invention. In step 2602, the n number of elements in the list of policies or devices greater than two is determined. An element can be one of the polices described herein, a device or a non-biometric device. This type of AND policy will always have at least two elements in its list of polices or devices. In step 2604, it is determined whether the first element in the list of policies or devices is a policy. If the first element is not a policy, then control transfers to step 2606.

In step 2606, the first element is either a biometric or a non-biometric device. In step 2606, the user is tested on the first element (i.e., either a biometric or a non-biometric device) and the result indicates whether the user passed or failed the first element (i.e., the device).

Alternatively, in step 2604, if the first element is a policy, then control transfers to step 2608. In step 2608, the first element (i.e., the policy) is executed and the result indicates whether the user passed or failed the first element (i.e., the policy). Whether the first element is a policy or a device, control transfers to step 2610.

In step 2610, if the user fails the first element, then control transfers to step 2612. In step 2612, the user has failed the AND policy and the flowchart in FIG. 26 ends. At this point the user has not been authenticated by system 102 (FIG. 1). Alternatively, if in step 2610 the user passes the first element, then control transfers to step 2614. In step 2614, it is determined whether the second element in the list of policies or devices is a policy. If the second element is not a policy, then control transfers to step 2616. In step 2616, the second element is either a biometric or a non-biometric device. The user is tested on the second element and the result indicates whether the user passed or failed the second element (i.e, the device).

Alternatively, in step 2614, if the second element is a policy, then control transfers to step 2618. The second element is executed to determine whether the user passes or fails the second element (i.e., the policy). Whether the second element is a policy or a device, control transfers to step 2620. In step 2620, if the user fails the second element, then control transfers to step 2622. In step 2622, the user has failed the AND policy and the flowchart in FIG. 26 ends. At this point the user has not been authenticated by system 102. Alternatively, if in step 2620 the user passes the second element, then control transfers to step 2624.

In step 2624, if n is not greater than zero, then control transfers to step 2626. If control transfers to step 2626 it means that the list of policies or devices has only two elements in it and the user has passed both elements. In step 2626, the user has passed the AND policy and the flowchart in FIG. 26 ends. At this point the user has been authenticated by system 102. Alternatively, if in step 2624 n is greater than zero, then control transfers to step 2628. In this situation the list of policies or devices has more than two elements in it.

In step 2628, it is determined whether the next element in the list of policies or devices is a policy. If the next element is not a policy, then control transfers to step 2630. In step 2630, the next element is either a biometric or a non-biometric device. The user is tested on the next element and the result indicates whether the user passed or failed the next element (i.e, the device).

Alternatively, in step 2628, if the next element is a policy, then control transfers to step 2632. The next element is executed to determine whether the user passes or fails the next element (i.e., the policy). Whether the next element is a policy or a device, controls transfers to step 2634. In step 2634, if the user fails the next element, then control transfers to step 2636. In step 2636, the user has failed the AND policy and the flowchart in FIG. 26 ends. At this point the user has not been authenticated by system 102 (FIG. 1). Alternatively, if in step 2634 the user passes the next element, then control transfers to step 2638.

In step 2638, one is subtracted from n and control returns to step 2624. In step 2624, if n is not greater than zero then the user has passed all the elements in the list of policies or devices. Here, control transfers to step 2626. In step 2626, the user has passed the AND policy and the flowchart in FIG. 26 ends. At this point the user has been authenticated by system 102. Alternatively, if in step 2624 $n$ is greater than zero, this means there are still more elements in the list of policies or devices. The flowchart in FIG. 26 continues until the user has either passed all the elements or the user fails one element in the list of policies or devices.

c. RANDOM Policy Having a List of Policies or Devices

Figure 27:
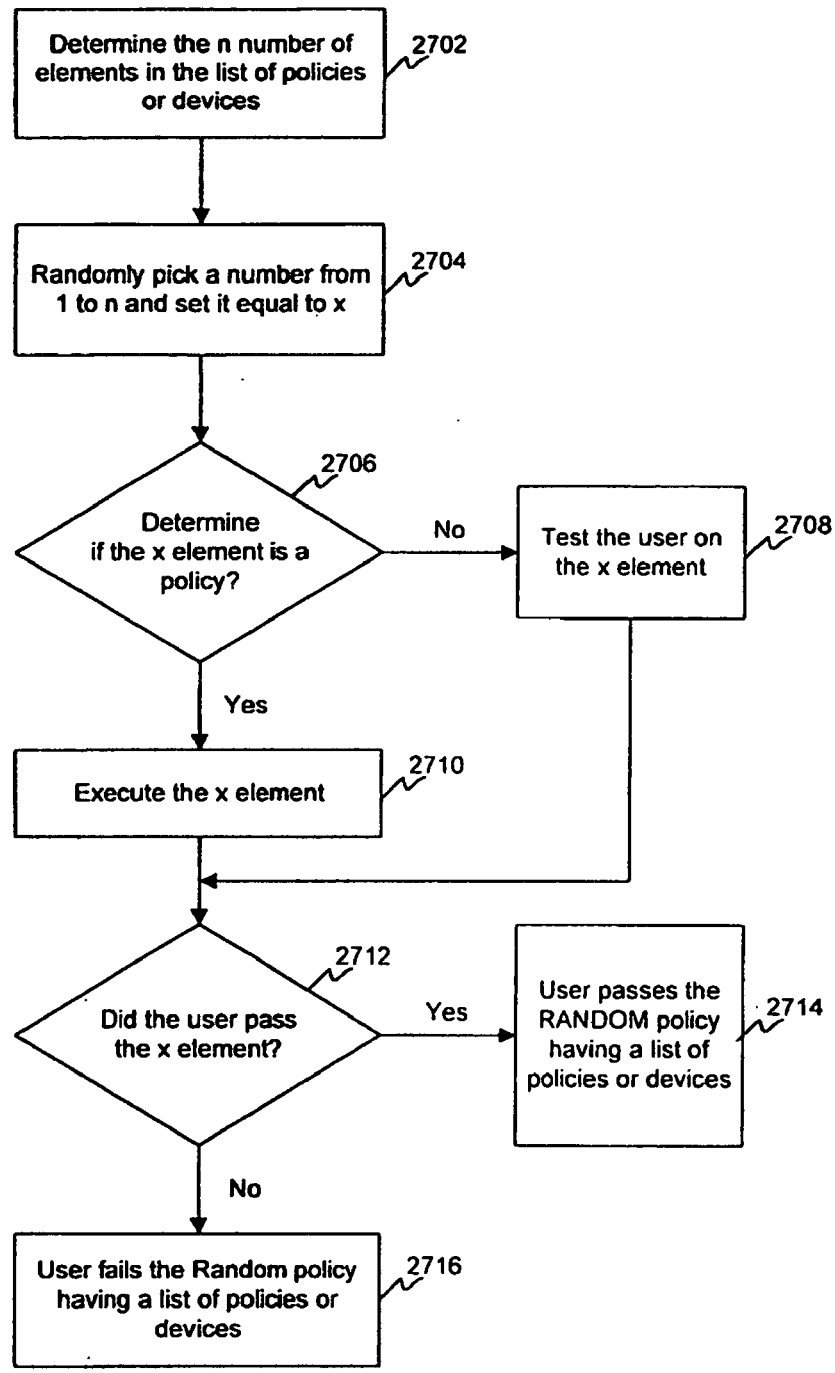
FIG. 27 is a flowchart illustrating the steps involved in executing a RANDOM policy having a list of policies or devices according to a preferred embodiment of the present invention.

The user passes a RANDOM policy having a list of policies or devices of the present invention if the user passes a random element. FIG. 27 is a flowchart illustrating the steps involved in executing a RANDOM policy having a list of policies or devices of the present invention. In step 2702, the n number of elements in the list of policies or devices is determined. An element can be one of the polices described herein, a biometric device or a non-biometric device. This type of RANDOM policy will always have at least two elements in its list of polices or devices. In step 2704, a random number from one to n is picked and the random number is set equal to x. In step 2706, it is determined whether the x element in the list of policies or devices is a policy. If the x element is not a policy, then control transfers to step 2708.

In step 2708, the x element is either a biometric or a non-biometric device. In step 2708, the user is tested on the x element (i.e., either a or a non-biometric device) and the result indicates whether the user passed or failed the first element (i.e., the device).

Alternatively, in step 2706, if the x element is a policy, then control transfers to step 2710. In step 2710, the x element (i.e., the policy) is executed and the result indicates whether the user passed or failed the x element (i.e., the policy). Whether the x element is a policy or a device, controls transfers to step 2712.

In step 2712, if the user passes the x element, then control transfers to step 2714. In step 2714, the user has passed the RANDOM policy and the flowchart in FIG. 27 ends. At this point the user has been authenticated by system 102 (FIG. 1). Alternatively, if in step 2712 the user fails the x element, then control transfers to step 2716. In step 2716, the user has failed the RANDOM policy and the flowchart in FIG. 27 ends. At this point the user has not been authenticated by system 102 (FIG. 1).

This type of RANDOM policy is used to request the user to pass a random policy 504 or identification device each time the user attempts to be authenticated by system 102.

d. CONTINGENT Policy Having a List of Policies or Devices

As discussed above each policy returns a pass/fail result. In addition, the policy can also provide one or more threshold values relating to the devices in the list of devices associated with the policy. In other words, each policy returns a composite threshold value that is generated from one or more of the threshold values generated by the devices. The composite threshold values are returned regardless of whether the policy was passed or failed by the user. These composite threshold values can then be used by a CONTINGENT policy having a list of policies or devices. This feature provides the administrator with flexibility to adjust the level of authentication.

Figure 33:
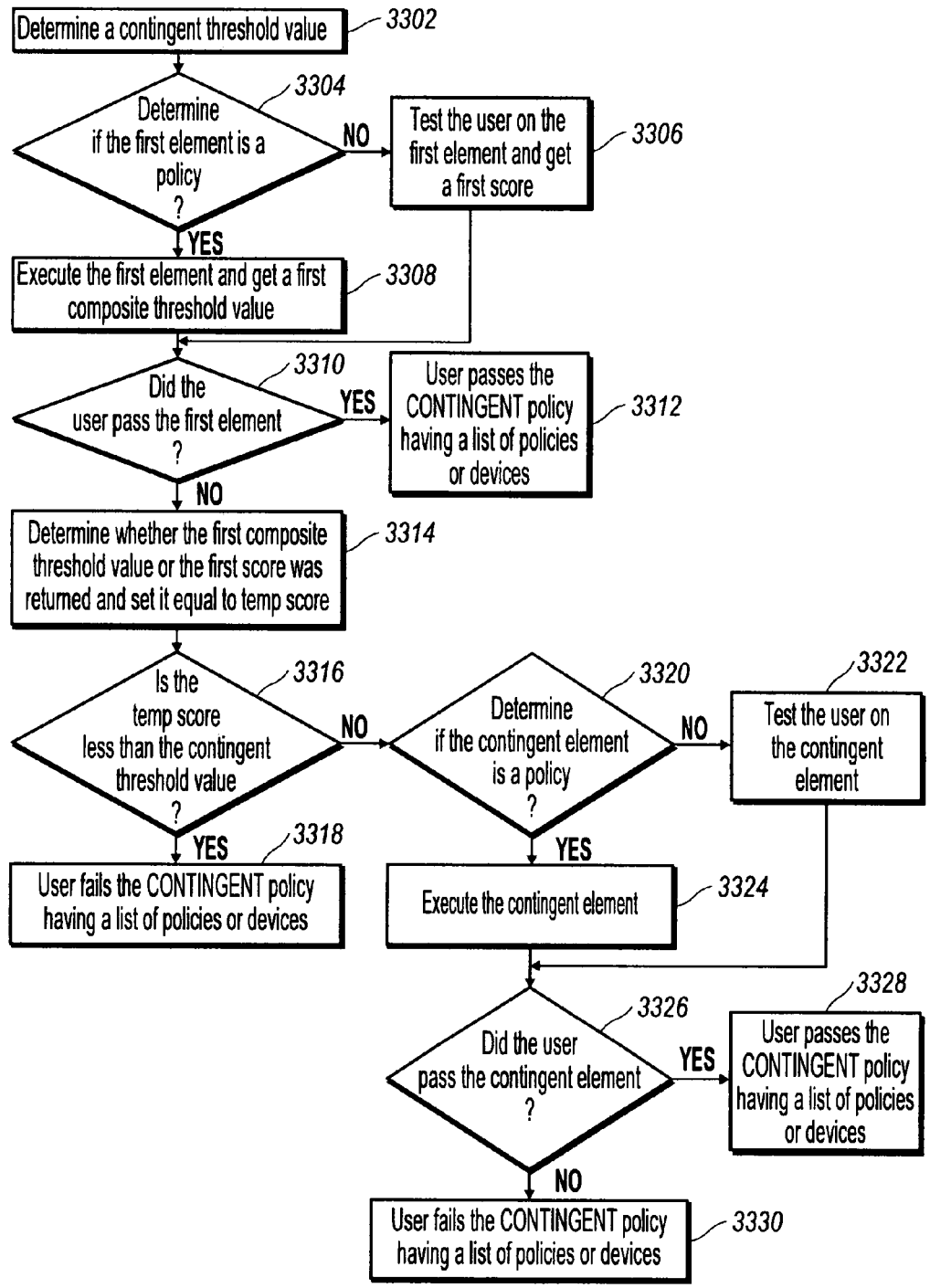
FIG. 33 is a flowchart illustrating the steps involved in executing a CONTINGENT policy having a list of policies or devices according to a preferred embodiment of the present invention.

The user passes a CONTINGENT policy having a list of policies or devices of the present invention if either the user exceeds a minimum threshold associated with a first element or if the user exceeds a contingent threshold associated with the first element and the user exceeds a minimum threshold associated with a contingent element. FIG. 33 is a flowchart illustrating the steps involved in executing the CONTINGENT policy having a policy list of policies or devices of the present invention. This type of CONTINGENT policy always has two elements in the list of policies or devices. An element can be one of the polices described herein, a biometric device or a non-biometric device.

In step 3302, a contingent threshold value is determined. In step 3304, it is determined whether the first element is a policy. If the first element is not a policy, then control transfers to step 3306. In step 3306, the first element is either a biometric or a non-biometric device. FIGS. 8A, 8B and 9 involve the user being tested on a device. Referring again to FIGS. 8A, 8B and 9, when a user gets tested on a device, the result returned may include both a score (if applicable) and whether the user passed or failed the device. As with devices, when the user is tested on a non-biometric device, the result includes whether the user passed or failed the non-biometric device. This result can be modified to also include a score. Thus, in step 3306, the user is tested on the first element (i.e., either a biometric or a non-biometric device) and the result indicates whether the user passed or failed the first element (i.e., the device) and a first score.

Alternatively, in step 3304, if the first element is a policy, then control transfers to step 3308. In step 3308, the first element (i.e., the policy) is executed and the result indicates whether the user passed or failed the first element (i.e., the policy) and a first composite threshold value. Whether the first element is a policy or a device, control transfers to step 3310.

In step 3310, if the user passes the first element, then control transfers to step 3312. In step 3312, the user has passed the CONTINGENT policy and the flowchart in FIG. 33 ends. At this point the user has been authenticated by system 102 (FIG. 1). Alternatively, if in step 3310 the user fails the first element, then control transfers to step 3314. In step 3314, it is determined whether the first composite threshold value or the first score was returned and it is set equal to temp score.

In step 3316, it is determined whether temp score is less than the contingent threshold value. If the temp score is less than the contingent threshold value, then control transfers to step 3318. In step 3318, the user has failed the CONTINGENT policy and the flowchart in FIG. 33 ends. At this point the user has not been authenticated by system 102 (FIG. 1). Alternatively, if in step 3316 it is determined that temp score is greater than or equal to the contingent threshold value, then control transfers to step 3320.

In step 3320, it is determined whether the contingent element is a policy. If the contingent element is not a policy, then control transfers to step 3322. In step 3322, the contingent element is either a biometric or a non-biometric device. Thus, in step 3322, the user is tested on the contingent element (i.e., either a biometric or a non-biometric device) and the result indicates whether the user passed or failed the contingent element.

Alternatively, in step 3320, if the contingent element is a policy, then control transfers to step 3324. In step 3324, the contingent element (i.e., the policy) is executed and the result indicates whether the user passed or failed the contingent element. Whether the contingent element is a policy or a device, controls transfers to step 3326.

In step 3326, if the user passes the contingent element, then control transfers to step 3328. In step 3328, the user has passed the CONTINGENT policy and the flowchart in FIG. 33 ends. At this point the user has been authenticated by system 102. Alternatively, if in step 3326 the user fails the first element, then control transfers to step 3330. In step 3330, the user has failed the CONTINGENT policy and the flowchart in FIG. 33 ends. At this point the user has not been authenticated by system 102.

e. THRESHOLD Policy Having a List of Policies or Devices

As discussed above each policy returns a pass/fail result. In addition, the policy can also provide one or more threshold values relating to the devices in the list of devices associated with the policy. In other words, each policy returns a composite threshold value that is generated from one or more of the threshold values generated by the devices. The composite threshold values are returned regardless of whether the policy was passed or failed by the user. These composite threshold values can then be used by a THRESHOLD policy having a list of policies. This feature provides the administrator with flexibility to adjust the level of authentication.

Figure 34A:
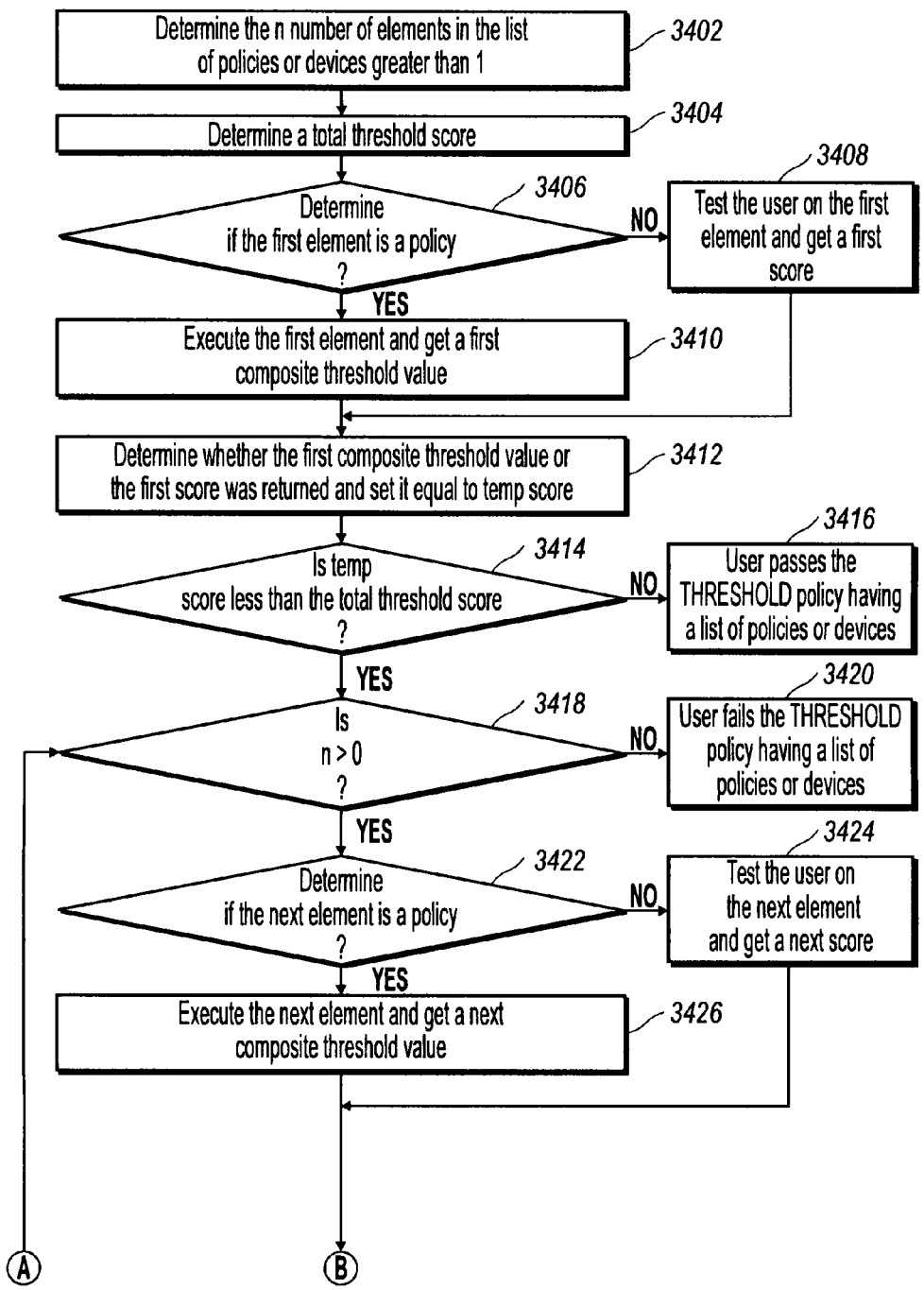
FIG. 34 is a flowchart illustrating the steps involved in executing a THRESHOLD policy having a list of policies or devices according to a preferred embodiment of the present invention.
Figure 34B:
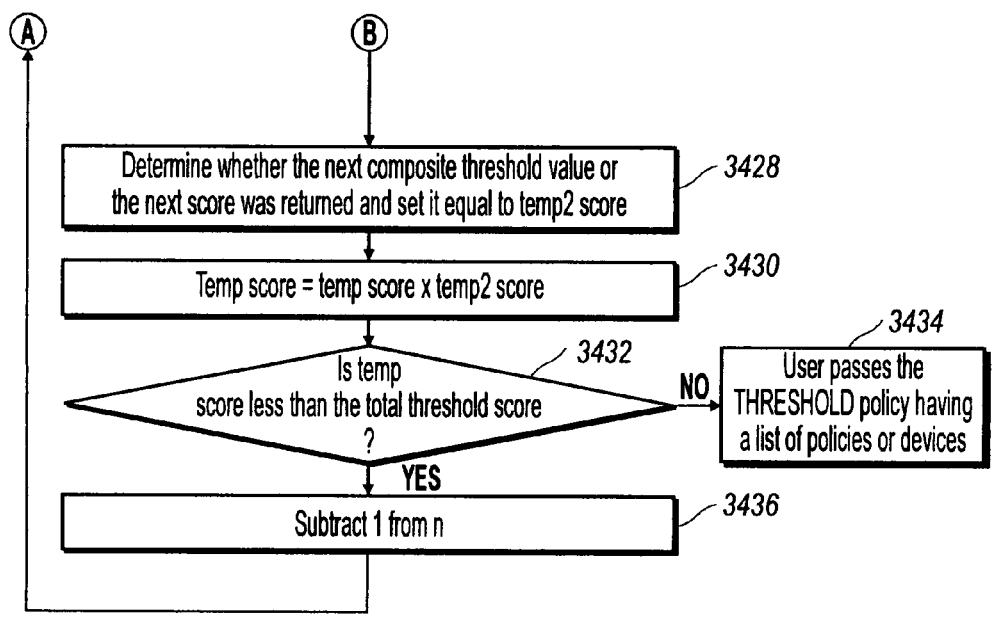

The user passes a THRESHOLD policy having a list of policies or devices of the present invention if the user exceeds a total threshold (i.e., total threshold score) while being tested on one or more elements in the list of policies or devices. FIG. 34 is a flowchart illustrating the steps involved in executing a THRESHOLD policy having a policy list of policies or devices of the present invention. In step 3402, the n number of elements in the list of policies or devices greater than one is determined. An element can be one of the polices described herein, a biometric device or a non-biometric device. This type of THRESHOLD policy will have one or more elements in its list of polices or devices. In step 3404, a total threshold score is determined. In step 3406, it is determined whether the first element in the list of policies or devices is a policy. If the first element is not a policy, then control transfers to step 3408.

In step 3408, the first element is either a biometric or a non-biometric device. In step 3408, the user is tested on the first element (i.e., either a biometric or a non-biometric device) and the result indicates whether the user passed or failed the first element (i.e., the device) and a first score.

Alternatively, in step 3406, if the first element is a policy, then control transfers to step 3410. In step 3410, the first element (i.e., the policy) is executed and the result indicates whether the user passed or failed the first element (i.e., the policy) and a first composite threshold value. Whether the first element is a policy or a device, control transfers to step 3412.

In step 3412, it is determined whether the first composite threshold value or the first score was returned and it is set equal to temp score. In step 3414, if temp score is less than the total threshold score, then control transfers to step 3416. In step 3416, the user has passed the THRESHOLD policy and the flowchart in FIG. 34 ends. At this point the user has been authenticated by system 102 (FIG. 1). Alternatively, if in step 3414 the temp score is greater than or equal to the total threshold score, then control transfers to step 3418.

In step 3418, if n is not greater than zero, then control transfers to step 3420. If control transfers to step 3420 it means that the list of policies or devices has only one element. In step 3420, the user has failed the THRESHOLD policy and the flowchart in FIG. 34 ends. At this point the user has not been authenticated by system 102. Alternatively, if in step 3418 n is greater than zero, then control transfers to step 3422. In this situation the list of policies or devices has more than one element in it.

In step 3422, it is determined whether the next element in the list of policies or devices is a policy. If the next element is not a policy, then control transfers to step 3424. In step 3424, the next element is either a biometric or a non-biometric device. The user is tested on the next element and the result indicates whether the user passed or failed the next element (i.e, the device) and a next score.

Alternatively, in step 3422, if the next element is a policy, then control transfer to step 3426. In step 3426, the next element is executed to determine whether the user passes or fails the next element (i.e., the policy) and to get a next composite threshold value. In step 3428, it is determined whether the next composite threshold value or the next score was returned and it is set equal to temp2 score. In step 3430, temp score is multiplied temp2 score and the product is stored back in temp score.

In step 3432, if temp score is less than the total threshold score, then control transfers to step 3434. In step 3434, the user has passed the THRESHOLD policy and the flowchart in FIG. 34 ends. At this point the user has been authenticated by system 102. Alternatively, if in step 3432 the temp score is greater than the total threshold value, then control transfers to step 3436.

In step 3436, one is subtracted from n and control returns to step 3418. In step 3418, if n is not greater than zero then all the elements in the list of policies have been executed. Here, control transfers to step 3420. In step 3420, the user has failed the THRESHOLD policy and the flowchart in FIG. 34 ends. At this point the user has not been authenticated by system 102. Alternatively, if in step 3418 n is greater than zero, this means there are still more elements in the list of policies or devices that have not been executed. The flowchart in FIG. 34 continues until all the elements in the list of policies or devices have been executed or temp score is greater than or equal to the total threshold score.

8. Multi-User Policy

As described above, groups 506 (FIG. 5) are a logical way of combining users that need access to the same set of resources. Some groups 506 are important enough that the policies 504 attached to them require one or more users to be authenticated by system 102 (FIG. 1) to pass the policy 504. This type of policy 504 is called a multi-user policy. The multi-user policy has a list of users. Examples of where the multi-user policy is useful are described next. The first example involves the various duties that exist within system 102. These duties can be delegated between different positions within system 102. The different positions may include an administrator, a policy manager, a device hardware and software manager and an enrollment manager. Each position must be given the proper authority within system 102 to be able to perform the duties required of that particular position. One way that the proper authority can be given is to create a group 506 for each of the positions. It is very important that only authorized users get put in these groups 506. If an unauthorized user gets put in one or more of these groups 506, then the security of system 102 is compromised. The multi-user policy of the present invention provides the flexibility required for system 102 to ensure that only authorized users get put into one of these groups 506.

The second example involves resources (e.g., computers, applications, data, etc.) within network system 202 (FIG. 2) that need to be protected with the highest security. This type of situation also occurs in non-networked environments. Historically, a bank protects its vault by requiring at least two people to know different parts of the combination in order to open the vault. The multi-user policy of the present invention provides the flexibility required for both networked and non-networked environments in the protection of the types of resources that require the highest security. This is accomplished by defining the required groups 506 and then attaching a multi-user policy to them.

As described above, the multi-user policy has a list of users. Each user in the list of users is represented by the unique user ID 510 that was assigned to that user when he or she enrolled in system 102. The multi-user policy can be implemented as any one of the policies 504 described herein. When server 104 executes the multi-user policy, server 104 first must determine which user IDs 510 are in the list of users. For each user ID 510, server 104 must then determine the policy 504 that particular user must pass in order to be authenticated by system 102. Since the multi-user policy has a list of users, more than one user may have to be authenticated prior to any one user being authenticated by system 102.

An example of how a multi-user policy may be used to protect merger information that no user may gain access to, without the president of the enterprise first authorizing it, is as follows. The policy 504 attached to the merger information can be defined as an AND multi-user policy with the enterprise president's user ID 510 in the list of users. Here, only users who are also in the list of users may even attempt to gain access to the merger information. No user, even if that user is authenticated by system 102, will gain access to the merger information unless the president also is authenticated by system 102.

In an embodiment of the multi-user policy, the user attempting to gain access is defined to be one of the users that must be authenticated by the present invention in order to pass the policy. In another embodiment, the user attempting to gain access may not be defined as one of the users that must be authenticated to gain access. Here, when the user presents his or her user ID 510 to the present invention, in order to gain access to desired resources only other specified user(s) must be authenticated by the present invention. One example of where this embodiment may be desirable is when a template has not yet been created and stored in the present invention for that particular user.

9. Multi-Location Policy

Some groups 506 are important enough that the policies 504 attached to them require a user to be authenticated by system 102 (FIG. 1) at two or more specific locations in system 102 (e.g., two or more user computers 208) to pass the policy 504. This type of policy 504 is called a multi-location policy. The multi-location policy has a list of devices. Each device has associated with it a different user computer 208 represented by its unique computer ID 512 (i.e., a different location in network system 202). The multi-location policy can be implemented as one or more of the policies 504 described herein. The only difference is that the user must not only pass the device, but must pass the device at the associated user computer 208.

Figure 35A:
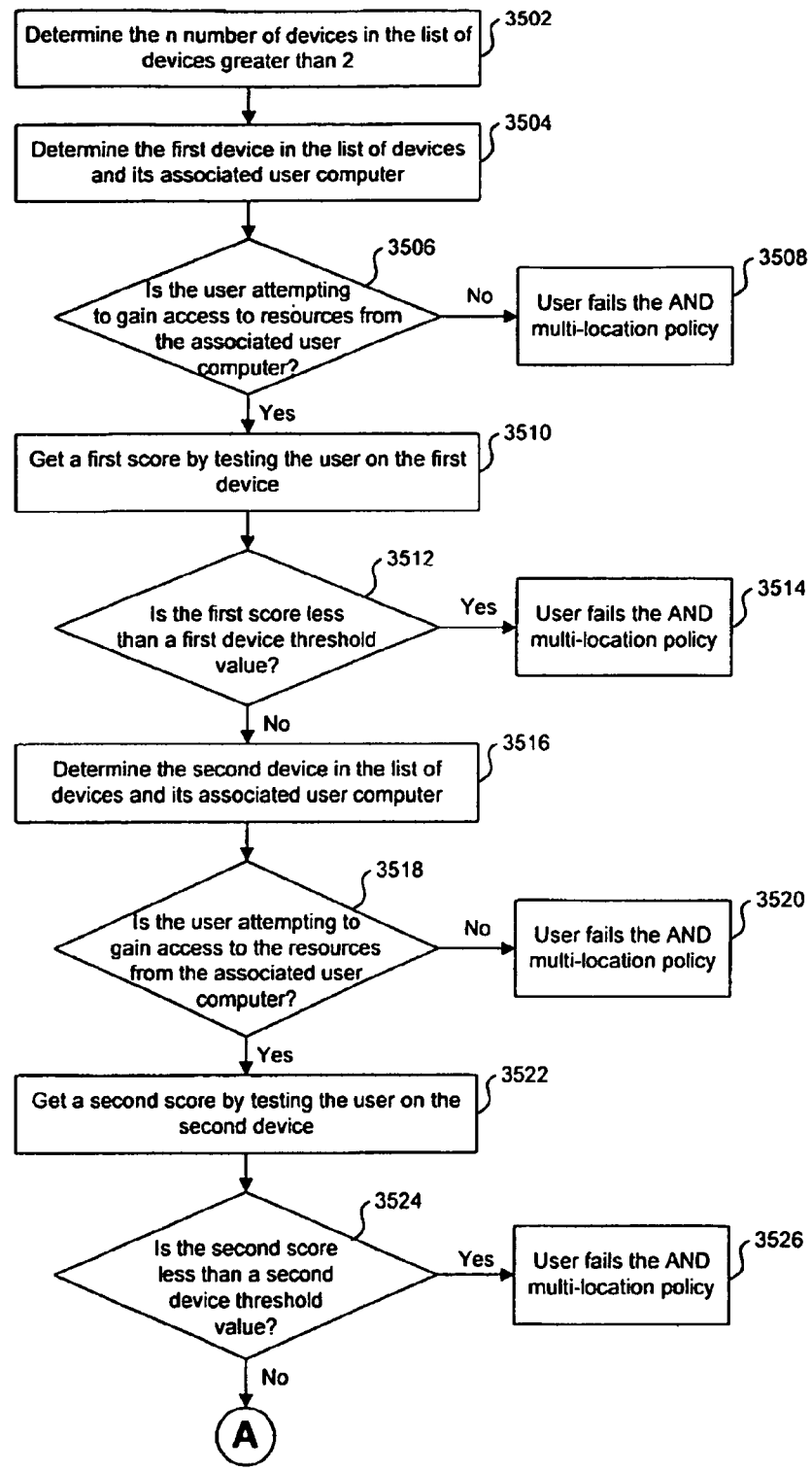
FIGS. 35A and 35B is a flowchart illustrating exemplary steps in executing an AND multi-location policy according to a preferred embodiment of the present invention.
Figure 35B:
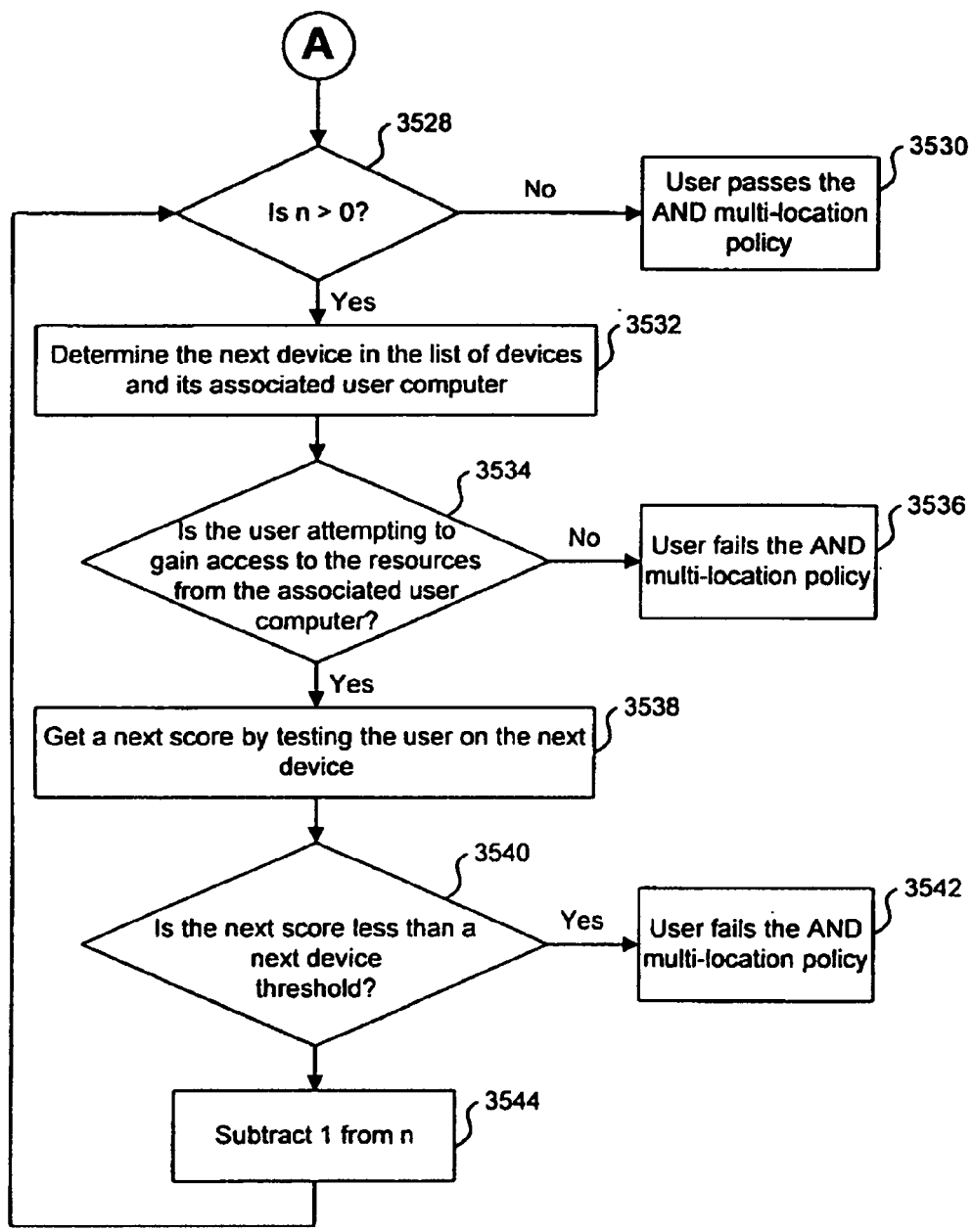

As described above, it is important to ensure that only authorized users are executing administrative duties. One way to ensure this is to heighten the effort an administrator/user must take to be authenticated by system 102. To achieve this the multi-location policy implemented as an AND policy may be used to force the administrator/user to pass devices at different user computers 208 in order to be authenticated by system 102. Each device in the list of devices will have associated with it a specific user computer 208 (i.e., computer ID 512). In fact, the multi-location policy implemented as an AND policy can be viewed as an AND policy that has as a configuration option the ability to specify one or more locations that the authentication request must be received from. After reading the following on how to implement the multi-location policy as an AND policy, it should be apparent to one skilled in the relevant art(s) how to implement the multi-location policy as a CONTINGENT policy, and so forth. FIGS. 35A and 35B is a flowchart illustrating exemplary steps involved in executing an AND multi-location policy of the present invention. In step 3502, the n number of devices in the list of devices greater than two is determined. In step 3504, the first device in the list of devices and its associated user computer 208 are determined. In step 3506, it is determined whether the user is attempting to gain access to resources from the associated user computer 208. If the outcome of step 3506 is negative, then control transfers to step 3508.

In step 3508, the user has failed the AND multi-location policy and the flowchart in FIGS. 35A and 35B ends. At this point the user has not been authenticated by system 102. Alternatively, if in step 3506 the outcome is positive, then control transfers to step 3510.

Once the first device is determined, the user is tested on the first device to produce a first score in step 3510. In step 3512, the first score is compared to a first device threshold value. If the first score is less than the first device threshold value, then control transfers to step 3514. In step 3514, the user has failed the AND multi-location policy and the flowchart in FIGS. 35A and 35B ends. At this point the user has not been authenticated by system 102. Alternatively, if in step 3512 the first score is greater than or equal to the first device threshold value, then control transfers to step 3516.

In step 3516, the second device in the list of devices and its associated user computer 208 are determined. In step 3518, it is determined whether the user is attempting to gain access to resources from the associated user computer 208. If the outcome of step 3518 is negative, then control transfers to step 3520. In step 3520, the user has failed the AND multi-location policy and the flowchart in FIGS. 35A and 35B ends. At this point the user has not been authenticated by system 102. Alternatively, if in step 3518 the outcome is positive, then control transfers to step 3522.

Once the second device is determined, the user is tested on the second device to produce a second score in step 3522. In step 3524, the second score is compared to a second device threshold value. If the second score is less than the second device threshold value, then control transfers to step 3526. In step 3526, the user has failed the AND multi-location policy and the flowchart in FIGS. 35A and 35B ends. At this point the user has not been authenticated by system 102. Alternatively, if in step 3524 the second score is greater than or equal to the second device threshold value, then control transfers to step 3528.

In step 3528, if n is not greater than zero, then control transfers to step 3530. If control transfers to step 3530 it means that the list of devices has only two devices in it and the user has passed both devices. In step 3530, the user has passed the AND multi-location policy and the flowchart in FIGS. 35A and 35B ends. Alternatively, if in step 3528 n is greater than zero, then control transfers to step 3532. In this situation the list of devices has more than two devices in it. In step 3532, the next device and its associated user computer 208 are determined. In step 3534, it is determined whether the user is attempting to gain access to resources from the associated user computer 208. If the outcome of step 3534 is negative, then control transfers to step 3536.

In step 3536, the user has failed the AND multi-location policy and the flowchart in FIGS. 35A and 35B. At this point the user has not been authenticated by system 102. Alternatively, if in step 3534 the outcome is positive, then control transfers to step 3538.

Once the next device is determined, the user is tested on the next device to produce a next score in step 3538. In step 3540, the next score is compared to a next device threshold value. If the next score is less than the next device threshold value, then control transfers to step 3542. In step 3542, the user has failed the AND multi-location policy and the flowchart in FIGS. 35A and 35B ends. At this point the user has not been authenticated by system 102. Alternatively, if in step 3540 the next score is greater than or equal to the next device threshold value, then control transfers to step 3544.

In step 3544, one is subtracted from n and control returns to step 3528. In step 3528, if n is not greater than zero then the user has passed all the devices in the list of devices. Here, control transfers to step 3530. In step 3530, the user has passed the AND multi-location policy and the flowchart in FIGS. 35A and 35B ends. At this point the user has been authenticated by system 102. Alternatively, if in step 3528 *n* is greater than zero, this means there are still more devices in the list of devices that the user has not been tested on yet. The flowchart in FIGS. 35A and 35B continues until the user has either passed all the devices or the user fails one device (or attempts to access resources from a user computer 208 other than the associated user computer 208) in the list of devices.

An obvious variation from the AND multi-location policy described above with reference to FIGS. 35A and 35B is to require a user to pass a policy 504 at two or more different user computers 208. Here, in order for the user to be authenticated by the present invention, the user must either pass the same policy 504 at two or more different user computers 208, pass two different policies 504 at two different user computers 208, and so forth.

Although the AND multi-location policy will typically have at least two devices in its list of devices, the list of devices may have a single device. Here, the user is tested on a single device with multiple measurements to pass the AND multi-location policy. Each measurement has associated with it a specific user computer 208. For example, if the single device is a fingerprint device, the user may be required to pass the AND multi-location policy by being tested on the fingerprint device with the left index finger at a first computer 208 and by being tested on the fingerprint device with the right index finger at a second computer 208. The user needs to pass the fingerprint device using both of the measurements at associated user computer 208 to pass the AND multi-location policy.

10. Multi-Template Policy

With the multi-template policy of the present invention, templates 502 of two or more users can be assigned to the same user ID 510 for a particular device. This means that two or more users can access resources via the same user ID 510. The multi-template policy can be implemented as any one of the policies 504 described herein. The only variation is that, with the multi-template policy, more than one template 502 may have to be tested with each device and user ID 510 combination prior to determining whether the user has failed a particular device. After reading the following on how to implement the multi-template policy as an AND policy, it should be apparent to one skilled in the relevant art(s) how to implement the multi-template policy as an OR policy, CONTINGENT policy, and so forth.

Figure 36A:
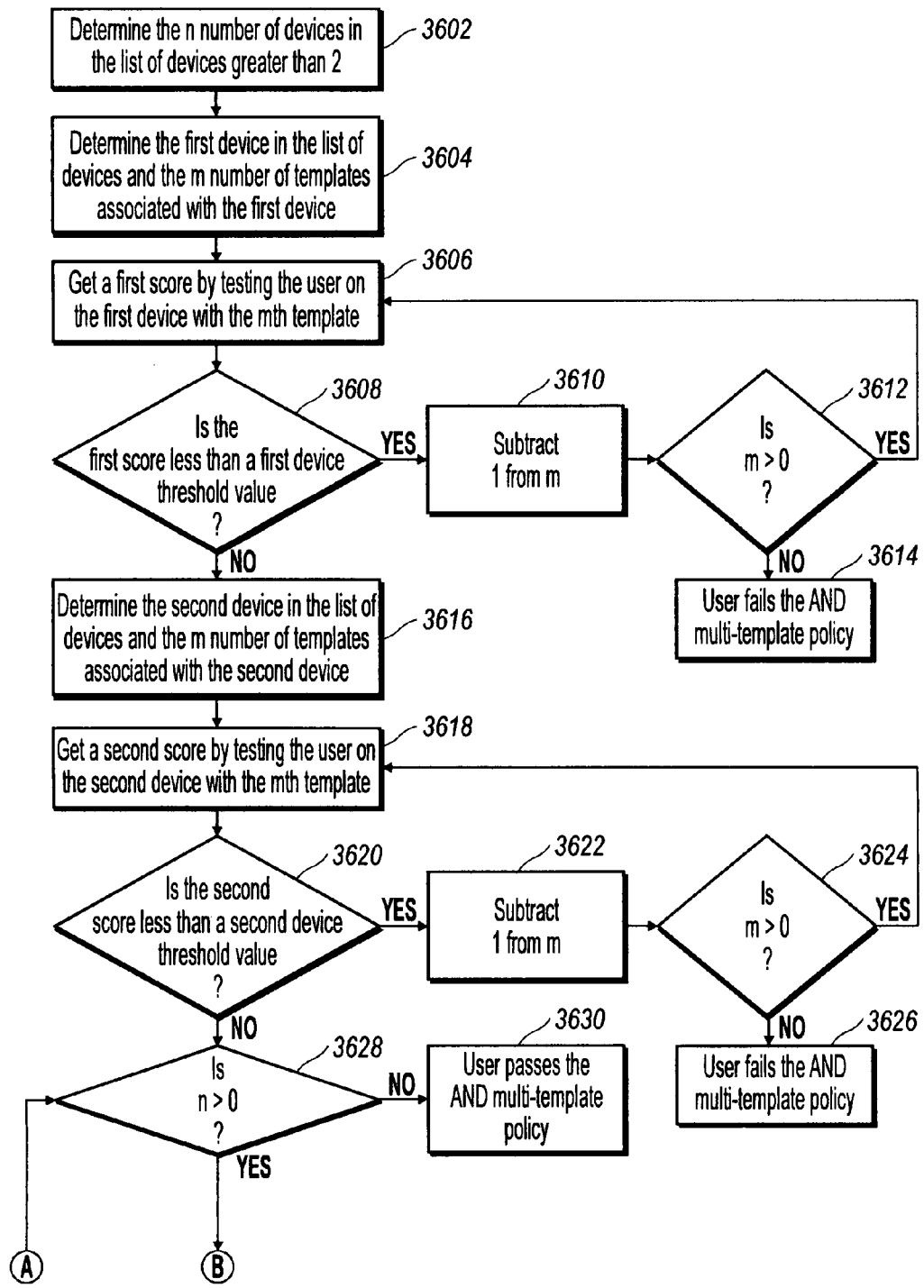
FIG. 36 is a flowchart illustrating exemplary steps in executing an AND multi-template policy according to a preferred embodiment of the present invention.
Figure 36B:
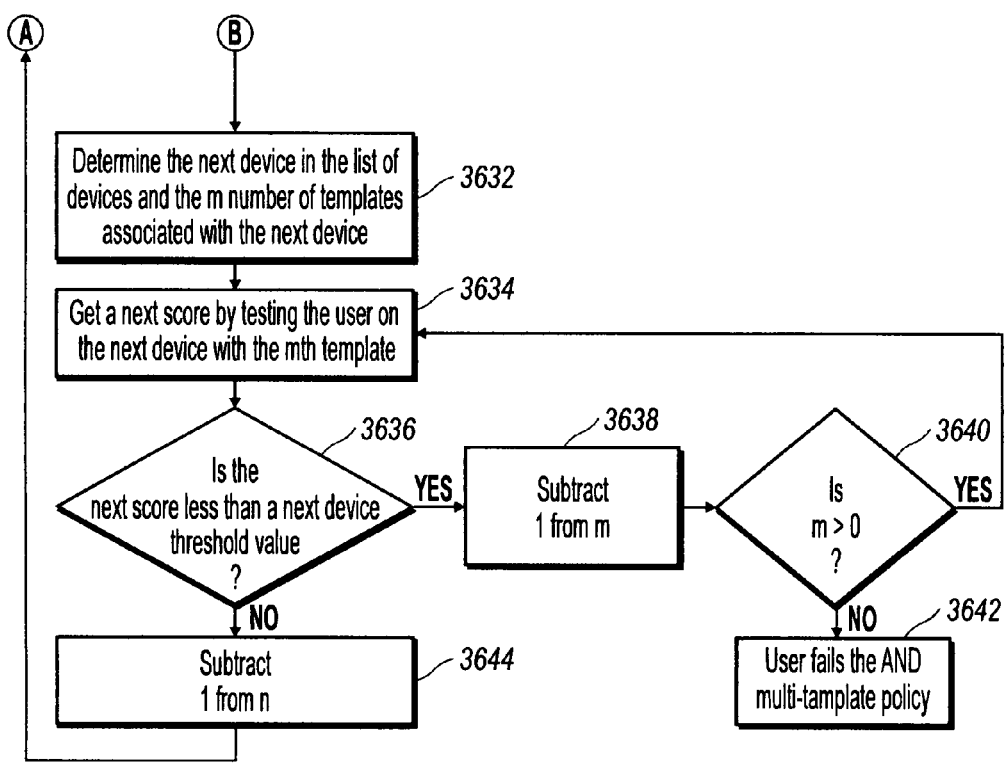

FIG. 36 is a flowchart illustrating exemplary steps involved in executing an AND multi-template policy of the present invention. In step 3602, the n number of devices in the list of devices greater than two is determined. In step 3604, the first device in the list of devices and the m number of templates 502 associated with the first device and user ID 510 combination are determined.

Once the first device is determined, the user is tested on the first device with the $m^{th}$ template to produce a first score in step 3606. In step 3608, the first score is compared to a first device threshold value. If the first score is less than the first device threshold value, then control transfers to step 3610. In step 3610, 1 is subtracted from m. In step 3612, if m is not greater than zero, then control transfers to step 3614. Alternatively, if in step 3612 *m* is greater than zero, then control transfers back to step 3606.

If control transfers to step 3614 it means that the user has been tested and failed with all of the templates 502 associated with the first device and user ID 510 combination. Here, the user has failed the AND multi-template policy and the flowchart in FIG. 36 ends. At this point the user has not been authenticated by system 102 (FIG. 1). If control transfers to step 3606, the user is tested with the next template 502. This continues until either the user fails the AND multi-template policy (in step 3614) or the user passes the first device.

In step 3616, the second device in the list of devices and the m number of templates 502 associated with the second device and user ID 510 combination are determined. Once the second device is determined, the user is tested on the second device with the $m^{th}$ template 502 to produce a second score in step 3618. In step 3620, the second score is compared to a second device threshold value. If the second score is less than the second device threshold value, then control transfers to step 3622. In step 3622, 1 is subtracted from m. In step 3624, if m is not greater than zero, then control transfers to step 3626. Alternatively, control transfers back to step 3618.

If control transfers to step 3626 it means that the user has been tested with (and failed) all of the templates 502 associated with the second device. Here, the user has failed the AND multi-template policy and the flowchart in FIG. 36 ends. At this point the user has not been authenticated by system 102. If control transfers to step 33618, the user is tested with the next template 502. This continues until either the user fails the AND multi-template policy (in step 3626) or the user passes the second device.

In step 3628, if n is not greater than zero, then control transfers to step 3630. If control transfers to step 3630 it means that the list of devices has only two devices in it and the user has passed both devices. In step 3630, the user has passed the AND multi-template policy and the flowchart in FIG. 36 ends. Alternatively, if in step 3628 *n* is greater than zero, then control transfers to step 3632. In this situation the list of devices has more than two devices in it.

In step 3632, the next device in the list of devices and the m number of templates 502 associated with the next device and user ID 510 combination are determined. Once the next device is determined, the user is tested on the next device with the $m^{th}$ template 502 to produce a next score in step 3634. In step 3636, the next score is compared to a next device threshold value. If the next score is less than the next device threshold value, then control transfers to step 3638. In step 3638, 1 is subtracted from m. In step 3640, if m is not greater than zero, then control transfers to step 3642. Alternatively, control transfers back to step 3634.

If control transfers to step 3642 it means that the user has been tested with (and failed) all of the templates 502 associated with the next device. Here, the user has failed the AND multi-template policy and the flowchart in FIG. 36 ends. At this point the user has not been authenticated by system 102. If control transfers to step 3634, the user is tested with the next template 502. This continues until either the user fails the AND multi-template policy (in step 3642) or the user passes the next device.

In step 3644, one is subtracted from n and control returns to step 3628. In step 3628, if n is not greater than zero then the user has passed all the devices in the list of devices. Here, control transfers to step 3630. In step 3630, the user has passed the AND multi-template policy and the flowchart in FIG. 36 ends. At this point the user has been authenticated by system 102. Alternatively, if in step 3628 *n* is greater than zero, this means there are still more devices in the list of devices that the user has not been tested on yet. The flowchart in FIG. 36 continues until the user has either passed all the devices or the user fails one device in the list of devices.

Although the AND multi-template policy will typically have at least two devices in its list of devices, the list of devices may have a single device. Here, the user is tested on a single device with multiple measurements to pass the AND multi-template policy. Each measurement and user ID combination has associated with it two or more templates. For example, if the single device is a fingerprint device, the user may be required to pass the AND multi-template policy by being tested on the fingerprint device with the left index finger and by being tested on the fingerprint device with the right index finger. The user needs to pass the fingerprint device using both of the measurements to pass the AND multi-template policy.

11. User Dependent Policy

The user dependent policy may be used to restrict a user from being authenticated by the present invention unless another specified user(s) has previously been authenticated and is currently accessing resources in network system 202. This means that when a particular user is assigned the user dependent policy, then other users (via a list of user IDs 510) are also associated with the user. The present invention checks to ensure at least one specified user in the list of users has been granted access to resources prior to attempting to authenticate the user. The user dependent policy of the present invention is used in combination with other types of policies 504.

Figure 37:
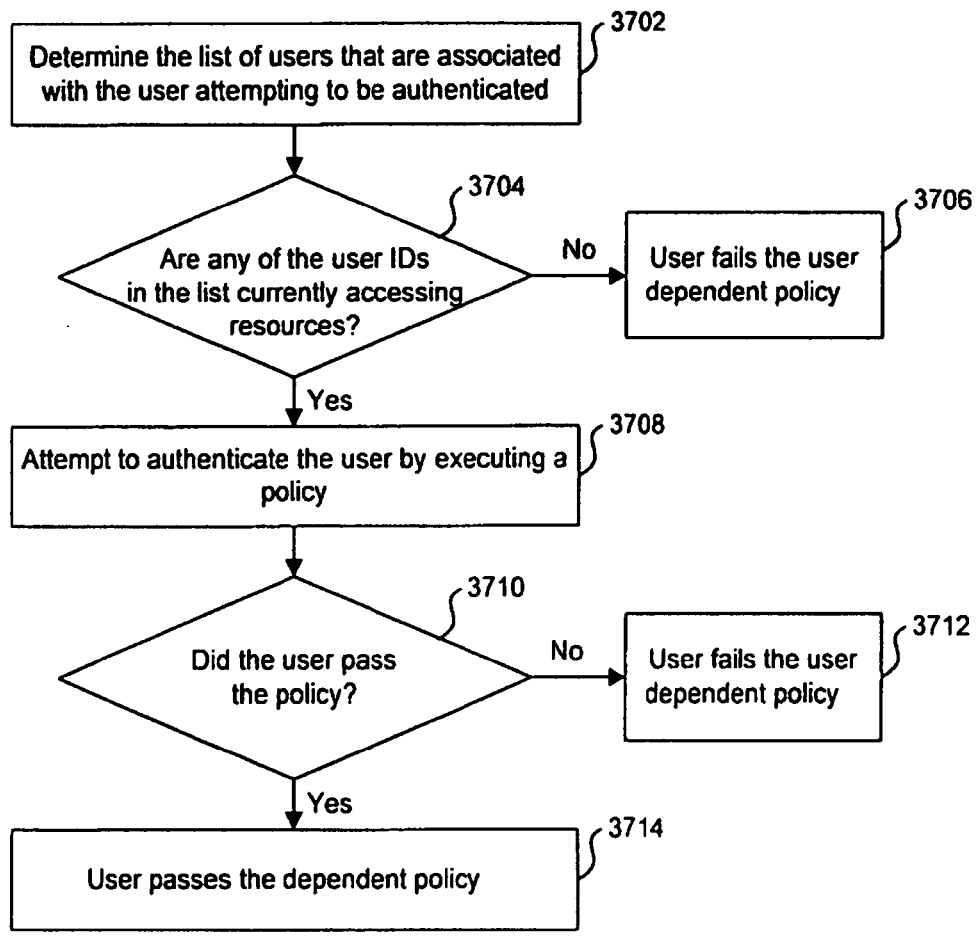
FIG. 37 is a flowchart illustrating exemplary steps in executing a user dependent policy according to a preferred embodiment of the present invention.

FIG. 37 is a flowchart illustrating exemplary steps involved in executing the user dependent policy of the present invention. In step 3702, the list of specified users (via IDs 510) that are associated with the user requesting authentication is determined. In step 3704, it is determined whether any of the specified users in the list are currently accessing resources in network system 202 (and thus have previously been authenticated by the present invention). If the outcome of step 3704 is negative, then control transfers to step 3706. Alternatively, if the outcome of step 3704 is positive, then control transfers to step 3708.

In step 3706, none of the specified users in the list are currently accessing resources. Here, the present invention does not attempt to authenticate the user. The user automatically fails the user dependent policy and the flowchart in FIG. 37 ends. At this point the user has not been authenticated by system 102 (FIG. 1). Alternatively, in step 3708 the present invention attempts to authenticate the user by executing one of the policies 504 described herein. In step 3710, if the user fails the policy then control transfers to step 3712. Alternatively, control transfers to step 3714.

In step 3712, the user has failed the user dependent policy and the flowchart in FIG. 37 ends. At this point the user has not been authenticated by system 102. In step 3714, the user has passed the user dependent policy and the flowchart in FIG. 37 ends. At this point the user has been authenticated by system 102.

In another embodiment, the user dependent policy may be used to allow a user access to network system 202 (without having to be authenticated by the present invention) when another specified user(s) has previously been authenticated and is currently accessing resources in network system 202.

In yet another embodiment, the user dependent policy is modified to allow a user access to network system 202 when all of the policies and/or devices contained in the policy are configured to use the template of an assigned user ID. Here, the specified user (with the assigned user ID) does not have to be previously authenticated and currently accessing resources in network system 202.

12. Location Restriction Policy

The location restriction policy is used to restrict a user to only being able to be authenticated by the present invention at a specified location (i.e., user computer 208) in network system 202. This policy 504 is useful when a user (e.g., an outside consultant) needs access to only one type of data that happens to only be accessible from a single user computer 208 in system 102. The location restriction policy differs from the multi-location policy of the present invention in that the user is not required to be authenticated at multiple locations (i.e., user computers 208) in network system 202. The location restriction policy of the present invention may be used in combination with other types of policies 504.

Figure 39:
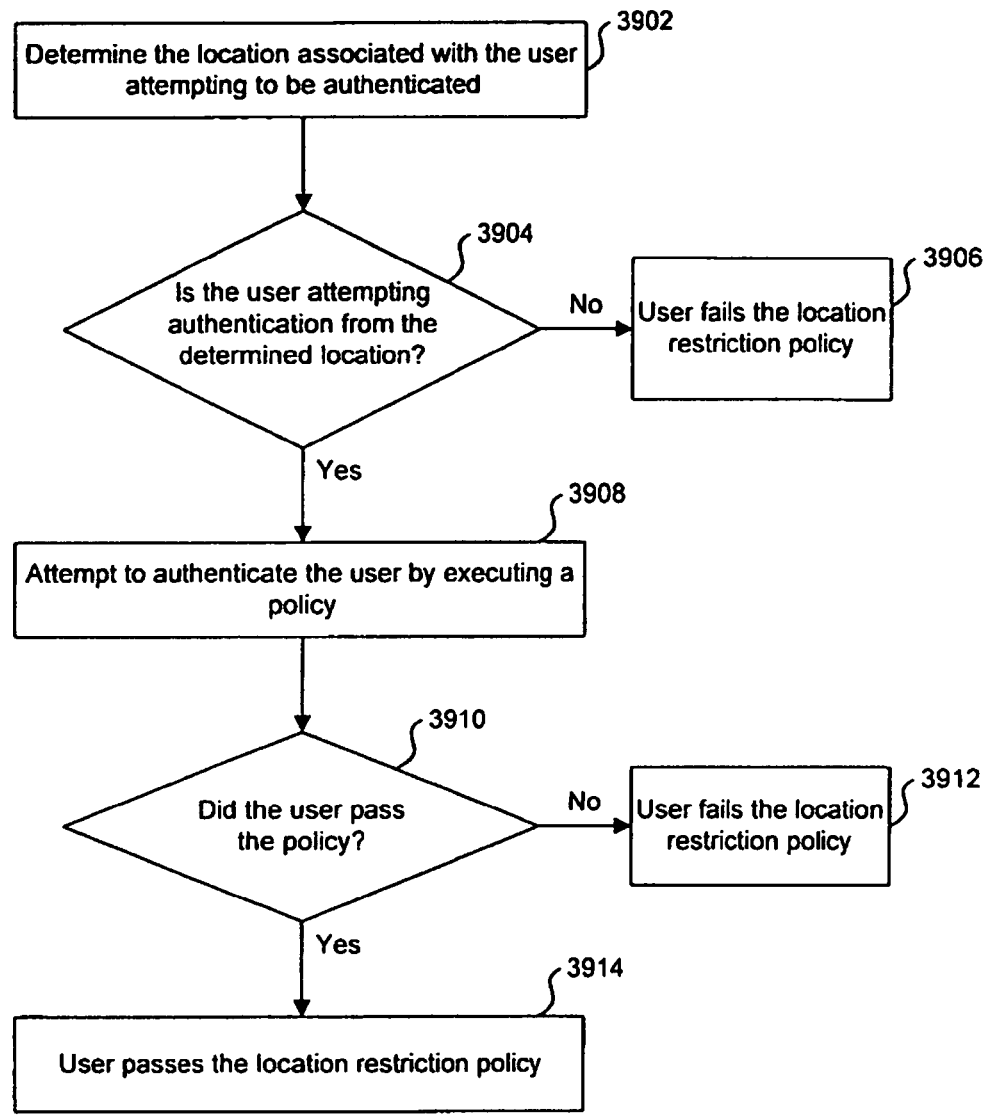
FIG. 39 is a flowchart illustrating exemplary steps in executing a location restriction policy according to a preferred embodiment of the present invention.

FIG. 39 is a flowchart illustrating exemplary steps involved in executing the location restriction policy of the present invention. In step 3902, the location in network system 202 (via computer ID 512) that is associated with the user attempting to be authenticated by the present invention is determined. In step 3904, it is determined whether the user is attempting authentication at the determined location. If the outcome of step 3704 is negative, then control transfers to step 3906. Alternatively, if the outcome of step 3904 is positive, then control transfers to step 3908.

In step 3906, the user is not attempting to be authenticated at the location restricted to the user. Here, the present invention does not attempt to authenticate the user. The user automatically fails the location restriction policy and the flowchart in FIG. 39 ends. At this point the user has not been authenticated by system 102. Alternatively, in step 3908 the present invention attempts to authenticate the user by executing one of the policies 504 described herein. For example, if the location restriction policy is implemented as an AND policy, then it can be viewed as an AND policy that has as a configuration option to specify one or more locations that the authentication request must be received from. In step 3910, if the user fails the policy then control transfers to step 3912. Alternatively, control transfers to step 3714.

In step 3912, the user has failed the location restriction policy and the flowchart in FIG. 39 ends. At this point the user has not been authenticated by system 102. In step 3914, the user has passed the location restriction policy and the flowchart in FIG. 39 ends. At this point the user has been authenticated by system 102.

13. Computer/Device Specific Policy

The policies 504 described above can only be executed if the user computer 208 (the user is attempting to gain access from) has the required devices attached to it to execute the user's policy 504. If the required devices do not exist, then it is not possible for the present invention to attempt to authenticate the user and the user is automatically denied access to desired resources. The computer/device specific policy of the present invention remedies this situation. Here, a designated user computer 208 knows which devices are required to execute one or more policies 504 of the present invention. Also, one or more devices are attached to the designated user computer 208.

When the user attempts to gain access to resources at the designated user computer 208, the designated computer 208 determines which devices are attached to it. Based on which devices are attached to it, the designated user computer 208 determines a policy 504 that can be used to authenticate the user. Therefore, the policy 504 that is selected to authenticate the user is dependent upon which types of devices are attached to the designated computer 208 the user is attempting authentication from, the resource itself, the particular user, and so forth. In addition, when more than one policy may be executed, computer 208 may execute the most restrictive policy, the first policy in the list, and so forth. The computer/device specific policy of the present invention may be used in combination with other types of policies 504.

Figure 41:
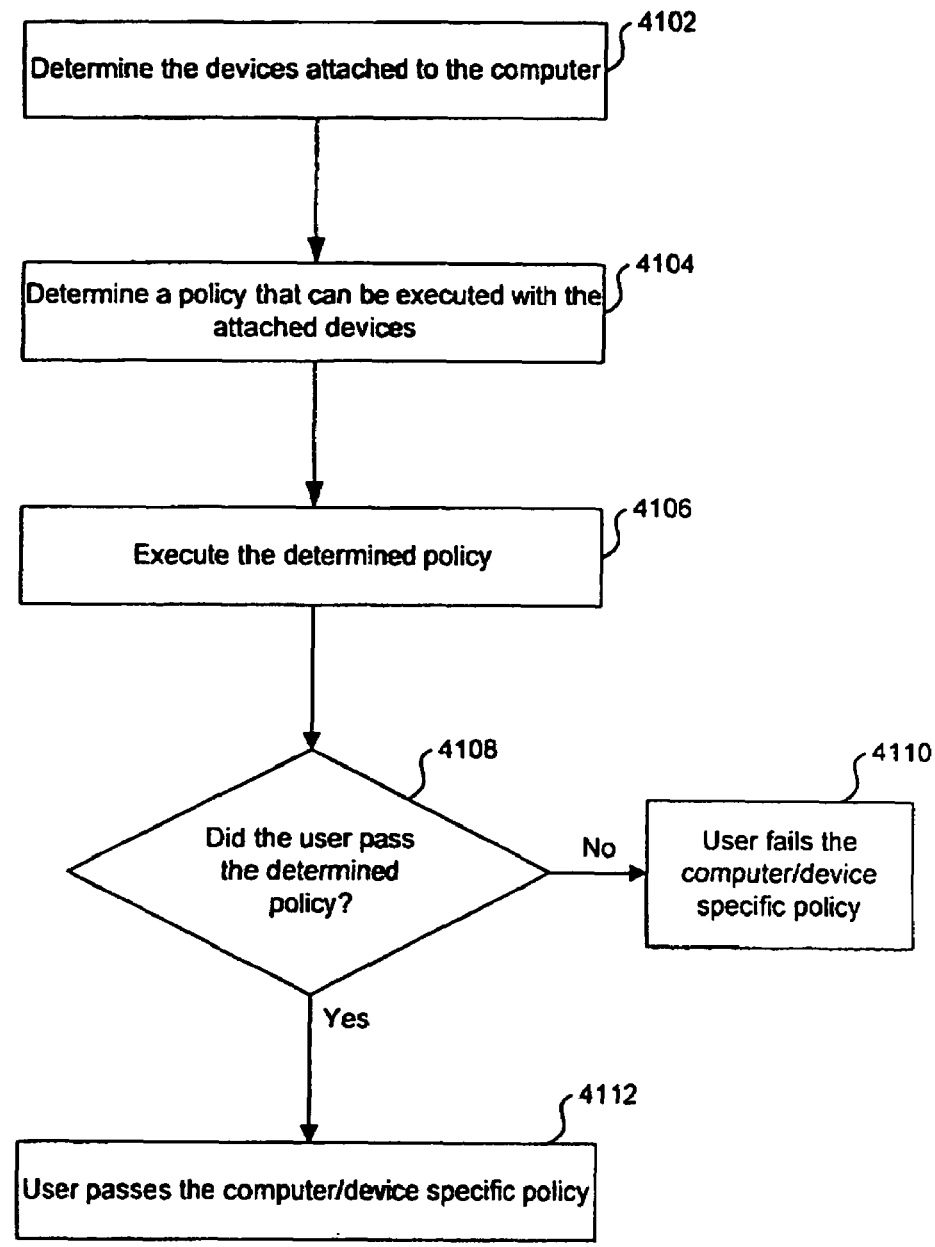
FIG. 41 is a flowchart illustrating exemplary steps in executing a computer/device specific policy according to a preferred embodiment of the present invention.

FIG. 41 is a flowchart illustrating exemplary steps involved in executing the computer/device specific policy of the present invention. In step 4102, the devices that are attached to the computer 208 the user is attempting authentication from are determined. In step 4104, the present invention determines a policy 504 that can be executed with the attached devices. In step 4106, the determined policy 504 is executed.

In step 4108, it is determined whether the user passed the determined policy 504. If the outcome of step 4108 is negative, then control transfers to step 4110. Alternatively, if the outcome of step 4108 is positive, the n control transfers to step 4112.

In step 4110, the user has failed the determined policy 504 and thus fails the computer/device specific policy of the present invention. Here, the flowchart in FIG. 41 ends. At this point the user has not been authenticated by system 102. Alternatively, in step 4112 the user has passed the determined policy 504 and thus passes the computer/device specific policy. The flowchart in FIG. 41 ends. At this point the user has been authenticated by system 102.

All of the above described policies 504 of the present invention provide the flexibility to apply the appropriate level of protection to each network resource without decreasing network productivity. As discussed above, it is the policies 504 that determine the method or way in which a user is to be authenticated by server 104. Although impossible to describe every possible logical variation of policies 504, it should be obvious to one skilled in the art that the logical variations are limitless.

F. INCREASING POLICY EXECUTION EFFICIENCY

1. Administrative Caching of Templates

As explained above, server 104 stores collections of templates 502, policies 504, groups 506, etc., in a central location. One way to increase the efficiency of the present invention is to allow an administrator to cache relevant templates 502, policies 504, etc., for a particular user ID 510 on one or more user computers 208 for a specified amount of time. Therefore, if an administrator knows a user is likely to try to gain access at a particular user computer 208, the administrator can store the required data on that user computer 208. This allows the user computer 208 to authenticate the user without involving server 104. This is called an administrative caching of templates because the administrator explicitly determines on which computers 208 the data is to be stored and for how long. One benefit of this, other than increased efficiency of policy execution, is that a user may still be authenticated to an application even if computer 208 is not physically connected to server 104 (i.e., offline authentication).

2. User-Driven Caching of Templates

As with the administrative caching of templates above, the user-driven caching of templates of the present invention also helps to increase the efficiency of policy execution. Here, data relevant to a user is cached on user computer 208 when the user attempts to access network system 202 from user computer 208. The amount of time it remains cached on user computer 208 depends on some pre-defined amount of time or until data relevant to the user is updated (e.g., the user's template 502 is refreshed). As with administrative caching of templates, one benefit of this is that a user may still be authenticated to an application even if computer 208 is not physically connected to server 104.

G. SYSTEM SECURITY INFRASTRUCTURE

In general, system security refers to techniques for ensuring that both data stored in a computer and data transported within a system cannot be read or compromised. Inventors of the present invention recognized the importance of securing data within system 102 (FIG. 1). They also recognized the importance of system 102 to integrate easily into existing enterprise security infrastructures.

For example, many network systems today incorporate a firewall. As described above, a firewall is a system designed to prevent unauthorized access and transfer to or from a network. Firewalls can be implemented in both hardware and software, or a combination of both. Firewalls are frequently used to prevent unauthorized Internet users from accessing private networks connected to the Internet, especially intranets. All data entering or leaving the intranet pass through the firewall, which examines each transmission and blocks those that do not meet the specified security criteria. A firewall is considered a first line of defense in protecting private information. A second line of defense is data encryption. Because many enterprise networks today incorporate one or more firewalls to protect their data, the present invention has been designed in such a way that it integrates easily with existing firewalls.

For greater security, data can be encrypted. Data encryption is the translation of data into a form that is unintelligible without a deciphering mechanism. Encryption is one of the most effective ways to achieve data security. To read an encrypted file, you must have access to a secret key or password that enables you to decrypt it. Unencrypted data is called plain text and encrypted data is referred to as cipher text. There are two main types of encryption: asymmetric key encryption (also called public-key encryption) and symmetric key encryption. As discussed below, the present invention uses encryption to protect data within system 102.

The inventors of the present invention recognized that there are three main areas in network system 202 (FIG. 2) where the security of data must be maintained. These include persistent data stored in server 104 (FIG. 1), data transported across network 114 (FIG. 1) and device software stored in network system 202.

1. Persistent Data Stored in Server

FIG. 5 illustrates the various collections of persistent data that are stored in server 104 (FIG. 1). Server 104 stores collections of templates 502, policies 504, groups 506, device IDs 508, user IDs 510, computer IDs 512 and application IDs 514. Of these collections of data, templates 502 are especially important to secure. Each template 502 stores a user's unique measurement that is used to match against the user's "live" measurement when the device is attempting to identify the user and/or a password, and so forth. Accordingly, the present invention utilizes well-known encryption techniques to protect data stored in server 104.

2. Data Transported Across the Network System

All data within system 102 and all data that gets transported to and from system 102, via network 114, must be secure. As mentioned above, templates 502 are especially important to secure because they store user data. As described in reference to the flowchart of FIGS. 8A and 8B above, a preferred process of authenticating a user by system 102 shows template 502 being matched on the client side (i.e., at computer 208 from FIG. 2). In order for template 502 to be matched on the client side, template 502 must be transported over network 114 from server 104 to computer 208. To further ensure the security of templates 502, the present invention transports templates 502 in an encrypted format over network 114 at all times using session keys.

3. System Software

A limitation with all networks is the impossibility for an administrator to know if an unauthorized person is tampering with software loaded on a computer located at a different location from the administrator within the enterprise. Although it is important for a resource protection administrator to be alarmed when system software has been tampered with, it is equally important for the network administrator to be alarmed when other types of software have been tampered with on computers in the network. Therefore, the inventors of the present invention recognized that what is needed is a way of alarming an administrator of a networked system when software has been tampered with on computers in the network.

To protect system software, the present invention incorporates a software integrity object located at each location in network system 202 (e.g., computer 208, enrollment station 106, remote/web computer 210, satellite enrollment station 112, etc.) that devices are attached to.

The software integrity object of the present invention is always active and its job is to repeatedly check to ensure all system software (i.e., a data file) loaded at the same location as the software integrity object has not been tampered with. This can be done in many ways. One way is for the software integrity object to calculate, for each system software file, a file date, a file size and a byte-wise sum of the file. Also utilized is a mask value and a starting mask value. The software integrity object then executes the following equation (or a similar equation/formula for assuring software integrity):

$$\sum_{i=o}^{Number\ of\ Files} \left[ (\text{File Date})_i + (\text{File Size})_i + \left( \sum_{j=o}^{File\ Size} (\text{File Byte})_j \right)_i + \text{Item Mask} \right] + \text{Starting Mask}$$

This equation is first executed when the file that is to be protected is first loaded at a location. The first outcome of the equation is stored in a secured environment. The same equation is then repeatedly calculated with the same software. The outcome is then compared to the first outcome stored in the secured environment. If the two do not match, the software integrity object realizes the file containing the software may have been tampered with and sends an alarm to the administrator. The software integrity object is not limited to protecting system software. The software integrity object can be used to protect all software (e.g., files) in network system 202 (FIG. 2).

H. DEVICES AND MOBILITY WITHIN A NETWORKED ENVIRONMENT

The inventors of the present invention recognized a limitation that is encountered when devices are used in a networked environment without system 102 (FIG. 1). As discussed above, for a device to authenticate a user it must have access to the user's template. The present invention provides a scheme for easy access to all user templates 502 such that a user can access network system 202 from any location (e.g., computer 208, enrollment station 106, remote/web computer 210, satellite enrollment station 112, etc.).

The scheme involves storing all templates 502 in a central location. The central location is server 104 (FIG. 1) as described above. Now, via network 114, a user can access his or her template 502 from any location in network system 202. Also, each location in network system 202 knows precisely where to go to locate all templates 502.

Storing all templates 502 in one central location is efficient when network 114 is a LAN. Efficiency problems may arise when network 114 is a WAN. As described above, a WAN connects computers that are farther apart and are connected by data transmission lines or radio waves (e.g., in multiple offices and distant geographies). For example, if an enterprise has multiple offices around the country and all users are accessing one server 104 to gain access to templates 502 for authentication, this is likely to slow down authentication to enterprise resources. To avoid the efficiency problems that will occur if all templates 502 were stored in one server 104, multiple systems 102 can be placed in various locations in network system 202. But here again the problem of a location (e.g., computer 208, enrollment station 106, remote/web computer 210, satellite enrollment station 112, etc.) in network system 202 not knowing precisely where to go to locate needed templates 502 reoccurs.

The inventors of the present invention solved this problem by two different methods. The first method involves the storing of templates 502 within network system 202 in a hierarchical structure. The second method involves the accessing of a hierarchical directory to locate templates 502 within network system 202.

1. Hierarchical Storage of Templates

Figure 28:
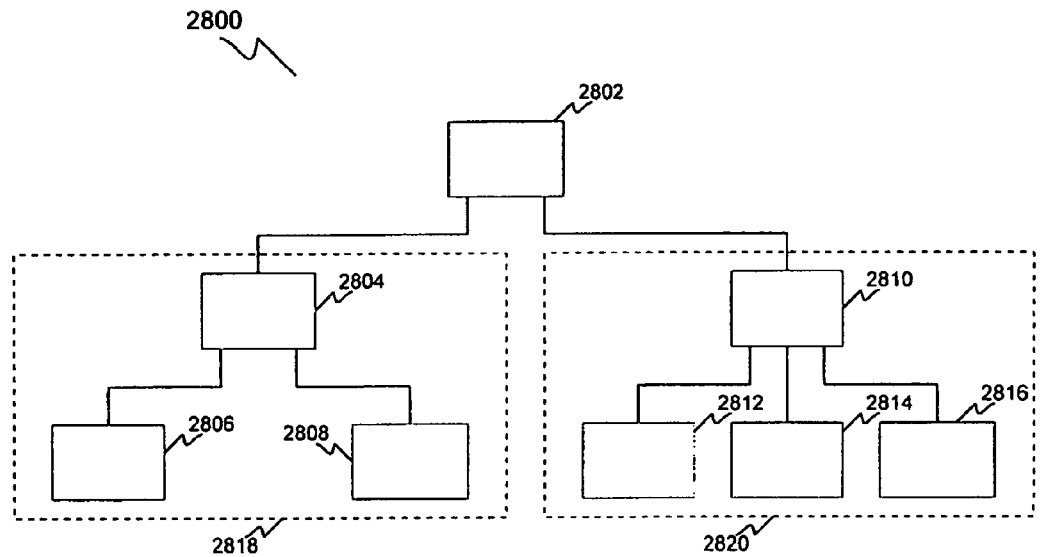
FIG. 28 illustrates an enterprise connected by a WAN incorporating multiple systems according to a preferred embodiment of the present invention.

FIG. 28 illustrates an enterprise 2800 connected by a WAN incorporating multiple systems 102. Each square in FIG. 28 represents a different office (i.e., location) in enterprise 2800. Each office (i.e., square) has its own LAN and its own system 102. The offices in enterprise 2800 are connected by a WAN.

FIG. 28 shows enterprise 2800 logically organized in a hierarchical structure. Office 2802 is the corporate office and is located at the top of the hierarchical structure. Block 2818 and block 2820 represent logical grouping of offices within enterprise 2800. As shown in FIG. 28, block 2818 includes office 2804, office 2806 and office 2808. Block 2820 includes office 2810, office 2812, office 2814 and office 2816.

The means for determining the logical groupings of offices can involve a number of factors. Several factors can include offices frequently traveled between, grouping offices that do not employ an administrator with offices that do, the adequacy of the WAN connections between various offices, etc.

Because each office has its own system 102, this presents a question of how individual users can avoid having to register at each system 102 and still travel anywhere in enterprise 2800 and be authenticated. One solution is to have a backup copy of all user templates 502 in enterprise 2800 stored in the server at each office. This solution is undesirable for several reasons. As explained in reference to FIG. 1, alternate server 110 is a backup server to server 104 and stores the exact same data. Therefore, it is likely to be expensive to maintain a complete copy of all templates 502 in enterprise 2800 in both server 104 and alternate server 110 at each office. Another reason why this solution is undesirable is the management of various copies of the same template 502 at various locations. When a user refreshes a template 502 (as discussed above) each copy of the old template 502 in enterprise 2800 must be replaced. This increases the possibility that the same template 502 may have different versions in enterprise 2800.

The inventors of the present invention came up with a scheme for hierarchically storing templates within enterprise 2800. In enterprise 2800, all templates 502 are stored at corporate office 2802. Then the additional storage of templates 502 at individual offices depends on the logical block (e.g. either block 2818 or block 2820) the office is in.

The procedure is as follows. First, each office in enterprise 2800 stores the templates 502 for every user enrolled in system 102 at that office. Then, in each logical block, start with the offices at the bottom of the hierarchical structure. For example, in block 2818 start with office 2806 and office 2808. Office 2806 and office 2808 only store the templates 502 for users that were enrolled in systems 102 at those offices. Then, following the hierarchical structure up to office 2804, office 2804 stores the templates 502 for users that were enrolled at office 2804, and also copies of all the templates 502 stored at office 2806 and office 2808. This procedure is repeated until the top of the hierarchical structure is reached (i.e., corporate office 2802).

Thus, with the above hierarchical structure, the farthest any office will have to go to get a user's template is corporate office 2802. For example, say User A was enrolled at office 2812. This means that User A's templates 502 are stored at office 2812, office 2810 and corporate office 2802. If User A travels to office 2806, office 2806 will have to follow the hierarchical structure up to corporate office 2802 to retrieve a copy of User A's templates 502. This scheme allows the templates 502 within enterprise 2800 to be stored at the minimum number of locations, while still providing each user the flexibility to be authenticated by system 102 from any office within the enterprise.

Not only does the hierarchical structure of enterprise 2800 provide ease of access, but also a means of backing up templates 502 within enterprise 2800.

2. Hierarchical Directory for Locating Templates

The second method involves the accessing of a hierarchical directory to locate templates 502 within enterprise 2800 (FIG. 28). As described above, one example of a hierarchical directory is a X.500 directory. X.500 directories are hierarchical with different levels for each category of information, such as country, state, and city. Therefore, the same scheme as discussed above for storing templates 502 can be used for storing a X.500 directory. The X.500 directory will include pointers to the offices that user templates 502 are stored.

I. REMOTE ACCESS ARCHITECTURES

A high level description of how a user may access the present invention via the Internet 3012 (FIG. 30) was explained above with reference to FIG. 2. This is accomplished via remote access. In general, remote access is the ability to log onto a network from a distant location. Generally, this implies a computer, a modem, and some remote access software to connect to the network. Whereas remote control refers to taking control of another computer, remote access means that the remote computer actually becomes a full-fledged host on the network. The remote access software dials in directly to the network server. The only difference between a remote host and workstations connected directly to the network is slower data transfer speeds (at least presently).

Referring again to FIG. 2, remote/web computer 210 provides the same functions as user computer 208, but remote/web computer 210 accesses network 114 via the Internet 3012. In order for remote/web computer 210 to connect to network 114, it must go through web server 212. Web server interface 214 allows web server 212 to communicate over network 114 to other resources or components in network system 202, including system 102. Following is a more detailed description of two remote access architectures utilized by the present invention. The first remote access architecture described uses RADIUS. The second remote access architecture described further develops web access described with reference to FIG. 2.

One implementation of remote access of the present invention deals with RADIUS. RADIUS stands for Remote Authentication Dial-In User Service. RADIUS is a software-based security authentication protocol developed by the Internet Engineering Task Force (IETF) working group. The RADIUS authentication protocol provides a means for sending authentication requests to a RADIUS authentication server. Users' permissions and configuration information are stored on the RADIUS server. All RADIUS-compatible hardware on a LAN can use the same RADIUS server for storing permissions and configuration information for all LAN users. This enables the network administrator to maintain one server for all RADIUS hardware.

The RADIUS protocol allows user authentication based on a username/password pair, a challenge/response pair, or both. Lists of user attributes can be configured on the RADIUS server on a per-user basis. Configuration of a RADIUS server varies depending on the implementation of the server. There are three files read by the RADIUS server, including: the USERS file; the CLIENTS file and the DICTIONARY file. The USERS file contains information to authenticate users. The CLIENTS file contains information to authenticate RADIUS clients. The DICTIONARY file tells the server how to read the user attributes in the USERS file.

Figure 42:
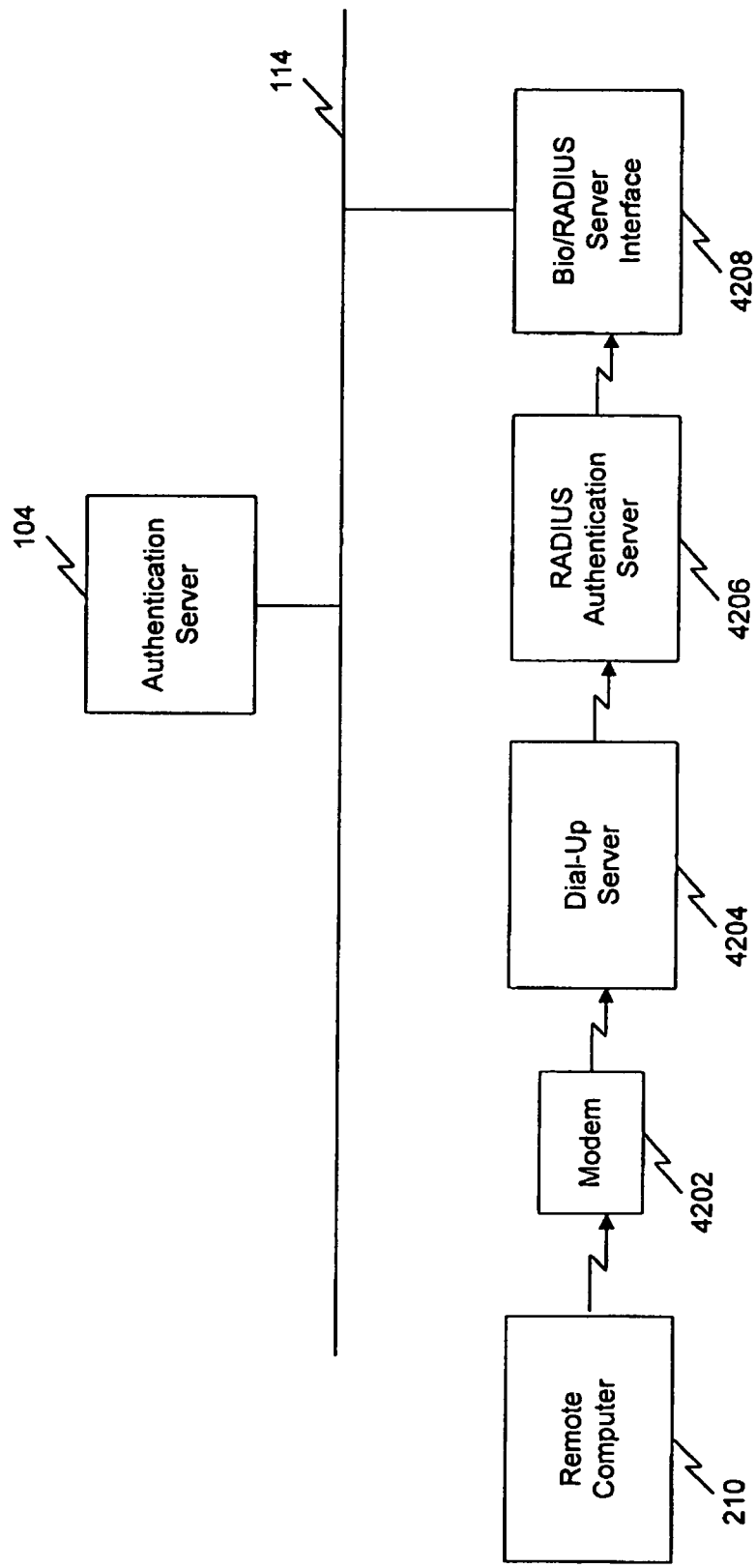
FIG. 42 is a block diagram incorporating the remote access architecture of the present invention that deals with RADIUS.

FIG. 42 is a block diagram incorporating the remote access architecture of the present invention using RADIUS. Referring to FIG. 42, the various functional components include remote computer 210 (FIG. 2), a modem 4202, a dial-up server 4204, a RADIUS authentication server 4206 and a Bio/RADIUS server interface 4208. Remote computer 210 (described above with reference to FIG. 2) accepts an authentication request from a user. Remote computer 210 transmits the authentication request to modem 4202.

Modem 4202, which is well known in the art, is an acronym for modulator-demodulator. Modem 4202 is a device or program that enables remote computer 210 to transmit data (e.g., the authentication request from the user) over telephone lines. Computer data is stored digitally, whereas data transmitted over telephone lines is transmitted in the form of analog waves. Modem 4202 converts between these two forms. Once the authentication request is converted from digital to analog waves, modem 4202 transmits the authentication request to dial-up server 4204.

Dial-up server 4204 provides dial-up access. Dial-up access refers to connecting a device to a network via a modem and a public telephone network. Dial-up access is really just like a phone connection, except that the parties at the two ends are computer devices rather than people. Dial-up server 4204 then formats the authentication request into the RADIUS authentication protocol. As described above, the RADIUS authentication protocol provides a means for sending authentication requests to RADIUS authentication server 4206.

RADIUS authentication server 4206 stores users' permissions and configuration information. RADIUS authentication server 4206 transmits the authentication request to Bio/RADIUS server interface 4208.

Bio/RADIUS server interface 4208 is a logical server that could reside on the same computer with server 104. Bio/RADIUS server interface 4208 translates between the communication protocol understood by server 104 and the RADIUS authentication protocol (and back) to provide users remote access to the present invention. Next, the remote access architecture of the present invention using web access is described.

Figure 43:
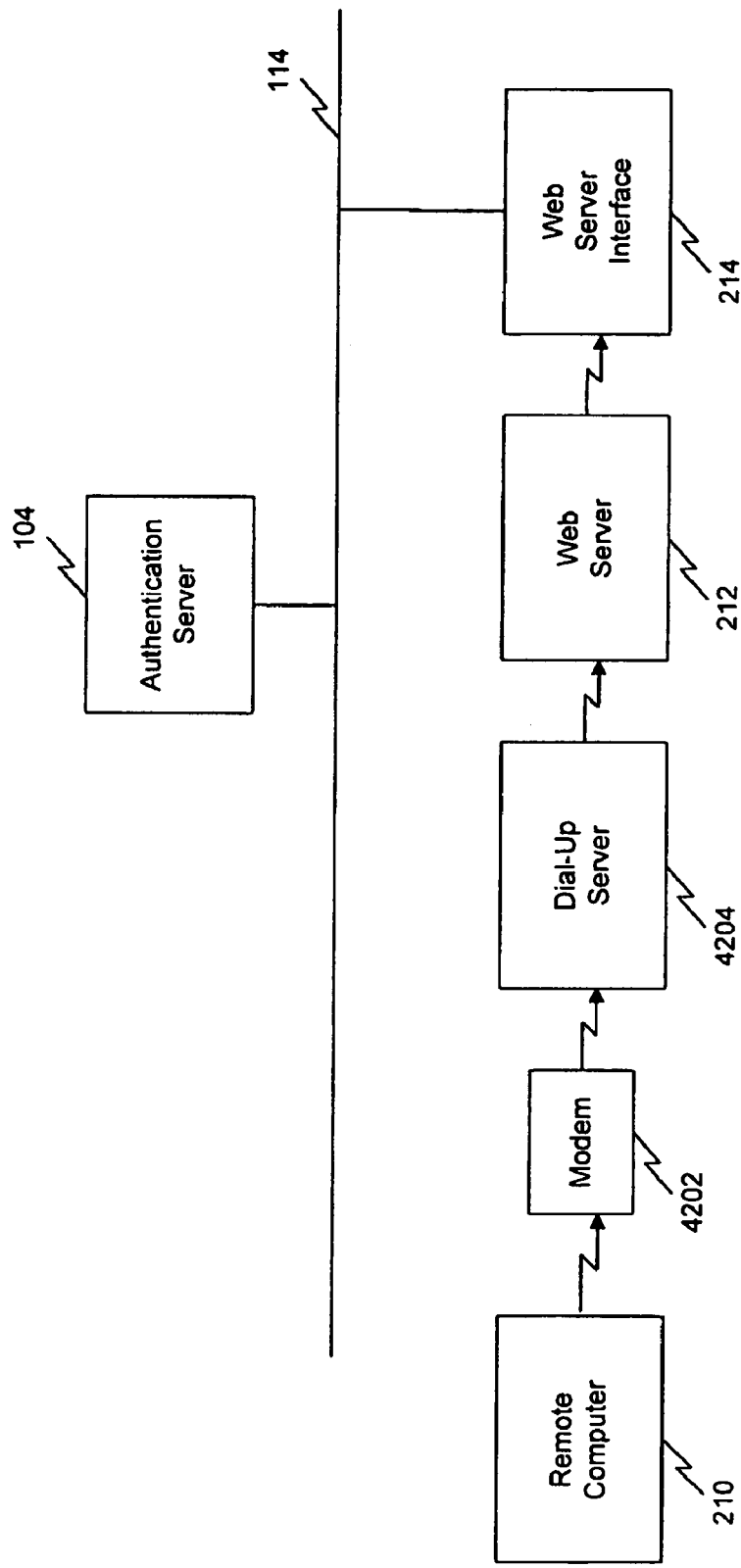
FIG. 43 is a block diagram incorporating the remote access architecture of the present invention that deals with web access.

FIG. 43 is a block diagram incorporating the remote access architecture of the present invention using web access. Referring to FIG. 43, the various functional components include remote computer 210 (FIG. 2), modem 4202, dial-up server 4204, web server 212 and web server interface 214. Remote computer 210 (described above with reference to FIG. 2) accepts an authentication request from a user. Remote computer 210 transmits the authentication request to modem 4202. As described above, once the authentication request is converted from digital to analog waves, modem 4202 transmits the authentication request to dial-up server 4204.

Dial-up server 4204 provides dial-up access. Here, dial-up server 4204 formats the authentication request into a web authentication protocol. The web authentication protocol provides a means for sending authentication requests to web server 212.

Web server 212 stores users' permissions and configuration information. Web server 212 transmits the authentication request to web server interface 214.

Web server interface 214 is a logical server that could reside on the same computer with server 104. Web server interface 214 translates between the communication protocol understood by server 104 and the web authentication protocol (and back) to provide users remote access to the present invention.

J. OTHER APPLICATIONS

A computer, as described in reference to FIG. 3, is more than the typical desktop computer. For example, both cars and ATM machines incorporate computers, home and office physical security systems incorporate computers, etc. Thus, the present invention is not limited to the protection of resources in a networked environment as described above. Following are just some of the various applications where the present invention can be applied.

1. Digital Certificates

The inventors of the present invention recognized a limitation that is encountered when digital certificates are used in a networked environment without system 102 (FIG. 1). Generally, a digital certificate defines user privileges. More specifically, a digital certificate attaches to an electronic message and is used for security purposes. The most common use of a digital certificate is to verify that a user sending a message is who he or she claims to be, and to provide the receiver with the means to encode a reply.

An individual wishing to send an encrypted message applies for a digital certificate from a Certificate Authority (CA). The CA issues an encrypted digital certificate containing the applicant's public keys, private keys and a variety of other identification information. The applicant's public key is signed by the CA. The CA makes its own public key readily available through print publicity or perhaps on the Internet.

The recipient of an encrypted message uses the CA's public key to decode the digital certificate attached to the message, verifies it as issued by the CA and then obtains the sender's public key and identification information held within the certificate. With this information, the recipient can send an encrypted reply. Today, a user must pass a password device, or use a token or smart card, or any combination thereof, to gain access to a digital certificate. Because each user's digital certificate is stored on one computer within the network, the digital certificate is bound to a single computer. This limits the user from going to a different computer to gain access to the network. The inventors of the present invention recognized that a scheme is needed for easy access to all user digital certificates such that a user can gain access to required resources from any location within the enterprise.

The scheme for easy access to all user digital certificates, such that a user can gain access to his or her digital certificate from any location within the enterprise, is the same scheme as described above in reference to FIG. 28 and the storing of templates 502. In enterprise 2800, all digital certificates are stored at corporate office 2802. Then the additional storage of digital certificates at individual offices depends on the logical block (e.g. either block 2818 or block 2820) the office is in.

The procedure is as follows. First, each office in enterprise 2800 stores the digital certificates for every user that was issued a digital certificate at that office. Then, in each logical block, start with the offices at the bottom of the hierarchical structure. For example, in block 2818 start with office 2806 and office 2808. Office 2806 and office 2808 only store the digital certificates for users that were issued digital certificates at those offices. Then, following the hierarchical structure up to office 2804, office 2804 stores the digital certificates for users that were issued digital certificates at office 2804, and also copies of all the digital certificates stored at office 2806 and office 2808. This procedure is repeated until the top of the hierarchical structure is reached (i.e., corporate office 2802).

Thus, with the above hierarchical structure, the farthest any office will have to go to get a user's digital certificate is corporate office 2802. For example, say User A was issued a certificate at office 2812. This means that User A's digital certificate is stored at office 2812, office 2810 and corporate office 2802. If User A travels to office 2806, office 2806 will have to follow the hierarchical structure up to corporate office 2802 to retrieve a copy of User A's digital certificate. Once it is determined that the user is finished with his or her digital certificate, the digital certificate must be re-retrieved the next time the user requests access to his or her digital certificate Not only does the hierarchical structure of enterprise 2800 provide ease of access, but also a means of backing up digital certificates within enterprise 2800.

The use of a hierarchical directory to locate templates 502 within enterprise 2800 (FIG. 28) as described above works equally as well for digital certificates. The X.500 directory will include pointers to the offices that user digital certificates are stored.

2. Roaming Profile Server

The concept of using a public key to decode a digital certificate attached to a message was introduced above. Some cryptographic systems use two keys, a public key known to everyone and a private or secret key known only to the recipient of the message. For example, when User A wants to send a secure message to User B, User A uses User B's public key to encrypt the message. User B then uses his or her private key to decrypt the message.

An important element to the public key system is that the public and private keys are related in such a way that only the public key can be used to encrypt messages and only the corresponding private key can be used to decrypt them. Moreover, it is virtually impossible to deduce the private key if you know the public key. But it is imperative to ensure that users' private keys are kept secret. A user's private keys, among other things, are contained in a unique encrypted user profile. Therefore, a user needs to be adequately authenticated prior to allowing the user access to the user's private keys (i.e., decrypt the user's profile).

There exist public key systems that provide a public key infrastructure. One example of such public key systems is Entrust/PKI™. A public key infrastructure is a comprehensive system that provides public key encryption and digital signature services. The purpose of a public key infrastructure is to manage public keys and digital certificates. By managing keys and digital certificates through a public key infrastructure, an enterprise establishes and maintains a trustworthy networking environment. A public key infrastructure enables the use of encryption and digital signature services across a wide variety of applications.

Public key systems must also manage user profiles. Each profile contains user's private keys. As mentioned above, the authentication of users prior to allowing them access to their profiles is imperative. Public key systems allow for the authentication of users in one of two ways. The first way is through a password device supplied by the public key system itself. The second way that public key systems allow for the authentication of users is through an identification device interface. The identification device interface allows third-party vendors of identification devices to create an identity device module that interfaces with it. This way third-party vendors provide the authentication of users prior to allowing them access to their profiles within the public key system.

Various third-party vendors of both biometric and non-biometric devices have created identity device modules for their devices to facilitate user authentication within public key systems. The inventors of the present invention recognized that system 102 (FIG. 1) can be used to provide flexibility and additional security in the authentication of users prior to allowing them access to profiles within the public key system through the use of policies 504. This flexibility and additional security provided by system 102 is the ability to use multiple devices (via policies 504) for the authentication of individual users. In addition, the inventors of the present invention recognized that a scheme is needed for easy access to all profiles such that a user can gain access to the user's profile from any location within the enterprise.

Figure 29:
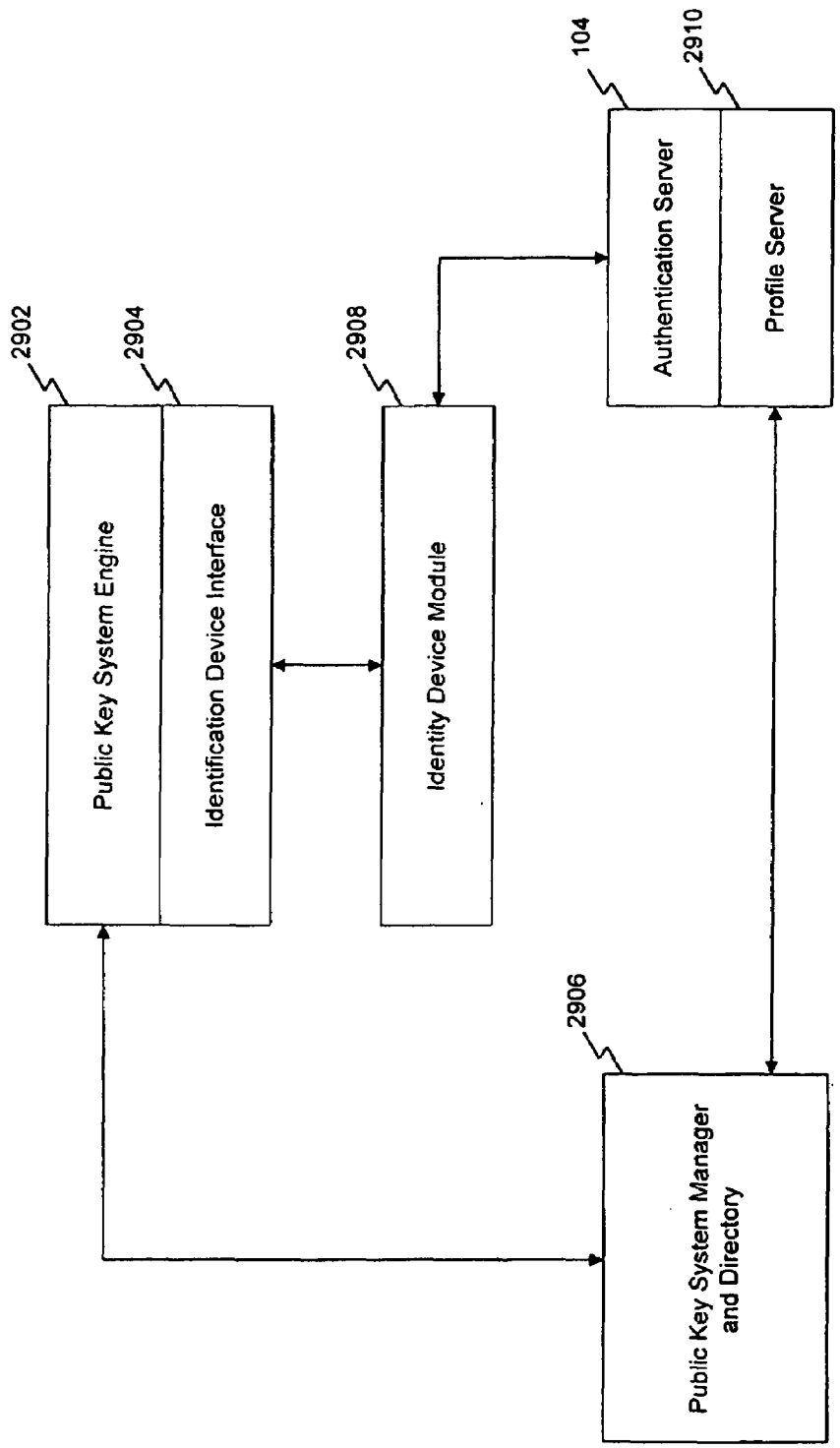
FIG. 29 is a block diagram illustrating how the present invention can be integrated with a public key system according to a preferred embodiment of the present invention.

FIG. 29 is a block diagram illustrating how system 102 of the present invention can be integrated with a public key system. FIG. 29 includes public key system engine 2902, identification device interface 2904, public key system manager and directory 2906, identity device module 2908, server 104 (FIG. 1) and profile server 2910. Public key system engine 2902, identification device interface 2904 and public key system manager and directory 2906 are not part of the present invention. They are part of a generic public key system. Identity device module 2908, server 104 (FIG. 1) and profile server 2910 are part of the present invention.

Public key system engine 2902 performs the various functions of the public key system. Public key system engine 2902 interacts with the various applications (e.g., e-mail, browsers, etc.) that it provides the use of encryption and digital signatures for Identification device interface 2904 allows third-party vendors of identification devices to create an identity device module that interfaces with it. Identity device module 2908 is one of these identity device modules that interfaces with identification device interface 2904. Identity device module 2908 acts similar to the open interface of the present invention as described above.

Public key system manager and directory 2906 stores and manages public keys. Server 104 operates exactly as described above. Finally, profile server 2910 stores all of the users' profiles in the public key system. Profile server 2910 is attached to server 104 and acts as a roaming profile server for the public key system.

Identity device module 2908 works with identification device interface 2904 to provide the desired profile from profile server 2910. But prior to providing the desired profile, identity device module 2908 and server 104 work together to authenticate the user. All data transported between identity device module 2908 and server 104 is encrypted. This data includes the profiles and templates 502 (FIG. 5).

Incorporating system 102 (FIG. 1) into a public key system helps to avoid the limitations discussed above. System 102 provides the flexibility to use the right measurement for the environment in which the user is trying to get access to his or her profile, increase user mobility within the enterprise, remotely enroll and re-enroll users into system 102 and to ensure the integrity of software loaded on remote computers.

3. Phone Authentication and Clearance Verification

Phones can be implemented as a voice recognition device. Thus, system 102 (FIG. 1) can be used to authenticate employees for access to various phones within the enterprise. System 102 can also be used to apply clearance verification for each employee to make certain calls. For phone authentication and clearance verification, groups 506 (FIG. 5) can be defined in such a way that employees in certain groups 506 are only allowed to make certain types of phone calls (e.g., local calls, long-distance calls, 800 calls, 900 calls, etc.) and/or have access to certain phones within the enterprise.

Incorporating system 102 (FIG. 1) into phone authentication and clearance verification helps to avoid some of the limitations discussed above. System 102 provides the flexibility to use a phone as a voice recognition device, increase employee mobility within the enterprise, apply the needed degree of authentication required to protect each type of phone call and remotely enroll and re-enroll customers into system 102.

4. Access/Facility Control

Current physical access/facility control systems require the user to enter a password to activate and/or deactivate the system. Information devices can be attached to the entry of each physical location in an enterprise that authentication is required for entry. Then, system 102 (FIG. 1) can be used to provide flexibility in protection and efficient administration as described above.

Groups 506 (FIG. 5) can be defined in such a way that users in certain groups 506 are only allowed access to certain physical locations within an enterprise. One problem that any enterprise has with physical access to locations is that one authenticated person may allow one or more unauthenticated people in the location. Here, a facial image device may be utilized to continuously scan a location to determine if any unauthenticated people are present. If the facial image device determines that an unauthenticated person is present, system 102 can alarm the administrator.

Incorporating system 102 (FIG. 1) into a physical access/facility control system helps to avoid limitations discussed above. System 102 provides the flexibility to use the right measurement for the environment in which the entry is located, increase user mobility within the enterprise, apply the needed degree of authentication required to protect each type of physical location, remotely enroll and re-enroll users into system 102 and to ensure the integrity of software loaded at remote entries.

5. Banking and Financial

Today, more than ever, adequate authentication mechanisms are needed in the banking and financial industries. Transactions that once required interaction between two people, now are encouraged to be done via ATM machines or automated phone systems. Currently, transactions are approved by a customer entering a correct pin. As the types of human-to-machine transactions increase, so does the number of different pins each user is required to remember. The result is that either customers write their pins down and/or they use the same pin for many different types of transactions. If a pin is written down, this increases the chance that another person will see the pin and use it to gain unauthorized access to transactions.

Incorporating system 102 (FIG. 1) into current banking and financial transaction systems (e.g., ATM machines), avoids all of the limitations discussed above. System 102 provides the flexibility to use the right biometric measurement for an environment in which the ATM machine is located, increase customer mobility, apply the needed degree of authentication required to protect each transaction, remotely enroll and re-enroll customers into system 102 and to ensure the integrity of software loaded on remote ATM machines.

6. Silent Signal

Silent signal is a way of silently signaling for assistance through the use of devices. Silent signal is particularly applicable to access/facility control and the banking and financial industries. This feature of the present invention allows a user to enter a normal (i.e., expected) biometric measurement (or a first password, etc.) under normal conditions or an alarm biometric measurement (or a second password, etc.) under emergency conditions. One example of silent signal incorporates a fingerprint device. Say a fingerprint device is used for authentication at an ATM machine. Policies 504 (FIG. 5) of system 102 (FIG. 1) can be configured to silently signal police if, for example, the left index finger is used for authentication to the ATM machine during a robbery. Otherwise, the right index finger is used for a normal transaction without the need to signal the police. A similar scenario applies to access/facility control.

Another example of silent signal incorporates a voice recognition device. Here, when a certain phrase is used for authentication to either a physical location or at an ATM machine, the police are silently signaled. In addition, it should be apparent to one skilled in the art that any of the devices mentioned above can be used to implement the silent signal of the present invention.

K. CONCLUSION

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A method for providing user authentication to enterprise resources, comprising the steps of:
   (1) setting up an authentication server said authentication server having stored therein at least one policy that determines whether the user can gain access to the enterprise resources, wherein said policy has associated therewith at least one device, wherein said policy is one of the following: an OR policy, an AND policy, a CONTINGENT policy, a RANDOM policy, a THRESHOLD policy, a multi-user policy, a multi-location policy, a multi-template policy, a user dependent policy, a location restriction policy, or a computer/device specific policy;
   (2) determining whether the user is authenticated by executing said policy; and
   (3) allowing the user access to the enterprise resources if the user passes said policy, otherwise denying access to the user to the enterprise resources;
   wherein said policy is an OR policy having a list of devices, wherein said list of devices includes at least two different devices, and wherein the user passes said OR policy if the user passes one of said devices in said list of devices.

2. A method for providing user authentication to enterprise resources, comprising the steps of:
   (1) setting up an authentication server, said authentication server having stored therein at least one policy that determines whether the user can gain access to the enterprise resources, wherein said policy has associated therewith at least one device, wherein said policy is one of the following: an OR policy, an AND policy, a CONTINGENT policy, a RANDOM policy a THRESHOLD policy, a multi-user policy a multi-location policy, a multi-template policy, a user dependent policy, a location restriction policy, or a computer/device specific policy;
   (2) determining whether the user is authenticated by executing said policy; and
   (3) allowing the user access to the enterprise resources if the user passes said policy, otherwise denying access to the user to the enterprise resources;
   wherein said policy is an OR policy having a list of devices, wherein said list of devices includes only one device, and wherein the user passes said OR policy if the user passes said device while being tested with at least two measurements.

3. A method for providing user authentication to enterprise resources comprising the steps of:
   (1) setting up an authentication server, said authentication server having stored therein at least one policy that determines whether the user can gain access to the enterprise resources wherein said policy has associated therewith at least one device, wherein said policy is one of the following: an OR policy, an AND policy, a CONTINGENT policy, a RANDOM policy, a THRESHOLD policy, a multi-user policy, a multi-location policy, a multi-template policy, a user dependent policy, a location restriction policy, or a computer/device specific policy;
   (2) determining whether the user is authenticated by executing said policy; and
   (3) allowing the user access to the enterprise resources if the user passes said policy, otherwise denying access to the user to the enterprise resources;
   wherein said policy is an AND policy having a list of devices, wherein said list of devices includes at least two different devices, and wherein the user passes said AND policy if the user passes all of said devices in said list of devices.

4. A method for providing user authentication to enterprise resources, comprising the steps of:
(1) setting up an authentication server, said authentication server having stored therein at least one policy that determines whether the user can gain access to the enterprise resources, wherein said policy has associated therewith at least one device, wherein said policy is one of the following: an OR policy, an AND policy, a CONTINGENT policy, a RANDOM policy a THRESHOLD policy, a multi-user policy a multi-location policy, a multi-template policy, a user dependent policy, a location restriction policy, or a computer/device specific policy;
(2) determining whether the user is authenticated by executing said policy; and
(3) allowing the user access to the enterprise resources if the user passes said policy, otherwise denying access to the user to the enterprise resources;
wherein said policy is an AND policy having a list of devices, wherein said list of devices includes only one device, and wherein the user passes said AND policy if the user passes said device while being tested with at least two measurements.

5. A method for providing user authentication to enterprise resources, comprising the steps of:
(1) setting up an authentication server, said authentication server having stored therein at least one policy that determines whether the user can gain access to the enterprise resources, wherein said policy has associated therewith at least one device, wherein said policy is one of the following: an OR policy, an AND policy, a CONTINGENT policy, a RANDOM policy, a THRESHOLD policy, a multi-user policy, a multi-location policy, a multi-template policy, a user dependent policy, a location restriction policy, or a computer/device specific policy;
(2) determining whether the user is authenticated by executing said policy; and
(3) allowing the user access to the enterprise resources if the user passes said policy, otherwise denying access to the user to the enterprise resources;
wherein said policy is a CONTINGENT policy having a list of devices, wherein said list of devices includes at least two different devices, and wherein the user passes said CONTINGENT policy if either the user exceeds a minimum threshold associated with a first device or if the user exceeds a contingent threshold associated with said first device and the user exceeds a minimum threshold associated with a second device.

6. A method for providing user authentication to enterprise resources, comprising the steps of:
(1) setting up an authentication server, said authentication server having stored therein at least one policy that determines whether the user can gain access to the enterprise resources, wherein said policy has associated therewith at least one device, wherein said policy is one of the following: an OR policy, an AND policy, a CONTINGENT policy, a RANDOM policy, a THRESHOLD policy, a multi-user policy, a multi-location policy, a multi-template policy, a user dependent policy, a location restriction policy, or a computer/device specific policy;
(2) determining whether the user is authenticated by executing said policy; and
(3) allowing the user access to the enterprise resources if the user passes said policy, otherwise denying access to the user to the enterprise resources;
wherein said policy is a CONTINGENT policy having a list of devices, wherein said list of devices includes only one device, wherein a first measurement and a second measurement are associated with said device, and wherein the user passes said CONTINGENT policy if either the user exceeds a minimum threshold associated with said device and said first measurement or if the user exceeds a contingent threshold associated with said device and said first measurement and the user exceeds a minimum threshold associated with said device and said second measurement.

7. A method for providing user authentication to enterprise resources, comprising the steps of:
(1) setting up an authentication server, said authentication server having stored therein at least one policy that determines whether the user can gain access to the enterprise resources, wherein said policy has associated therewith at least one device, wherein said policy is one of the following: an OR policy, an AND policy, a CONTINGENT policy, a RANDOM policy, a THRESHOLD policy, a multi-user policy a multi-location policy, a multi-template policy, a user dependent policy, a location restriction policy, or a computer/device specific policy;
(2) determining whether the user is authenticated by executing said policy; and
(3) allowing the user access to the enterprise resources if the user passes said policy, otherwise denying access to the user to the enterprise resources;
wherein said policy is a RANDOM policy having a list of devices, wherein said list of devices includes at least two different devices, wherein a random device is determined from said list of devices, and wherein the user passes said RANDOM policy if the user passes said random device.

8. A method for providing user authentication to enterprise resources, comprising the steps of:
(1) setting up an authentication server, said authentication server having stored therein at least one policy that determines whether the user can gain access to the enterprise resources, wherein said policy has associated therewith at least one device, wherein said policy is one of the following: an OR policy, an AND policy, a CONTINGENT policy, a RANDOM policy, a THRESHOLD policy, a multi-user policy, a multi-location policy, a multi-template policy, a user dependent policy, a location restriction policy, or a computer/device specific policy;
(2) determining whether the user is authenticated by executing said policy; and
(3) allowing the user access to the enterprise resources if the user passes said policy, otherwise denying access to the user to the enterprise resources;
wherein said policy is a RANDOM policy having a list of devices, wherein said list of devices includes only one device, wherein a random measurement is determined from one or more measurements, and wherein the user passes said RANDOM policy if the user passes said device while being tested with said random measurement.

9. A method for providing user authentication to enterprise resources, comprising the steps of:
(1) setting up an authentication server, said authentication server having stored therein at least one policy that determines whether the user can gain access to the enterprise resources, wherein said policy has associated therewith at least one device, wherein said policy is one of the following: an OR policy, an AND policy, a CONTINGENT policy, a RANDOM policy, a THRESHOLD policy, a multi-user policy, a multi-location policy, a multi-template policy, a user dependent policy, a location restriction policy, or a computer/device specific policy;

(2) determining whether the user is authenticated by executing said policy; and (3) allowing the user access to the enterprise resources if the user passes said policy, otherwise denying access to the user to the enterprise resources;

wherein said policy is a THRESHOLD policy having a list of devices, wherein said list of devices includes at least two different devices, and wherein the user passes said THRESHOLD policy if the user exceeds a total threshold while being tested on one or more of said devices in said list of devices.

10. A method for providing user authentication to enterprise resources, comprising the steps of:

(1) setting up an authentication server, said authentication server having stored therein at least one policy that determines whether the user can gain access to the enterprise resources, wherein said policy has associated therewith at least one device, wherein said policy is one of the following: an OR policy, an AND policy, a CONTINGENT policy, a RANDOM policy, a THRESHOLD policy, a multi-user policy, a multi-location policy, a multi-template policy, a user dependent policy, a location restriction policy, or a computer/device specific policy;

(2) determining whether the user is authenticated by executing said policy; and (3) allowing the user access to the enterprise resources if the user passes said policy, otherwise denying access to the user to the enterprise resources;

wherein said policy is a THRESHOLD policy having a list of devices, wherein said list of devices includes only one device, and wherein the user passes said THRESHOLD policy if the user exceeds a total threshold while being tested with one or more measurements on said device in said list of devices.

11. A method for providing user authentication to enterprise resources, comprising the steps of:

(1) setting up an authentication server, said authentication server having stored therein at least one policy that determines whether the user can gain access to the enterprise resources, wherein said policy has associated therewith at least one device, wherein said policy is one of the following: an OR policy, an AND policy, a CONTINGENT policy, a RANDOM policy, a THRESHOLD policy, a multi-user policy, a multi-location policy, a multi-template policy, a user dependent policy, a location restriction policy, or a computer/device specific policy;

(2) determining whether the user is authenticated by executing said policy; and (3) allowing the user access to the enterprise resources if the user passes said policy, otherwise denying access to the user to the enterprise resources;

wherein said policy is an OR policy having a list of policies, wherein said list of policies includes at least two policies, and wherein the user passes said OR policy if the user passes one of said policies in said list of policies.

12. A method for providing user authentication to enterprise resources, comprising the steps of:

(1) setting up an authentication server, said authentication server having stored therein at least one policy that determines whether the user can gain access to the enterprise resources, wherein said policy has associated therewith at least one device, wherein said policy is one of the following: an OR policy, an AND policy, a CONTINGENT policy, a RANDOM policy, a THRESHOLD policy, a multi-user policy, a multi-location policy, a multi-template policy, a user dependent policy, a location restriction policy, or a computer/device specific policy;

(2) determining whether the user is authenticated by executing said policy; and (3) allowing the user access to the enterprise resources if the user passes said policy, otherwise denying access to the user to the enterprise resources;

wherein said policy is an AND policy having a list of policies, wherein said list of policies includes at least two policies, and wherein the user passes said AND policy if the user passes all of said policies in said list of policies.

13. A method for providing user authentication to enterprise resources, comprising the steps of:

(1) setting up an authentication server, said authentication server having stored therein at least one policy that determines whether the user can gain access to the enterprise resources, wherein said policy has associated therewith at least one device, wherein said policy is one of the following: an OR policy, an AND policy, a CONTINGENT policy, a RANDOM policy, a THRESHOLD policy, a multi-user policy, a multi-location policy, a multi-template policy, a user dependent policy, a location restriction policy, or a computer/device specific policy;

(2) determining whether the user is authenticated by executing said policy; and (3) allowing the user access to the enterprise resources if the user passes said policy, otherwise denying access to the user to the enterprise resources;

wherein said policy is a CONTINGENT policy having a list of policies, wherein said list of policies includes at least two policies, and wherein the user passes said CONTINGENT policy if either the user exceeds a minimum threshold associated with a first policy or if the user exceeds a contingent threshold associated with said first policy and the user exceeds a minimum threshold associated with a second policy.

14. A method for providing user authentication to enterprise resources, comprising the steps of:

(1) setting up an authentication server, said authentication server having stored therein at least one policy that determines whether the user can gain access to the enterprise resources, wherein said policy has associated therewith at least one device, wherein said policy is one of the following: an OR policy, an AND policy, a CONTINGENT policy, a RANDOM policy, a THRESHOLD policy, a multi-user policy, a multi-location policy, a multi-template policy, a user dependent policy, a location restriction policy, or a computer/device specific policy;

(2) determining whether the user is authenticated by executing said policy; and (3) allowing the user access to the enterprise resources if the user passes said policy, otherwise denying access to the user to the enterprise resources;

wherein said policy is a RANDOM policy having a list of policies, wherein said list of policies includes at least two policies, wherein a policy is randomly determined from said list of policies, and wherein the user passes said RANDOM policy if the user passes said randomly determined policy.

15. A method for providing user authentication to enterprise resources, comprising the steps of:
   (1) setting up an authentication server, said authentication server having stored therein at least one policy that determines whether the user can gain access to the enterprise resources, wherein said policy has associated therewith at least one device, wherein said policy is one of the following: an OR policy, an AND policy, a CONTINGENT policy, a RANDOM policy, a THRESHOLD policy, a multi-user policy, a multi-location policy, a multi-template policy, a user dependent policy, a location restriction policy, or a computer/device specific policy;
   (2) determining whether the user is authenticated by executing said policy; and
   (3) allowing the user access to the enterprise resources if the user passes said policy, otherwise denying access to the user to the enterprise resources;
   wherein said policy is a THRESHOLD policy having a list of policies, wherein said list of policies includes at least two policies, and wherein the user passes said THRESHOLD policy if the user exceeds a total threshold while being tested on one or more of said policies in said list of policies.

16. A method for providing user authentication to enterprise resources, comprising the steps of:
   (1) setting up an authentication server, said authentication server having stored therein at least one policy that determines whether the user can gain access to the enterprise resources, wherein said policy has associated therewith at least one device, wherein said policy is one of the following: an OR policy, an AND policy, a CONTINGENT policy, a RANDOM policy, a THRESHOLD policy, a multi-user policy, a multi-location policy, a multi-template policy, a user dependent policy, a location restriction policy, or a computer/device specific policy;
   (2) determining whether the user is authenticated by executing said policy; and
   (3) allowing the user access to the enterprise resources if the user passes said policy, otherwise denying access to the user to the enterprise resources;
   wherein said policy is an OR policy having a list of policies or devices, wherein said list of policies or devices includes at least two elements, and wherein the user passes said OR policy if the user passes one of said elements in said list of policies or devices.

17. A method for providing user authentication to enterprise resources, comprising the steps of:
   (1) setting up an authentication server, said authentication server having stored therein at least one policy that determines whether the user can gain access to the enterprise resources, wherein said policy has associated therewith at least one device, wherein said policy is one of the following: an OR policy, an AND policy, a CONTINGENT policy, a RANDOM policy, a THRESHOLD policy, a multi-user policy, a multi-location policy, a multi-template policy, a user dependent policy, a location restriction policy, or a computer/device specific policy;
   (2) determining whether the user is authenticated by executing said policy; and
   (3) allowing the user access to the enterprise resources if the user passes said policy, otherwise denying access to the user to the enterprise resources;
   wherein said policy is an AND policy having a list of policies or devices, wherein said list of policies or devices includes at least two elements, and wherein the user passes said AND policy if the user passes all of said elements in said list of policies or devices.

18. A method for providing user authentication to enterprise resources, comprising the steps of:
   (1) setting up an authentication server, said authentication server having stored therein at least one policy that determines whether the user can gain access to the enterprise resources, wherein said policy has associated therewith at least one device, wherein said policy is one of the following: an OR policy, an AND policy, a CONTINGENT policy, a RANDOM policy, a THRESHOLD policy, a multi-user policy, a multi-location policy, a multi-template policy, a user dependent policy, a location restriction policy, or a computer/device specific policy;
   (2) determining whether the user is authenticated by executing said policy; and
   (3) allowing the user access to the enterprise resources if the user passes said policy, otherwise denying access to the user to the enterprise resources;
   wherein said policy is a CONTINGENT policy having a list of policies or devices, wherein said list of policies or devices includes at least two elements, and wherein the user passes said CONTINGENT policy if either the user exceeds a minimum threshold associated with a first element or if the user exceeds a contingent threshold associated with said first element and the user exceeds a minimum threshold associated with a second element.

19. A method for providing user authentication to enterprise resources, comprising the steps of:
   (1) setting up an authentication server, said authentication server having stored therein at least one policy that determines whether the user can gain access to the enterprise resources, wherein said policy has associated therewith at least one device, wherein said policy is one of the following: an OR policy, an AND policy, a CONTINGENT policy, a RANDOM policy, a THRESHOLD policy, a multi-user policy, a multi-location policy, a multi-template policy, a user dependent policy, a location restriction policy, or a computer/device specific policy;
   (2) determining whether the user is authenticated by executing said policy; and
   (3) allowing the user access to the enterprise resources if the user passes said policy, otherwise denying access to the user to the enterprise resources;
   wherein said policy is a RANDOM policy having a list of policies or devices, wherein said list of policies or devices includes at least two elements, wherein a random element is determined from said elements in said list of policies or devices, and wherein the user passes said RANDOM policy if the user passes said random element.

20. A method for providing user authentication to enterprise resources, comprising the steps of:
   (1) setting up an authentication server, said authentication server having stored therein at least one policy that determines whether the user can gain access to the enterprise resources, wherein said policy is a multi-location policy having a list of devices, wherein said list of devices includes at least two different devices, wherein said devices each have a different location associated with it, and whereby the user passes said multi-location policy if the user passes all of the required said devices at their associated locations;

(2) determining whether the user is authenticated by executing said policy; and (3) allowing the user access to the enterprise resources if the user passes said policy, otherwise denying access to the user to the enterprise resources.

21. A method for providing user authentication to enterprise resources, comprising the steps of:

(1) setting up an authentication server, said authentication server having stored therein at least one policy that determines whether the user can gain access to the enterprise resources, wherein said policy is a multi-location policy having a list of policies, wherein said list of policies includes at least two policies, wherein said policies each have a different location associated with it, and whereby the user passes said multi-location policy if the user passes all of the required said policies at their associated locations;

(2) determining whether the user is authenticated by executing said policy; and (3) allowing the user access to the enterprise resources if the user passes said policy, otherwise denying access to the user to the enterprise resources.

22. A method for providing user authentication to enterprise resources, comprising the steps of:

(1) setting up an authentication server, said authentication server having stored therein at least one policy that determines whether the user can gain access to the enterprise resources, wherein said policy is a multi-location policy having a list of devices, wherein said list of devices includes only one type of device, wherein said device has at least two measurements associated with it, wherein each said measurement has a different location associated with it, and whereby the user passes said multi-location policy if the user passes said device while being tested with said measurements at their associated locations;

(2) determining whether the user is authenticated by executing said policy; and (3) allowing the user access to the enterprise resources if the user passes said policy, otherwise denying access to the user to the enterprise resources.

23. A method for providing user authentication to enterprise resources, comprising the steps of:

(1) setting up an authentication server, said authentication server having stored therein at least one policy that determines whether the user can gain access to the enterprise resources, wherein if said policy is a multi-template policy having a list of devices, wherein said list of devices includes at least two different devices, wherein said devices each have two or more templates associated with the device and user combination, and whereby the user passes said multi-template policy if the user passes all of the required said devices with at least one of said templates associated with each;

(2) determining whether the user is authenticated by executing said policy; and (3) allowing the user access to the enterprise resources if the user passes said policy, otherwise denying access to the user to the enterprise resources.

24. A method for providing user authentication to enterprise resources, comprising the steps of:

(1) setting up an authentication server, said authentication server having stored therein at least one policy that determines whether the user can gain access to the enterprise resources, wherein if said policy is a multi-template policy having a list of devices, wherein said list of devices includes only one type of device, wherein said device has at least two measurements associated with it, wherein each said measurement has two or more templates associated with it, and whereby the user passes said multi-template policy if the user passes said device while being tested with said measurements with at least one of said templates associated with each;

(2) determining whether the user is authenticated by executing said policy; and (3) allowing the user access to the enterprise resources if the user passes said policy, otherwise denying access to the user to the enterprise resources.

25. A method for providing user authentication to enterprise resources, comprising the steps of:

(1) setting up an authentication server, said authentication server having stored therein at least one policy that determines whether the user can gain access to the enterprise resources, wherein if said policy is a user dependent policy, and whereby the user passes said user dependent policy if at least one different user associated with the user is currently accessing the enterprise resources and the user passes another policy;

(2) determining whether the user is authenticated by executing said policy; and (3) allowing the user access to the enterprise resources if the user passes said policy, otherwise denying access to the user to the enterprise resources.

26. A method for providing user authentication to enterprise resources, comprising the steps of:

(1) setting up an authentication server, said authentication server having stored therein at least one policy that determines whether the user can gain access to the enterprise resources, wherein said policy is a user dependent policy, and whereby the user passes said user dependent policy if at least one different user associated with the user is currently accessing the enterprise resources;

(2) determining whether the user is authenticated by executing said policy; and (3) allowing the user access to the enterprise resources if the user passes said policy, otherwise denying access to the user to the enterprise resources.

27. A method for providing user authentication to enterprise resources, comprising the steps of:

(1) setting up an authentication server, said authentication server having stored therein at least one policy that determines whether the user can gain access to the enterprise resources, wherein said policy is a location restriction policy, and whereby the user passes said location restriction policy if the user is attempting authentication from a restricted location and the user passes another policy;

(2) determining whether the user is authenticated by executing said policy; and (3) allowing the user access to the enterprise resources if the user passes said policy, otherwise denying access to the user to the enterprise resources.

28. A method for providing user authentication to enterprise resources, comprising the steps of:

(1) setting up an authentication server, said authentication server having stored therein at least one policy that determines whether the user can gain access to the enterprise resources, wherein said policy is a computer/device specific policy, wherein said computer/device specific policy determines the devices attached to the computer the user is attempting authentication from, wherein said computer/device specific policy based on said attached devices determines another policy that can be executed to authenticate the user, and whereby the user passes said computer/device specific policy by passing said another policy;

(2) determining whether the user is authenticated by executing said policy; and (3) allowing the user access to the enterprise resources if the user passes said policy, otherwise denying access to the user to the enterprise resources.

29. A method for providing user authentication to enterprise resources, comprising the steps of:

(1) setting up an authentication server, said authentication server having stored therein at least one policy that determines whether the user can gain access to the enterprise resources, wherein said policy is a CONTINGENT policy having a list of devices, wherein said list of devices includes at least two different devices, and wherein the user passes said CONTINGENT policy if either the user exceeds a minimum threshold associated with a first device or if the user exceeds a contingent threshold associated with said first device and the user exceeds a minimum threshold associated with a second device, wherein said minimum threshold and said contingent threshold is set by an administrator;

(2) determining whether the user is authenticated by executing said policy; and (3) allowing the user access to the enterprise resources if the user passes said policy, otherwise denying access to the user to the enterprise resources.

30. A method for providing user authentication to enterprise resources, comprising the steps of:

(1) setting up an authentication server, said authentication server having stored therein at least one policy that determines whether the user can gain access to the enterprise resources, wherein said policy is a CONTINGENT policy having a list of devices, wherein said list of devices includes at least two different devices, and wherein the user passes said CONTINGENT policy if either the user exceeds a minimum threshold associated with a first device or if the user exceeds a contingent threshold associated with said first device and the user exceeds a minimum threshold associated with a second device, wherein said second device is selected based on environmental conditions;

(2) determining whether the user is authenticated by executing said policy; and (3) allowing the user access to the enterprise resources if the user passes said policy, otherwise denying access to the user to the enterprise resources.

* * * * *

UNITED STATES PATENT AND TRADEMARK OFFICE
CERTIFICATE OF CORRECTION

PATENT NO. : 7,305,562 B1  Page 1 of 1
APPLICATION NO. : 09/517121
DATED : December 4, 2007
INVENTOR(S) : Peter Garrett Bianco et al.

It is certified that error appears in the above-identified patent and that said Letters Patent is hereby corrected as shown below:

On the Title Page, Item 74
IN THE ATTORNEY, AGENT, OR FIRM SECTION -

Please change "George T. Marcou, Kilpatrick Stockton LLP" to -- George T. Marcou, King & Spalding LLP --

On the Title Page Item 56
IN THE REFERENCES CITED (56) SECTION - OTHER PUBLICATIONS -

On the Title Page Line 8 Item 56
On Page 3, please change ""SAF/nt: Don't Worry, Be KA-API," Network World, Aug. 24," to -- "SAF/nt: Don't Worry, Be HA-API," Network World, Aug. 24, --

On the Title Page Line 15 Item 56
On Page 3, please change ""TrueTouch's Biometric Software Suite$^{TM}$," 1 page, from www." to -- "TrueTouch's Biometric Software Security Suite$^{TM}$, 1 page, from www. --

Signed and Sealed this

Twenty-fourth Day of June, 2008

JON W. DUDAS
*Director of the United States Patent and Trademark Office*